United States Patent
Iwamatsu et al.

(10) Patent No.: US 6,690,714 B1
(45) Date of Patent: Feb. 10, 2004

(54) METHOD AND APPARATUS FOR ACHIEVING DEMODULATION IN RADIO COMMUNICATIONS SYSTEM USING M-SEQUENCE ORTHOGONAL MODULATION

(75) Inventors: Takanori Iwamatsu, Kawasaki (JP); Mamoru Fukui, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/516,529

(22) Filed: Mar. 1, 2000

Related U.S. Application Data

(63) Continuation-in-part of application No. 09/358,619, filed on Jul. 21, 1999.

(30) Foreign Application Priority Data

Sep. 30, 1998 (JP) ............................................ 10-278384
Sep. 30, 1999 (JP) ............................................ 11-278508

(51) Int. Cl.[7] .............................................. H04B 1/707
(52) U.S. Cl. ...................................... 375/148; 375/150
(58) Field of Search ................................ 375/316, 324, 375/343, 140, 141, 142, 147, 150, 144, 148

(56) References Cited

U.S. PATENT DOCUMENTS 5,987,076 A * 11/1999 Zehavi et al. ................ 375/340

FOREIGN PATENT DOCUMENTS

| JP | 11-88293 | 3/1999 |
| JP | 11-284601 | 10/1999 |
| WO | 97/31432 | 8/1997 |
| WO | 98/05128 | 2/1998 |

* cited by examiner

Primary Examiner—Don N. Vo
(74) Attorney, Agent, or Firm—Katten Muchin Zavis Rosenman

(57) ABSTRACT

A reception apparatus for achieving demodulation in a radio communications system using M-sequence orthogonal modulation capable of achieving a good characteristic near the error rate characteristic obtained in the case of a synchronous detection system while suppressing an increase in the size of the hardware, including a signal reproducing circuit and a reflecting circuit having a reliability computing unit for computing a certainty of a value of a correlation energy as a reliability R for the correlation energy of every Walsh number, a correcting unit for obtaining a corrected correlation energy by introducing a corresponding reliability R with respect to the correlation energies, and a maximum energy selecting unit for selecting the maximum correlation energy from among obtained corrected correlation energies based on the same and demodulating a signal corresponding to a Walsh number corresponding to this maximum correlation energy as a received signal.

40 Claims, 40 Drawing Sheets

METHOD AND APPARATUS FOR ACHIEVING DEMODULATION IN RADIO COMMUNICATIONS SYSTEM USING M-SEQUENCE ORTHOGONAL MODULATION

CROSS REFERENCE TO RELATED APPLICATION

This application is a continuation-in-part application of Ser. No. 09/358,619 filed on Jul. 21, 1999.

BACKGROUND OF THE INVENTION

1. Field of the Invention

The present invention relates to a reception apparatus for performing a signal decision using a correlation with predefined codes, and further relates to a method and an apparatus for achieving demodulation in a radio communications system using M-sequence orthogonal modulation and a method and an apparatus for achieving demodulation for a reverse-link demodulation unit in the radio communications system.

The "code division multiple access (CDMA)" has come into attention as a next generation mobile communications system. In the U.S., there is already a standard system called the "IS-95". Further, there is a possibility that the CDMA system used for the semifixed mobile communications system called a "wireless local loop (WWL)" will be used as one means of construction of the infrastructure.

This is the CDMA with a chip rate of 1.2288 Mcps proposed by Qualcomm of the U.S. It employ a synchronous detection system using an externally inserted pilot signal for the downstream channels (forward-links). On the other hand, an asynchronous detection system using M-sequence orthogonal modulation has been adopted for upstream channels (reverse-links).

In the IS-95 standard system, in the asynchronous detection system using the M-sequence orthogonal modulation for the upstream channels, the reception side converts an amplitude signal to electric power so as to eliminate the phase error due to fading or the like and prevent deterioration of the error rate characteristic. However, since it is an asynchronous detection system, the error rate characteristic thereof becomes worse than that of the case of a synchronous detection system.

The present invention is applicable to a reverse-link demodulation unit operating under an asynchronous detection system using M-sequence orthogonal modulation such as in a communication system based on IS-95 (N-CDMA) and is also applicable to a general reception apparatus performing a signal decision using a correlation between predefined codes and a reception signal obtained by demodulating a modulated wave, and can improve the deterioration of the error rate characteristic.

2. Description of the Related Art

As will be explained in detail later by using the drawings, in a demodulation method in a radio communications system using the M-sequence orthogonal modulation of the related art, a square sum of correlation values of respective I-channel (Ich) and Q-channel (Qch) are calculated to obtain a vector and a judgement of a transmitted Walsh code (Walsh number) is performed according to the magnitude of the above vector. For this reason, if a plurality of Walsh numbers each having the same level of correlation energy exist, the accuracy of judgement is degraded due to interference, noise from a radio transmission path, or the like, and therefore the error rate characteristic, for example, the Eb/No vs BER characteristic, ends up being considerably degraded. That is, the quality of demodulated data is degraded.

On the other hand, the synchronous detection system has been proposed as an alternative to the asynchronous detection system. The synchronous detection system is a system predicated on the assumption that a reception side (base station) can obtain by some means or another the phase information on a phase plane of signals of respective Walsh numbers transmitted from a transmission side (terminal) and rotates one vector shown in the figure mentioned later by exactly a predetermined phase angle corresponding to the phase information to align the vector with one axis, for example, the I-axis, and at that time rotates other vectors together by exactly that predetermined phase angle. When doing this, the situation where a large number of variety of vectors end up being concentrated at one axis (I-axis) is avoided, and the error rate characteristic is naturally improved. However, according to the synchronous detection system, there is the disadvantage of a major increase in the size of the hardware.

SUMMARY OF THE INVENTION

Accordingly, in consideration with the above problem, an object of the present invention is to provide a reception apparatus, and further a method and an apparatus for achieving demodulation in a radio communications system using M-sequence orthogonal modulation capable of achieving a good characteristic near the error rate characteristic obtained in the case of a synchronous detection system while suppressing an increase in the size of the hardware.

To attain the above object, according to the present invention, there is provided a demodulation apparatus having a reliability computing means (21) for computing a certainty of a value of a correlation energy as a reliability R for the correlation energy of every Walsh number, a correcting means (22) for obtaining a corrected correlation energy by introducing a corresponding reliability R with respect to the correlation energies, and a maximum energy selecting means (19) for selecting the maximum correlation energy from among obtained corrected correlation energies based on the same and demodulates a signal corresponding to a Walsh number corresponding to this maximum correlation energy as a received signal. Due to this, a demodulation apparatus in a radio communications system using M-sequence orthogonal modulation which is an asynchronous system, but can obtain a good error rate characteristic equivalent to that by the synchronous system is realized.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 37:
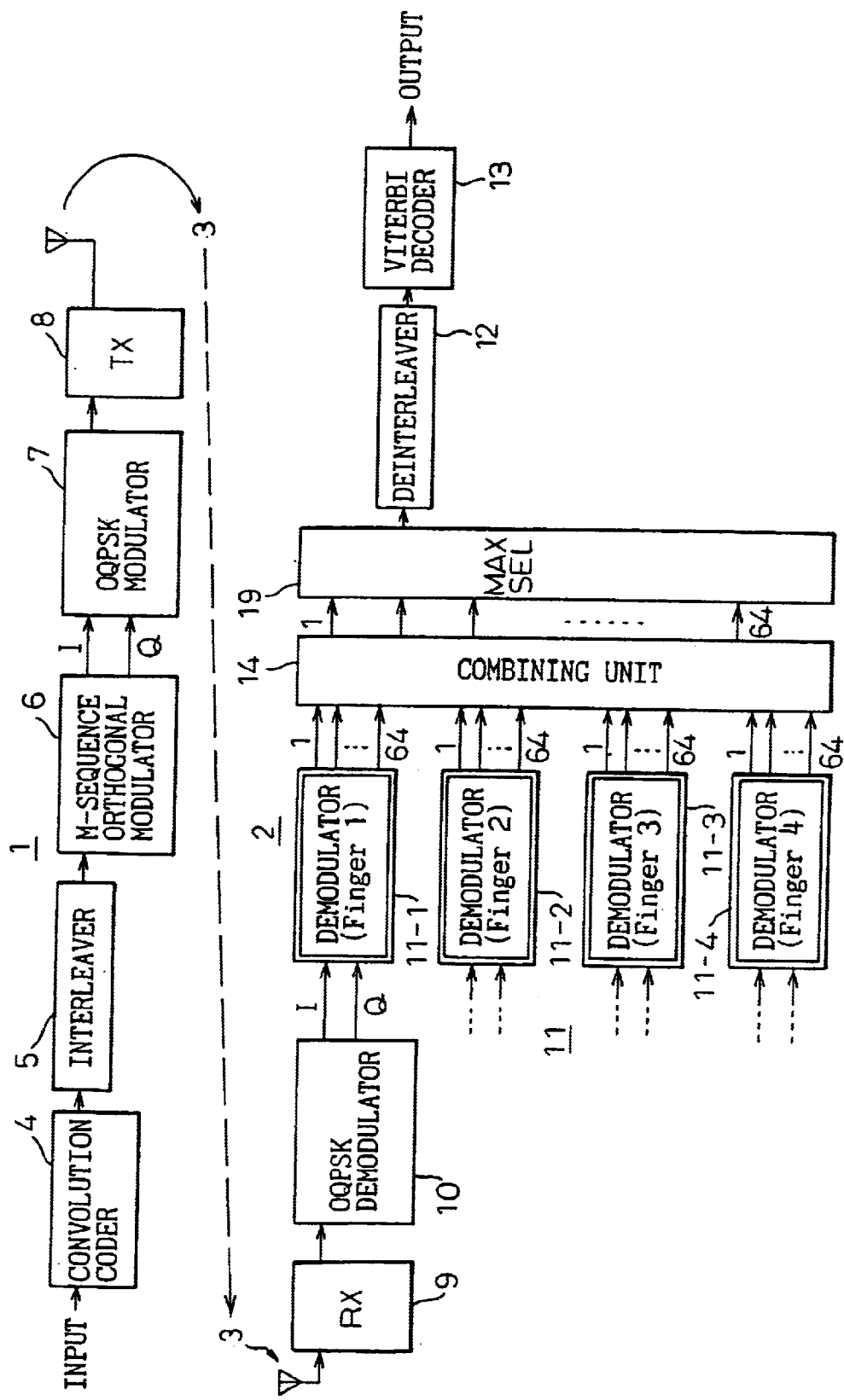
FIG. 37 is a view of a known reverse-link demodulating unit.

FIG. 37 is a view of a known reverse-link demodulation unit.

In FIG. 37, the blocks at the top show a terminal of subscriber side, while the blocks at the bottom show a base station. Usually, a plurality of terminals 1 and a plurality of base stations 2 are connected via radio transmission paths 3.

At the terminal 1, first an input signal such as a voice signal from a subscriber is input to a convolution coder 4 and convolution coding carried out there. The output thereof is further input to an interleaver 5. The interleaver 5 functions to make the data output from the convolution coder 4 discrete in the time domain. This is for preventing a burst error causing continuous errors by making the data discrete in the time domain. The output of this interleaver 5 is input to an M-sequence orthogonal modulator 6 next.

The M-sequence orthogonal modulator 6 is a circuit based on the IS-95 standard and realizes the so-called "spread spectrum" procedure. Specifically, for example, it spreads a 6-bit input code (Walsh number) to a 64-bit output code (Walsh code), divides the output code into an I-channel (Ich) and a Q-channel (Qch) and inputs them to an offset quadrature phase shifting keying (OQPSK) modulator 7. This Walsh code will be explained in detail later in the drawings, but usage of this Walsh code is extremely advantageous in the point that codes can be separated from each other, though there is the accompanying disadvantage that the frequency is increased 64/6-fold and the transmission bandwidth is expanded.

The OQPSK modulator 7 spreads, using a short code and a long code, each of the Walsh codes input from the M-sequence orthogonal modulator 6 via an I-channel (Ich) and a Q-channel (Qch) and then performs a OQPSK modulation as well. This OQPSK modulated signal is a signal where the Ich signal and the Qch signal are shifted from each other by exactly a phase $\pi$. When an eye pattern of the Ich signal becomes the maximum, the eye pattern of the Qch signal becomes the minimum (or vice versa). Due to this, a peak level of the signal can be lowered.

Therefore, a transmitter (TX) 8 of the last stage of the terminal 1 receives the output from the OQPSK modulator 7 which reduced the peak level of the signal and can transmit a radio output having a reduced distortion of the transmission power to the radio transmission path 3.

The base station 2 receives the transmitted radio output at an initial stage first receiver (RX) 9 and converts the radio input signal received at this receiver 9 to an IF signal by frequency conversion. This IF signal is input to a next OQPSK demodulator 10 where it is subjected to an inverse operation to that at the OQPSK modulator 7 mentioned before and then becomes a digital Ich input signal (baseband signal) and Qch input signal (baseband signal).

The correlation values for every Walsh number of these Ich and Qch input signals (baseband signals) are further calculated by the finger demodulating unit 11 and these calculated correlation values are input to the next combining unit 14. This finger demodulating unit 11 comprises a plurality of (four in this case) demodulators, that is, a demodulator (Finger 1) 11-1 to a demodulator (Finger 4) 11-4.

The combining unit 14 performs a processing referred to as "RAKE combining". It considers the fact that a radio output reaches an antenna of the reception side (base station 2) from the antenna of the transmission side (terminal 1) by multiple paths, i.e., directly or after reflecting from a building, mountain, etc. In the case of the present figure, a maximum of three types of delay are given to the received signal. These delayed signals are combined and thus a SIR (signal-to-interface ratio) is improved.

The correlation values for every Walsh number combined by the combining unit 14 are input to a maximum energy selecting unit (MAX SEL) 19. One Walsh number having the maximum correlation value is output from the MAX SEL 19 and then input to a deinterleaver 12. Here, the signal made discrete in the time domain at the interleaver 5 of the transmission side (terminal 1) is returned to its original form. Further, a Viterbi decoder 13 performs error correction to obtain the intended signal as the output. Next, a more detailed explanation will be made of the finger demodulating unit 11.

Figure 38:
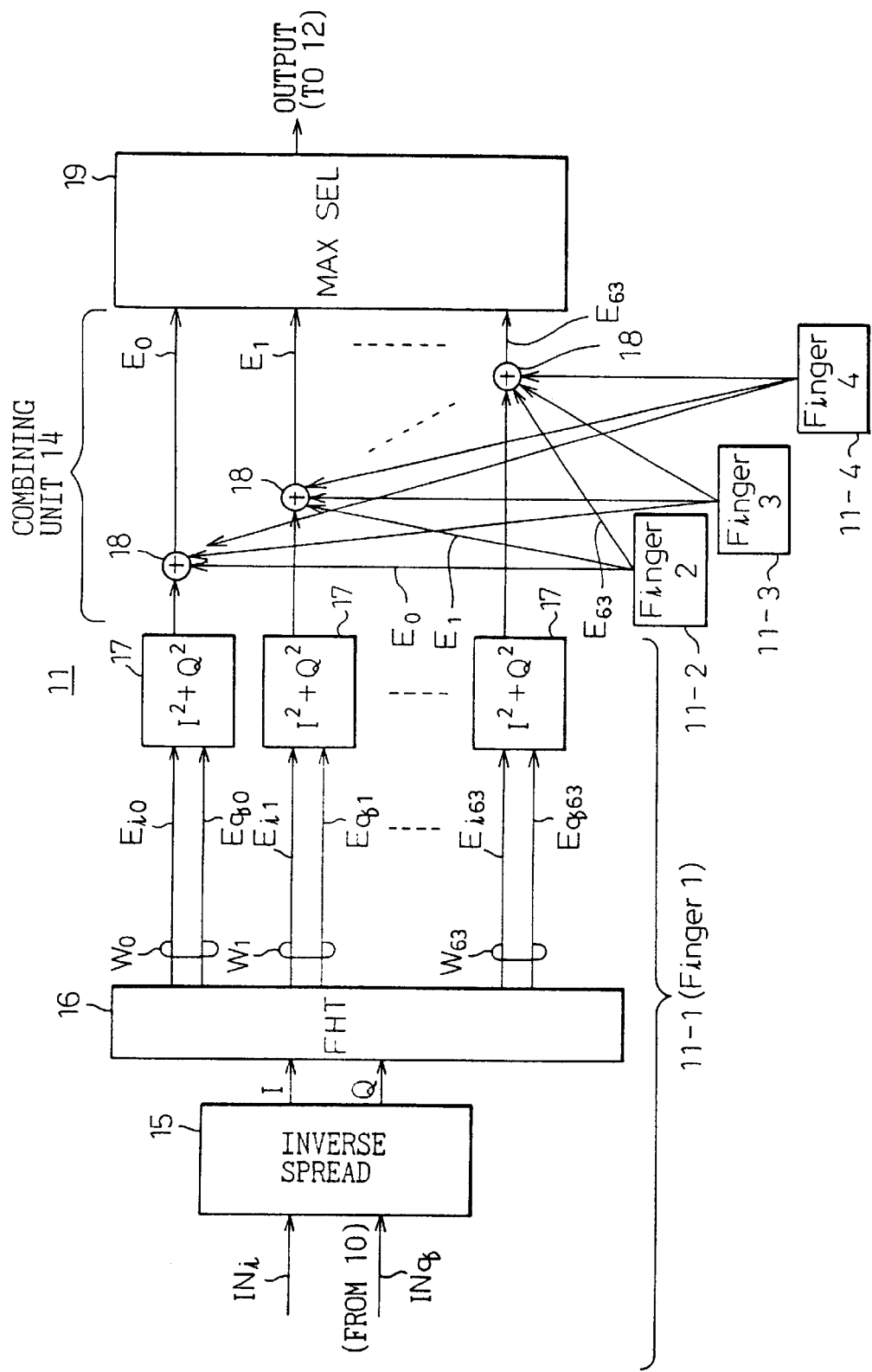
FIG. 38 is a view of a concrete configuration of a finger demodulating unit 11 shown in FIG. 37.

FIG. 38 is a view of a concrete structure of the finger demodulating unit 11, the combining unit 14 and the MAX SEL 19 shown in FIG. 37. In the figure, reference numeral 15 is the inverse spread unit. This inverse spread unit 15, based on IS-95, performs a first inverse spread by multiplying a PN code representing a short code of the base station 2 and input signals (INi, INq) and further performs a second inverse spread by multiplying a PN code representing a long code of a subscriber and the input signals thereof (INi, INq).

The inverse spread input signals (INi, INq) are input to the next Fast Hadamard Transform (FHT) unit 16. This performs Fast Hadamard Transform processing (processing for obtaining the correlation between the input signal and the predefined 64 kinds of Walsh codes) to the input signals (INi, INq) to obtain correlation values for every Walsh number (W0, W1, ..., W63). These correlation values are represented as electric powers Ei0, Eq0; Ei1, Eq1; ..., Ei63, Eq63. Thus, 64 correlation electric powers (Ei, Eq) are obtained for each of the Ich's and Qch's.

The correlation electric powers (Ei, Eq) of the Ich's and Qch's are further input to the energy calculating units ($I^2+Q^2$) 17 provided for every Walsh number (W0, W1, ..., W63). There, correlation energies (E0, E1, ..., E63) for every Walsh number from which the phase component of the input signal is eliminated are obtained.

In the figure, the process for finding the correlation energies (E0, E1, ..., E63) at the demodulator (Finger 1) 11-1 was concretely shown, but a similar process is executed at the other demodulators (Finger 2 to Finger 4) 11-1 to 11-4 as well. Results having the same Walsh number are combined with each other. The combining units 14, consisting of a plurality of adders, provided in correspondence with each Walsh number perform this task.

The correlation energies (E0, E1, ..., E63) from the adders 18 are input to the maximum energy selecting unit (MAX SEL) 19. One correlation energy having the maximum energy among 64 is selected. When assuming this is W1, it is judged that the transmission side (terminal 1) transmitted a Walsh code corresponding to Walsh No. 1, and this Walsh No. 1 is output. Note that where a Dual Max procedure defined in IS-95 is used, it is output from the selecting unit 19 as a Viterbi soft decision value.

A slightly more detailed explanation will be made of the "correlation" mentioned above. First, when viewing the transmission side (terminal 1), the transmission side divides the transmission signal for every 6 bits and regards 64 numbers expressed by the 6 bits as Walsh numbers, selects one Walsh code corresponding to its Walsh number among 64 Walsh codes and transmits the selected Walsh code after performing the predetermined modulation thereto. This is shown in the following table.

TABLE

| | (Walsh Codes) | | | | |
|---|---|---|---|---|---|
| Walsh chip<br>Walsh Number | 0 | 1 | 2 | ... | 63 (Walsh chip) → |
| W0 | 0 | 0 | 0 | ... | 0 |
| W1 | 0 | 1 | 0 | ... | 1 |
| : | : | : | : | : | : |
| W63 | 0 | 1 | 1 | ... | 0 |

Looking at the middle W32, this is comprised of 32 consecutive "0's" and 32 consecutive "1's". Note that the above table is defined in IS-95.

Note that each Walsh code is consisted of 64 Walsh chips and we will refer this Walsh code consisting of the 64 Walsh chips as one Walsh symbol.

It should be noted regarding the Walsh codes shown in the above table that if the correlation is obtained for any Walsh code with another Walsh code, the correlation value becomes 50%, that is, uniform.

The Fast Hadamard Transform unit 16 of the reception side (base station 2) can find the correlation for 64 codes at a high speed. The one having the strongest correlation in the end is decided to be the correct Walsh number.

Figure 39:
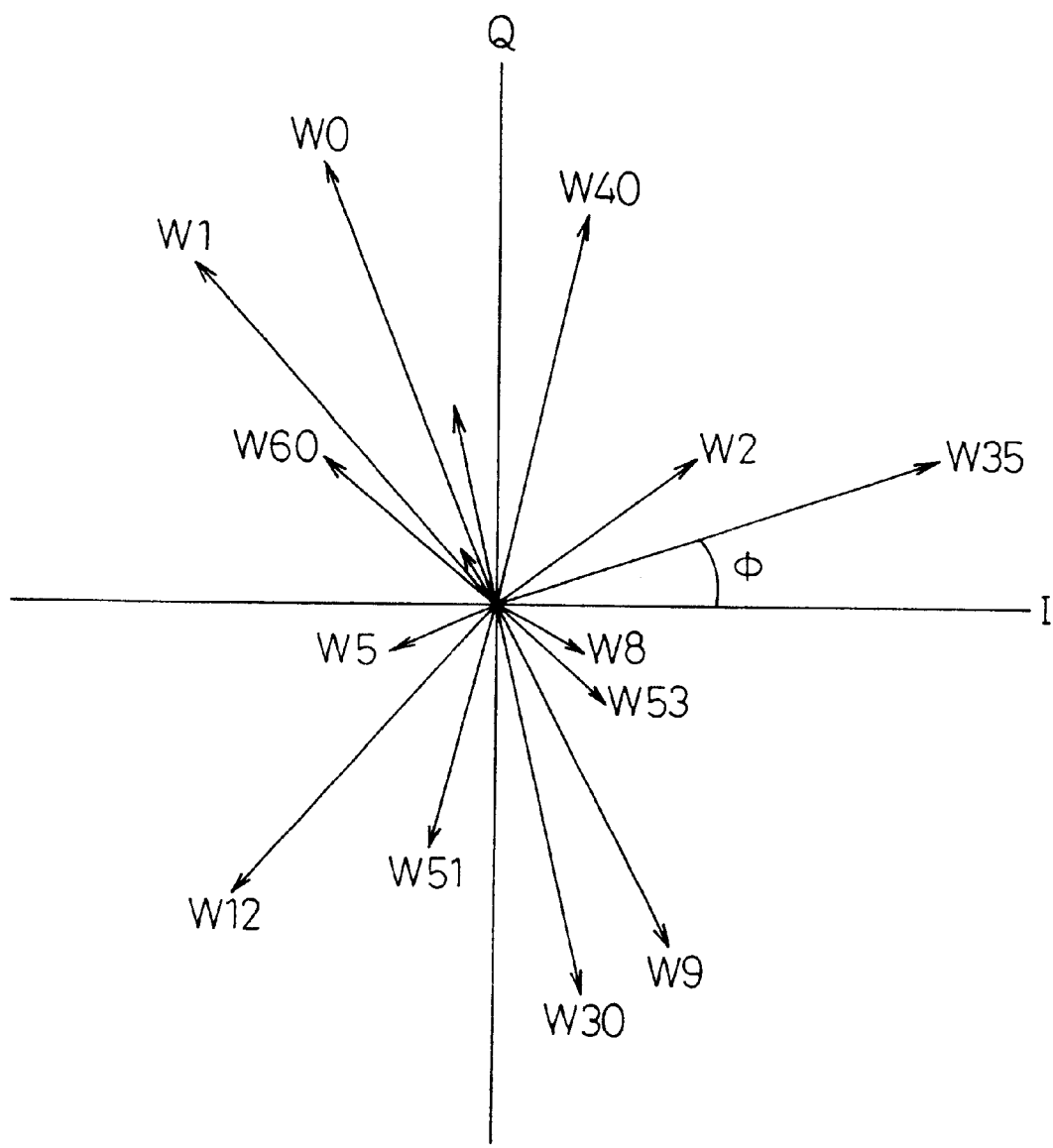
FIG. 39 is a view of correlation values for every Walsh number on a reception side (base station 2) represented on a plane in which Ich (Ei0–Ei63) is indicated on the abscissa and Qch (Eq0–Eq63) is indicated on the ordinate.

FIG. 39 is a view of correlation values for every Walsh number at the reception side (base station 2) on the plane in which an Ich (Ei0–Ei63) is indicated at the abscissa and a Qch (Eq0–Eq63) is indicated at the ordinate. Namely, the output signal from the Fast Hadamard Transform unit 16 of FIG. 38 is viewed on the phase plane. Walsh No. 0, No. 1, No. 2, ..., No. 35, ..., No. 40, etc. are shown as vectors. A large number of terminals 1 send a variety of signals at random through a certain radio space. Accordingly, the correlation electric power appears with the pattern as illustrated on the phase plane.

The asynchronous detection system of the related art eliminates the phase components for the variety of vectors represented in FIG. 39 and finds their magnitudes. Namely, the system calculates $Ei0^2+Eq0^2$ and so on by using the energy calculating unit 17 of FIG. 38 and finds magnitudes of vectors indicating the correlation energies for every Walsh number.

Figure 40:
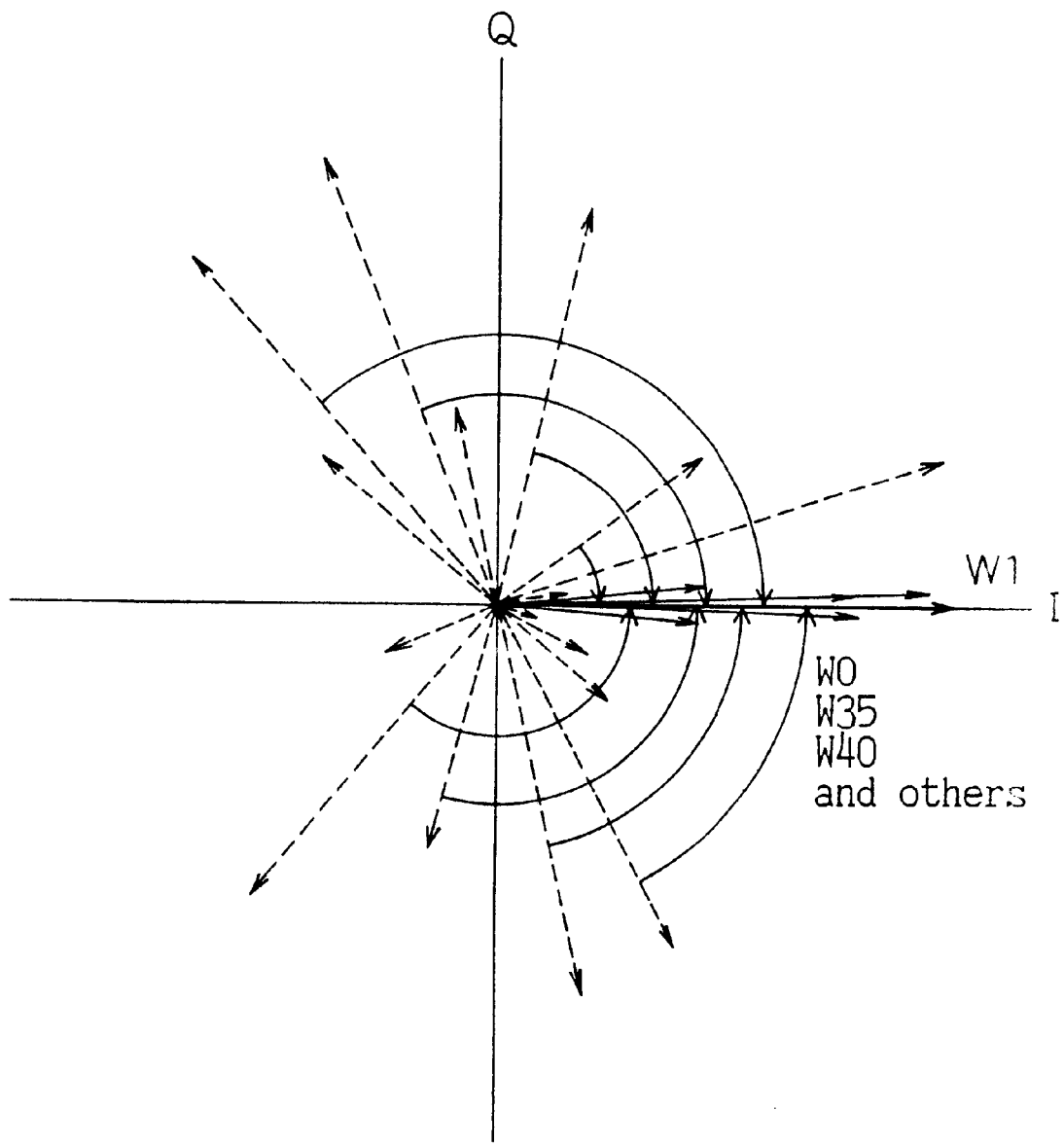
FIG. 40 is a view of an example in which an output from an energy calculating unit 17 in FIG. 38 is represented on the phase plane.

FIG. 40 is a view of an example in which the output from the energy calculating unit 17 in FIG. 38 is represented on a phase plane. By the above calculation, vectors (W0, W1, . . . ) shown in FIG. 39 are all concentrated on the I axis and magnitudes (correlation energies) of the vectors are obtained. The concentrated vector is output by the 64 energy calculating units 17 in each of the demodulators (Fingers).

As explained earlier, in a demodulation method in a radio communications system using the M-sequence orthogonal modulation of the related art, a square sum of correlation values of respective I-channel (Ich) and Q-channel (Qch) are calculated to obtain a vector and a judgement of a transmitted Walsh code (Walsh number) is performed according to the magnitude of the above vector. For this reason, if a plurality of Walsh numbers each having the same level of correlation energy exist, the accuracy of judgement is degraded due to interference, noise from a radio transmission path, or the like, and therefore the error rate characteristic, for example, the Eb/No vs BER characteristic, ends up being considerably degraded. That is, the quality of demodulated data is degraded.

On the other hand, the synchronous detection system has been proposed as an alternative to the asynchronous detection system. The synchronous detection system is a system predicated on the assumption that a reception side (base station 2) can obtain by some means or another the phase information on a phase plane of signals of respective Walsh numbers transmitted from a transmission side (terminal 1) and rotates one vector shown in FIG. 39 by exactly a predetermined phase angle corresponding to the phase information to align the vector with one axis, for example, the I-axis, and at that time rotates other vectors together by exactly that predetermined phase angle. When doing this, the situation where a large number of variety of vectors end up being concentrated at one axis (I-axis), as shown in FIG. 40 (asynchronous detection system) is avoided, and the error rate characteristic is naturally improved. However, according to the synchronous detection system, there is the disadvantage of a major increase in the size of the hardware.

In consideration with the above problem, the present invention provides a reception apparatus, and further a method and an apparatus for achieving demodulation in a radio communications system using M-sequence orthogonal modulation capable of achieving a good characteristic near the error rate characteristic obtained in the case of a synchronous detection system while suppressing an increase in the size of the hardware.

Figure 1:
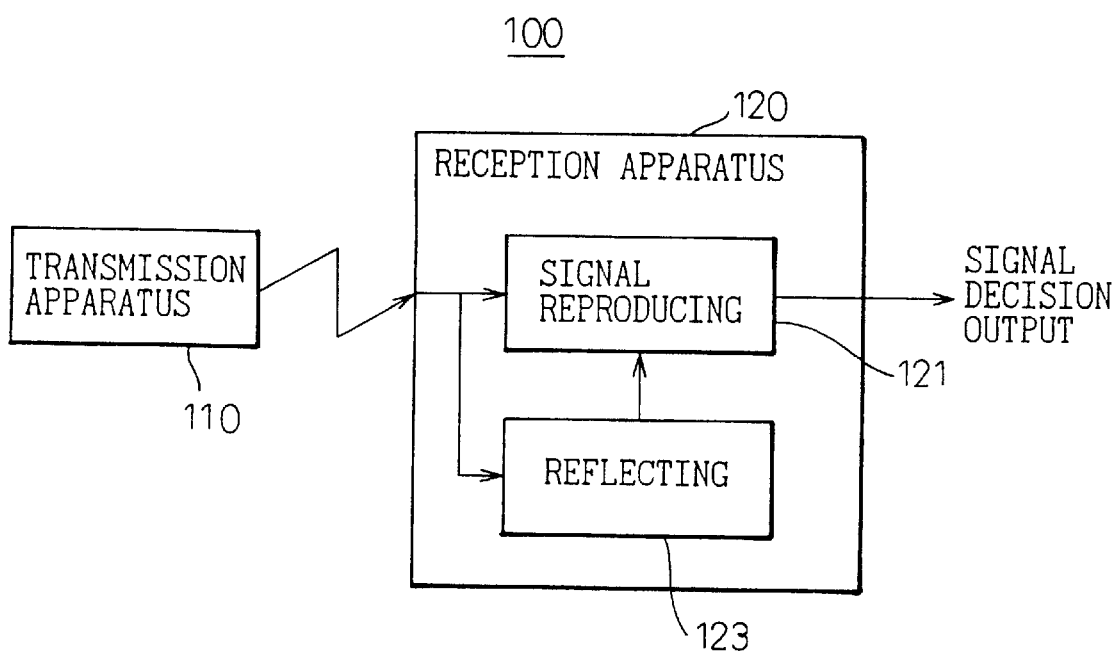
FIG. 1 is a view of the basic configuration of a radio communication system according to the present invention.

FIG. 1 is a view of the basic configuration of a radio communication system according to the present invention.

In the figure, a reference numeral 100 indicates the radio communications system according to the present invention, which is comprised of a transmission apparatus 110 and a reception apparatus 120.

Specifically, the radio communications system 100 is comprised of:
  (i) the transmission apparatus 110 for transforming data to be transmitted in accordance with predetermined codes and further performing a predetermined modulation to the transformed data to transmit the same as a modulated wave, and
  (ii) the reception apparatus 120 provided with a signal reproducing means 121 for performing a signal decision for a received signal by using a correlation between the predetermined codes and the received signal obtained by demodulating the transmitted modulated wave and a reflecting means 123 for reflecting a correlation to the signal decision at the signal reproducing means 121, which correlation is obtained between the predetermined codes and the received signal received before or after, in the time domain, the present received signal.

More specifically, the reception apparatus 120 is comprised of:
  a signal reproducing means 121 for performing a signal decision with respect to a received signal by using a correlation between predefined codes having correlation characteristics and the received signal obtained by demodulating a modulated wave from a transmission side; and
  a reflecting means 123 for reflecting a correlation to the signal decision at the signal reproducing means, which correlation is obtained between said predefined codes and the received signal received before or after, in the time domain, the present received signal.

Further specifically, the reception apparatus 120 is comprised of:
  a signal reproducing means 121 for performing a signal decision for a received signal by using a correlation between predefined codes having correlation characteristics and the received signal obtained by demodulating a phase modulated wave transmitted from a transmission side; and
  a reflecting means 123 for reflecting a correlation for the signal decision at the signal reproducing means 121, which correlation is obtained between said predefined codes and the received signal received before or after, in the time domain, the present received signal.

Note that Walsh codes may be given as one example of the above-mentioned predefined codes. In the embodiments explained later, this Walsh code will be taken as an example.

The present invention will be explained in further detail and more concretely, by referring to FIG. 2.

Figure 2:
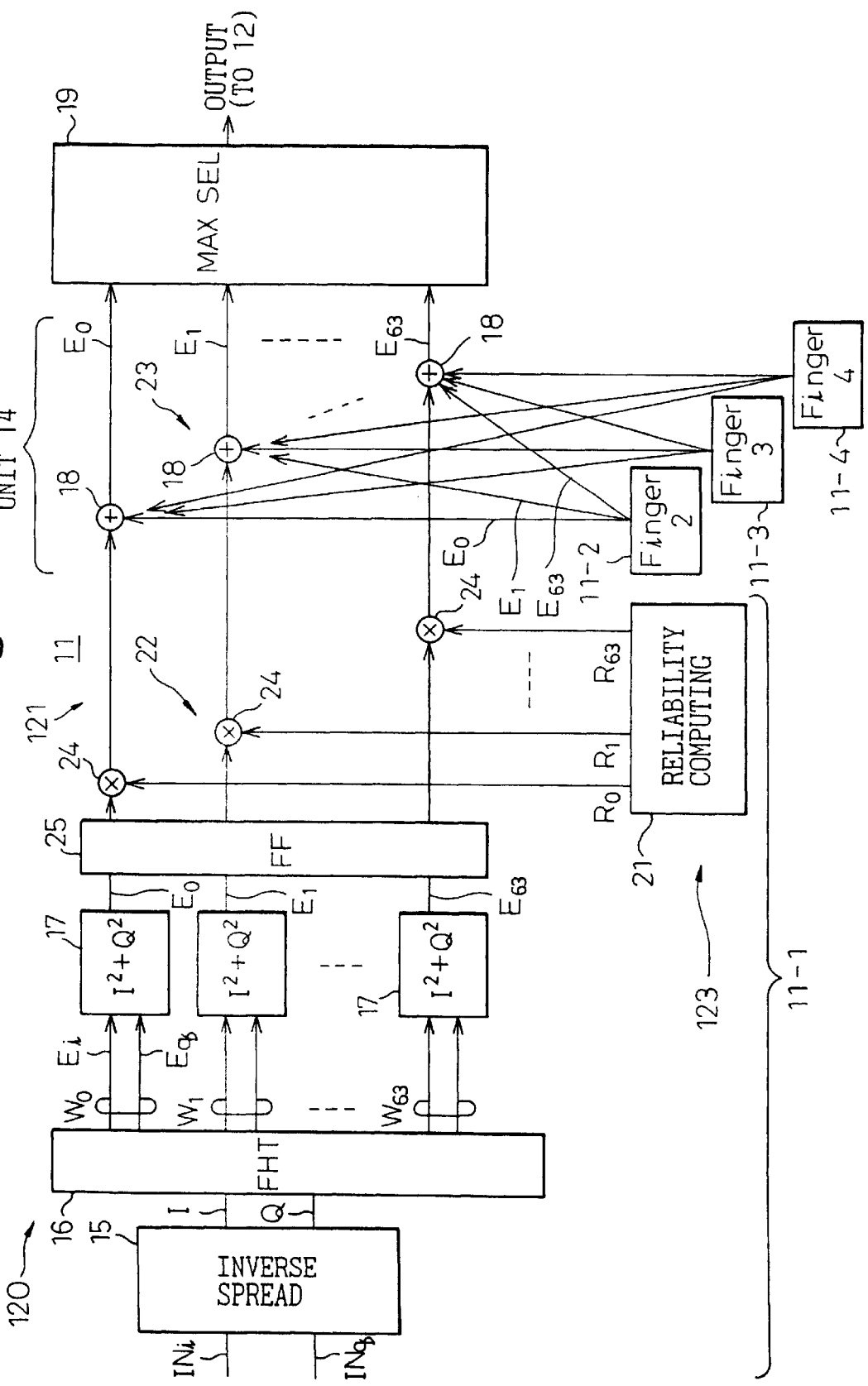
FIG. 2 is a view of the basic configuration of a demodulation apparatus for realizing a demodulation method according to the present invention.

FIG. 2 is a view of the basic configuration of a demodulation apparatus for realizing the demodulation method according to the present invention. Note that similar constituent elements are indicated by the same reference numerals or symbols throughout all of the figures.

In the finger demodulating unit 11 shown in FIG. 2, the inverse spread unit 15, Fast Hadamard Transform unit 16, energy calculating unit 17, the combining unit 14, and the maximum energy selecting unit 19 are as already explained by referring to FIG. 38.

Accordingly, the parts newly introduced in FIG. 2 are a reliability computing means 21 and a correcting means 22. The demodulation method according to the present invention which can be executed by these newly introduced parts (21, 22) is as follows.

This demodulation method is one which, in the same way as explained by referring to FIG. 37 and FIG. 38, has radio output signals subjected to M-sequence orthogonal modulation and transmitted from the transmission side as Walsh codes corresponding to Walsh numbers received at reception units (9, 10, 15) and reproduced as I-channel input signals and Q-channel input signals, obtains correlation energies (E0, E1, . . . ) for every Walsh number from the output after Fast Hadamard Transform (16), selects (at 19) the maximum correlation energy among these correlation energies, and demodulates the Walsh number corresponding to this as the received signal. Here, the fundamental steps characterizing the present invention are the following first to third steps:

First step: Computing the certainty of each correlation energy for every Walsh number as its reliability (R0, R1, . . . ).

Second step: Introducing the reliabilities (R0, R1, . . . ) corresponding to the correlation energies to obtain the corrected correlation energies.

Third step: Using the obtained corrected correlation energies to select the maximum correlation energy from among them.

Further, the demodulation method according to the present invention is executed by the following first to fourth steps.

When the demodulation is carried out by the finger demodulating unit (11) comprised of the plurality of demodulators (11-1 to 11-4) connected to each other in parallel, each demodulator, 1'st step: Computes the certainty of the value of each correlation energy as the reliability (R0, R1, . . . ) for the correlation energy for every Walsh number (same as above first step).

2'nd step: Introduces the reliabilities (R0, R1, . . . ) corresponding to the correlation energies to obtain. the corrected correlation energies (same as above second step).

3'rd step: Collects and combines the corrected correlation energies obtained at all said demodulators for every Walsh number.

4'th step: Uses the corrected correlation energies obtained by that combination to select the maximum correlation energy (corresponding to above third step).

Referring to FIG. 2, the first step (also same for 1'st step) is executed by the reliability computing means 21. The figure shows a situation where 64 reliabilities R0, R1, . . . , R63 are output corresponding to 64 Walsh numbers (W0, W1, . . . , W63). An FF unit 25 is provided in order to compensate for the delay of the computation time by this computing means 21, however this may be provided, if necessary. Further, the above second step (also same for 2'nd step) is executed by the correcting means 22. The correcting means 22 can be constituted by an adder unit, a multiplier unit, or the like. In the figure, the multiplier unit is represented by reference numeral 24. Furthermore, the above 3'rd step is executed by the combining means 23 of the figure. This combining means 23 is the already mentioned combining unit 14 and acts as the adder unit.

Still further, the above third step (also same for 4'th step) is executed by the maximum energy selecting unit (MAX SEL) 19 as in the related art.

The output from the Fast Hadamard Transform unit 16 originally or inherently shows the certainty of the energy corresponding to each Walsh number, but the present invention makes the certainty further reliable from viewpoints different from the above. This is the reliability (R0, R1, . . . , R63). In the final analysis, in the present invention, the correlation energy Ewn finally to be applied to the maximum energy selecting unit 18 is represented by the following equation (1):

$$Ewn = \sum_{f} \{(Eiwn^2 + Eqwn^2) \times Rwn\} \quad (1)$$

In equation (1), the suffixes wn represent 0, 1, . . . , 63 in the Walsh numbers W0, W1, . . . , W63, and Ewn is the corrected correlation energy for a certain Walsh number wn. Eiwn is the correlation electric power of the I-channel, Eqwn is the correlation electric power of the Q-channel, the correlation energy ($Eiwn^2 + Eqwn^2$) is obtained from them, and further the reliability Rwn based on the present invention is introduced with respect to this correlation energy. In this case, the reliability Rwn is multiplied with the above energy.

The values of ($Eiwn^2 + Eqwn^2$)×Rwn obtained here are combined for all demodulators (Fingers) 11-1 to 11-4 by the combining means 23 of FIG. 2. Σ of equation (1) indicates the combination. The values are combined over f=1 to f=4.

As mentioned above, the demodulating apparatus in a radio communications system using M-sequence orthogonal modulation based on the present invention is constituted by:

a reliability computing means 21 for computing the certainty of the value of each correlation energy as the reliability for the correlation energy for every Walsh number;

a correcting means 22 for introducing corresponding reliabilities (R1, R0, . . . ) with respect to the correlation energies to obtain corrected correlation energies; and a maximum energy selecting means 19 for using the obtained corrected correlation energies to select the maximum correlation energy from among obtained corrected correlation energies.

Further, when the above-mentioned demodulation is carried out by the finger demodulating unit 11 comprising a plurality of demodulators 11-1 to 11-4 connected to each other in parallel, the apparatus is configured having, in front of the maximum energy selecting means 19, a combining means 23 for collecting and combining the corrected correlation energies obtained at all demodulators 11-1 to 11-4 for every Walsh number.

Thus, a demodulating apparatus is realized exhibiting an improved error rate characteristic while suppressing the increase of the size of the hardware to the extent of adding the reliability computing means 21.

Below, an explanation will be made of some embodiments, and examples of application thereof, of the reliability computing means 21.

Referring to FIG. 39 again, a receiving phase angle Φ (shown for wn=35 as one example) of the phase modulation signal from the transmission side can be found from the correlation electric power Eiwn of the I-channel and the correlation electric power Eqwn of the Q-channel. This is shown in the following equation (2).

$$\cos\Phi = Eiwn \quad (2)$$
$$\sin\Phi = Eqwn$$
$$\downarrow$$
$$\Phi = \tan^{-1}(\sin\Phi/\cos\Phi)$$
$$= \tan^{-1}(Eiwn/Eqwn)$$

In this embodiment of the present invention, it is assumed that the reliabilities R (R0, R1, . . . , R63) are computed by utilizing the information of this receiving phase angle Φ (phase angle information).

Figure 3:
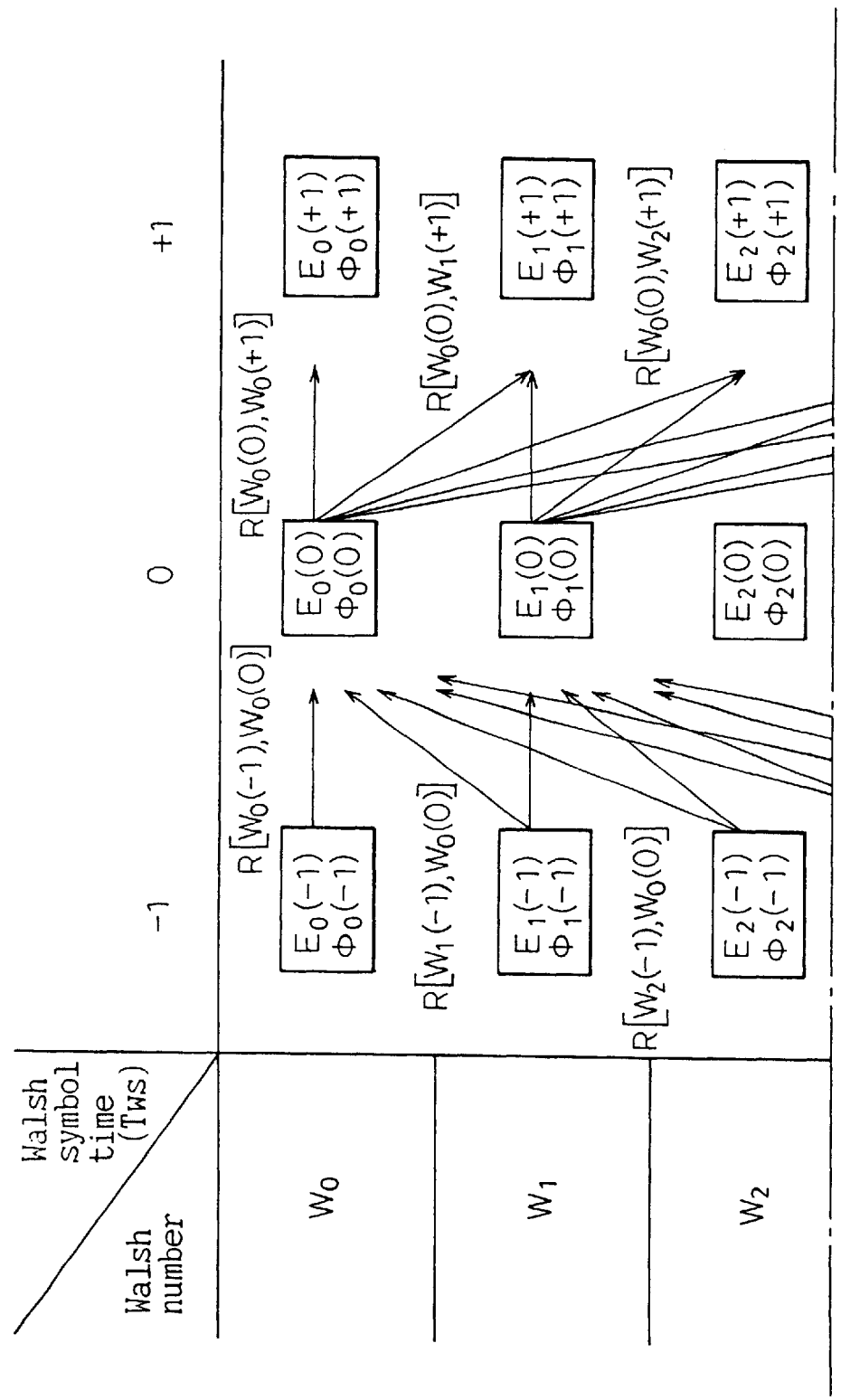
FIG. 3 is a first part of a view for explaining the principle of derivation of a reliability R.
Figure 4:
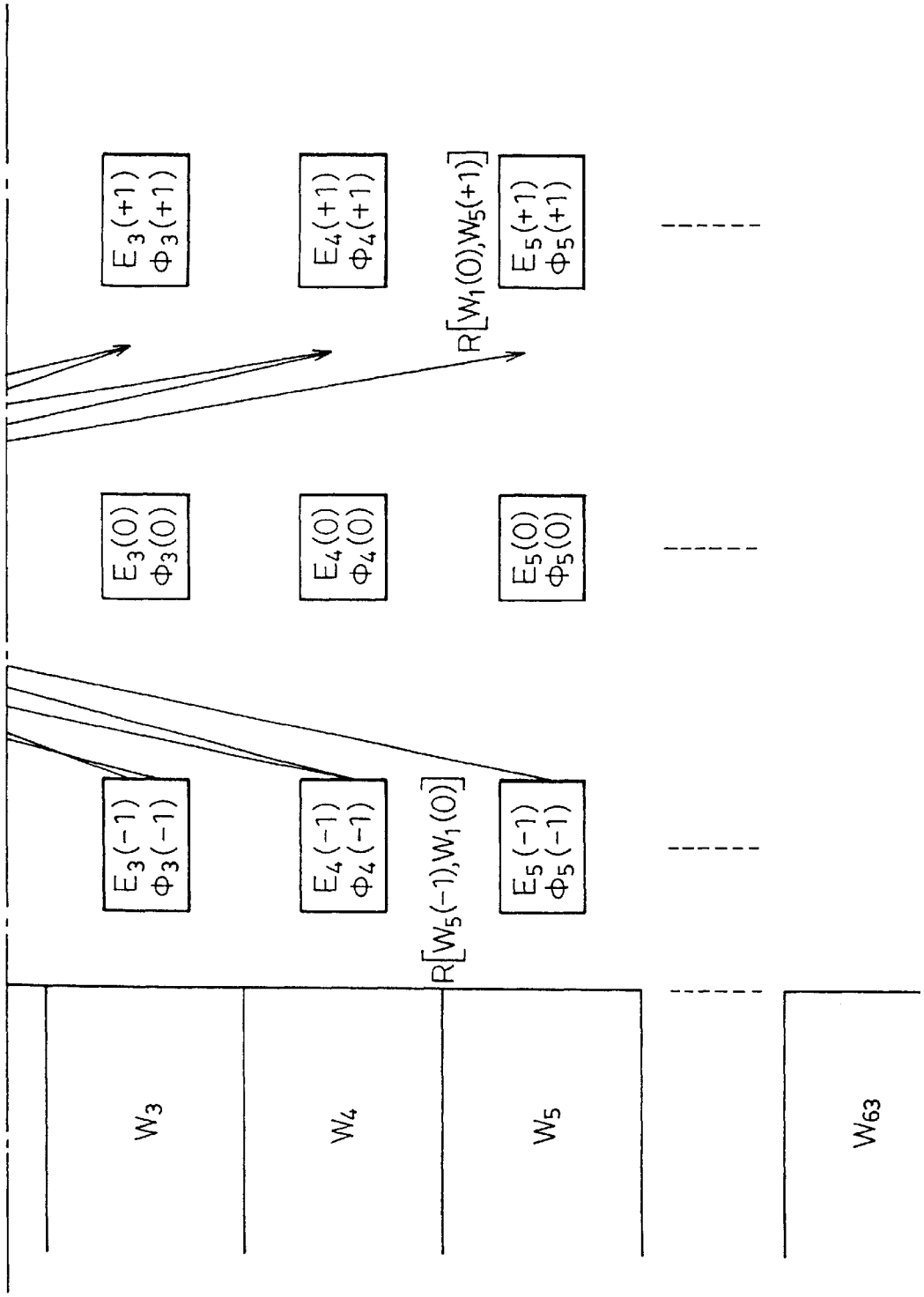
FIG. 4 is a second part of a view for explaining the principle of derivation of the reliability R.

FIG. 3 and FIG. 4 are first and second parts of a view for explaining the principle of derivation of the reliability R.

In FIG. 3 and FIG. 4, the ordinate indicates the Walsh numbers (wn), that is, W0, W1, W2, . . . , W63. The abscissa indicates the Walsh symbol times (Tws), where Tws=0 represents the present reception sequence (reception sequence having one Walsh symbol length constituted by the 64 Walsh chips) which is the object of the signal decision at the present time.

Figure 5:
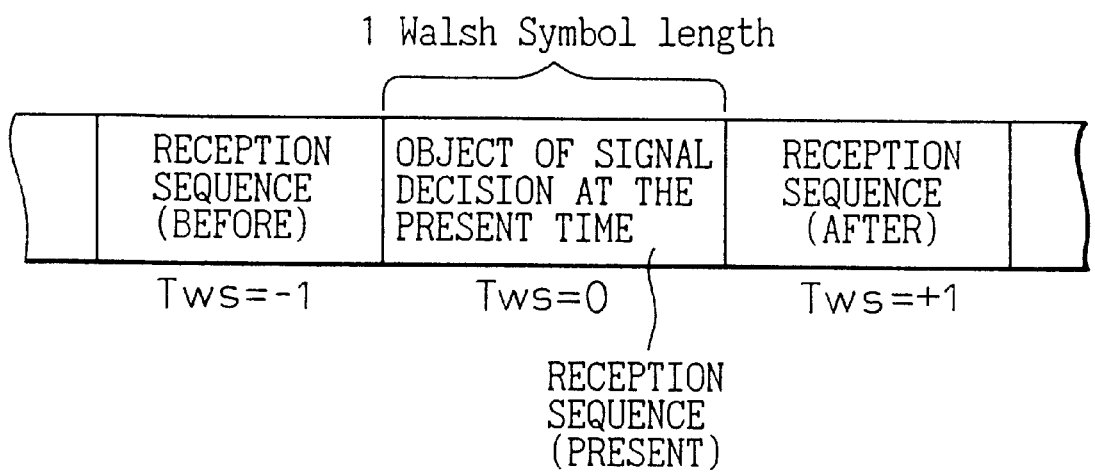
FIG. 5 is a view for illustrating the reception sequence at the present time and the reception sequences before and after the present time.

Tws=−1 represents the reception sequence which is the object of the signal decision just before the Tws=0, and Tws=+1 represents the reception sequence which is the object of the signal decision right after the Tws=0. FIG. 5 illustrates these reception sequences.

Note that Φ0(−1), Φ(0) and Φ0(+1) indicate the receiving phase angles for the Walsh number W0 at Tws=−1, 0 and +1, respectively.

Further, $$R[W0(-1), W0(0)]$$

shown at the top of FIG. 3 indicates the reliability in the transition of the signal from Tws=−1 to Tws=0 for the Walsh No. W0, and $$R[W0(0), W0(+1)]$$

indicates the reliability in the transition of the signal from Tws=0 to Tws=+1 for the Walsh No. W0.

Accordingly, FIG. 3 and FIG. 4 show the transitions of signals from Tws=−1 to Tws=0, that is, the transition of the correlation energy and the transition of the receiving phase angle for Walsh Nos. W0, W1, . . . and, at the same time, show the transitions of signals from Tws=0 to Tws=+1 for the Walsh Nos. W0, W1, . . . , respectively.

In FIG. 3, attention is paid to the signal having the Walsh No. 0 (W0) at Tws=0. When assuming that the signal (E0(0), Φ0(0)) of W0 at the Tws=0 is correct (W0 is transmitted from the transmission side) (since if it is correct has not yet been ascertained), it can be considered that the signal changed from either of the signals of W0, W1, . . . , W63 at the preceding Tws=−1 to W0 at Tws=0. Then, further, it can be considered that the signal (E0(0), Φ0(0)) at the Tws=0 will change to either of the signals of W0, W1, . . . , W63 at the following Tws=+1. These changes are represented by arrows in FIG. 3 and FIG. 4.

Here, consideration will be given to the change of the receiving phase angle Φ. The magnitude of the change of this receiving phase angle Φ within 1 Walsh symbol time (Tws) is very small. The reliability in the present embodiment is computed taking note of this fact.

Namely, taking as an example the IS-95 system mentioned above, where

Walsh symbol frequency=4,800 Hz and deviation of reference carrier frequency≦300 Hz, the receiving phase angle Φ changing within 1 Walsh symbol time (Tws) is about 22 deg (22°) at most. Then, it can be considered that the smaller the change of the receiving phase angle Φ, that is, the phase difference angle, the higher the reliability (R) of the signal transitions indicated by arrows in FIG. 3 and FIG. 4. Note that the "deviation of the reference carrier frequency" means the difference of the reference carrier frequency between the transmission side and the reception side.

As described above, the derived reliability (R) can be represented by the following equation (3):

$$R[W0(-1), W0(0)] = (180 \text{ deg} - |\Phi0(0) - \Phi0(-1)|)/180 \text{ deg} \quad (3)$$

Note that the method of expression used in equation (3) is just one example. The phase difference angle is represented by |Φ0(0)−Φ0(−1)| in equation (3).

Equation (3) shows the reliability R as a value of 0 to 1 for easy understanding. Namely, it is normalized by 180 deg. For example, if the phase difference angle is 0 deg, the reliability (R) becomes the maximum value 1, while conversely, if it is 180 deg, the reliability (R) becomes the minimum value 0. Along with the change of the phase difference angle from 180 deg→0 deg, the reliability (R) becomes from 0 to 1.

The reliability (RO) in equation (3) was represented by focusing on the Walsh No. 0 (W0), but, similarly, 64 reliabilities in total are computed, for example, W1(−1)→W0(0), W2(−1)→W0(0), W3(−1)→W0(0), . . . , W63(−1)→W0(0). This is represented by the following equation (4). Namely, the reliability R0(−1, 0) for the signal of W0(0) is:

$$R0(-1, 0) = \max\{R[W0(-1), W0(0)], R[W1(-1), W0(0)] \ldots R[W63(-1), W0(0)]\} \quad (4)$$

Note that max { } means to select the maximum reliability from among 64 reliabilities in { }. The maximum reliability (R) is selected in this way because since it is assumed that the transition of the signal providing the related maximum reliability (if R1 is the maximum, the transition of W1→W0) is correct, the maximum can be obtained.

Thus, the reliability of the signal W0(0) is found and the corrected correlation energies (E0, E1, . . . ) are defined by referring to equation (1).

Note that equation (4) was shown for the signal W0(0), but becomes the following equation (5) if the reliability Rn thereof is generally represented for any signal Wn (n=0,1, 2, . . . , 63).

$$Rn(-1, 0) = \max\{R[W0(-1), Wn(0)], R[W1(-1), Wn(0)] \ldots R[W63(-1), Wn(0)]\} \quad (5)$$

Further, equation (3) was shown for the transition from the signal of W0(−1) to the signal of W0(0), so when generally shown as the reliability in the transition from any signal of Wn(−1) to the signal of W0(0), it becomes as in the following equation (6):

$$R[Wn(-1), W0(0)] = (180 \text{ deg} - |\Phi0(0) - \Phi n(-1)|)/180 \text{ deg} \quad (6)$$

The above explanation was made for the case of finding the reliability (R) by taking note of the transition of the signal from Tws=−1 to Tws=0 of the Walsh symbol time in FIG. 3, but it is also possible to find the reliability (R) by taking note of the transition of the signal of the Walsh symbol time in FIG. 3 of from Tws=0 to Tws=+1. In the latter case, equation (3) is modified as follows:

$$R[W0(0), W0(+1)] = (180 \text{ deg} - |\Phi0(+1) - \Phi0(0)|)/180 \text{ deg} \quad (7)$$

Further, equation (4) is modified to the following equation (8):

$$R0(0, +1) = \max\{R[W0(0), W0(+1)], R[W1(0), W0(+1)] \ldots R[W63(0), W0(+1)]\} \quad (8)$$

Furthermore, equation (5) is modified to the following equation (9):

$$Rn(0, +1) = \max\{R[W0(0), Wn(+1)], R[W1(0), Wn(+1)] \ldots R[W63(0), Wn(+1)]\} \quad (9)$$

Further, equation (6) is modified to the following equation (10):

$$R[Wn(0), W0(+1)] = (180 \text{ deg} - |\Phi0(+1) - \Phi n(0)|)/180 \text{ deg} \quad (10)$$

Thus, according to the present invention, as exemplified in equations (3) to (6), the reliability (R) can be obtained from the maximum reliability among reliabilities computed based on the phase difference angle between the receiving phase angle Φ(0) at the present Walsh symbol time Tws=0 and the receiving phase angle Φ(−1) at the Walsh symbol time Tws=−1 preceding this (0), detected for every Walsh number (W0, W1, . . . , W63).

Further, as exemplified in equations (7) to (10), it is also possible to obtain the reliability (R) from the maximum reliability among reliabilities computed based on the phase difference angle between the receiving phase angle Φ(0) at the present Walsh symbol time Tws=0 and the receiving phase angle Φ(+1) at the Walsh symbol time Tws=+1 following this (0), detected for every Walsh number (W0, W1, . . . )

Also, by further developing this, it is also possible to determine the reliability (R) from the maximum reliability (first reliability) among reliabilities computed based on the preceding phase difference angle between the receiving phase angle Φ(0) at the present Walsh symbol time Tws=0, and the receiving phase angle Φ(−1) at the Walsh symbol time Tws=−1 preceding to this (0), detected for every Walsh number (W0, W1, . . . ), and the maximum reliability (second reliability) among reliabilities computed based on the following phase difference angle between the receiving phase angle Φ(0) at the present Walsh symbol time Tws=0, and the receiving phase angle Φ(+1) at the Walsh symbol time Tws=+1 following this (0), detected for every Walsh number (W0, W1, . . . ).

When computing the reliability based on both of the preceding and following phase difference angles in this way, a further higher precision reliability (R) can be obtained. In this case, concretely, preferably an average value of the first reliability obtained based on the preceding phase difference angle and the second reliability obtained based on the following phase difference angle is calculated and is defined as the reliability (R) to be sought. When representing this by an equation for the signal (Wn) of any Walsh number, the following equation (11) results. Namely, the reliability Rn(0) thereof becomes:

$$Rn(0)=\{Rn(-1, 0)+Rn(0, +1)\}/2 \qquad (11)$$

Further, it is convenient if the reliability (R) mentioned above is represented by normalizing the phase difference angle (ΔΦ) like the equation (180 deg−|ΔΦ|)/180 deg, but the method of representation of this is not limited to this.

Figure 6:
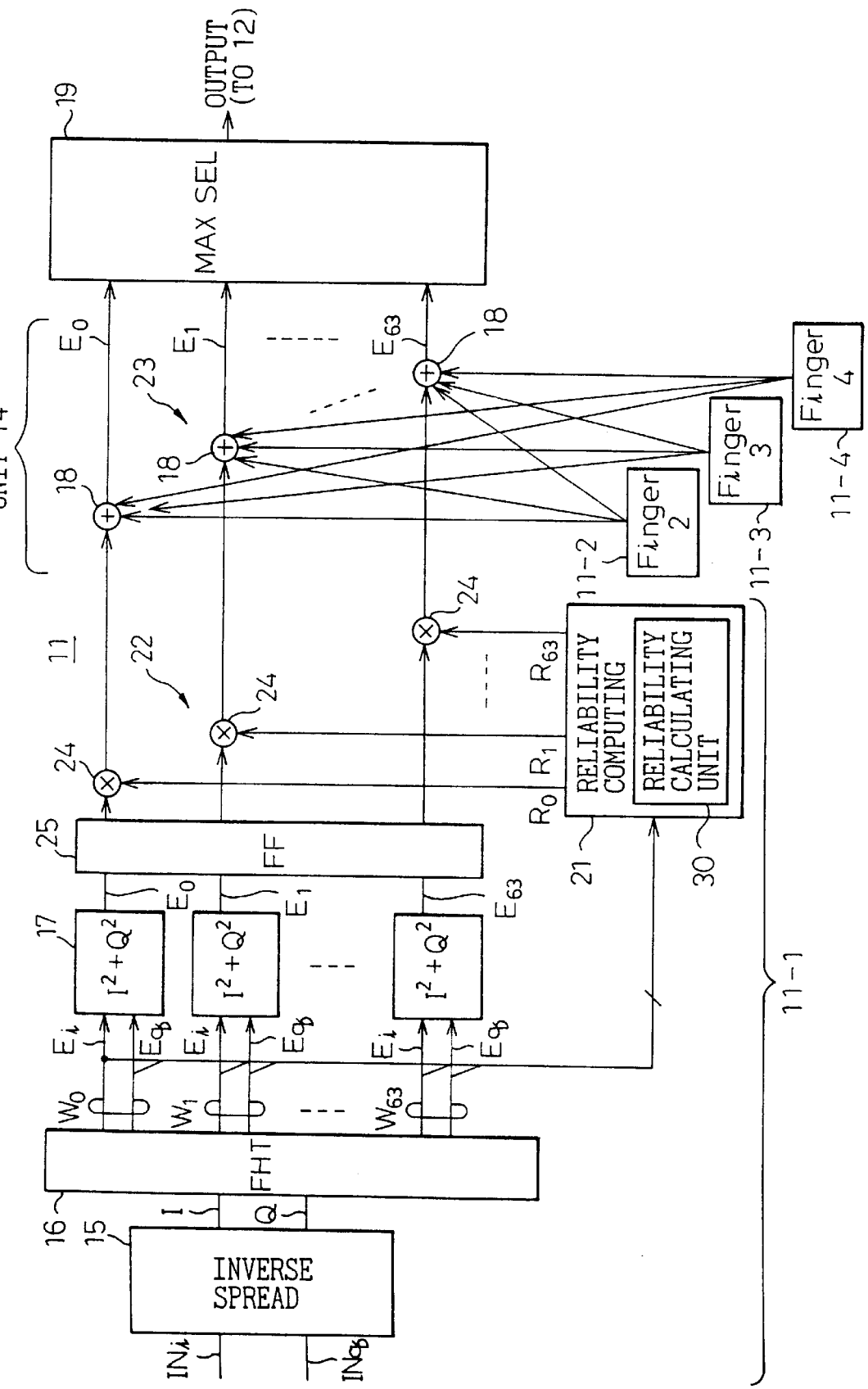
FIG. 6 is a view of a first embodiment of a demodulation apparatus based on the present invention.

FIG. 6 is a view of a first embodiment of the demodulation apparatus based on the present invention. The reliability computing means 21 shown in the present figure has a reliability calculating unit 30. This reliability calculating unit 30 receives as its inputs the I-channel correlation electric power Ei and the Q-channel correlation electric power Eq output from the Fast Hadamard Transform unit 16 for every Walsh number, finds the receiving phase angle Φ of every Walsh number for at least one of two consecutive Walsh symbol times Tws=−1 and Tws=0 and Tws=0 and Tws=+1 (at least one of Tws=−1 and Tws=0 or Tws=0 and Tws=+1) based on the predetermined calculation equation, and further finds the phase difference angle (ΔΦ) between receiving phases corresponding to two consecutive Walsh symbol times (Φ(0) and Φ(−1) or Φ(0) and Φ(+1), or both of them). Further, it calculates the reliability for every Walsh number based on the phase difference angle. Note that the predetermined calculation equation is as already shown in equation (1) to equation (11).

In this way, the reliability computing means 21 according to the present invention has the reliability calculating unit 30. This reliability calculating unit 30 receives as its inputs the I-channel correlation electric power (Ei) and the Q-channel correlation electric power (Eq) obtained after the transformation by the Fast Hadamard Transform unit 16 for every Walsh number and calculates the receiving phase angle Φ from values of these I-channel and Q-channel correlation electric powers for each of the consecutive two Walsh symbol times. Further, it is constituted so as to output the reliability based on the obtained receiving phase angle.

The phase difference angle between two receiving phase angles Φ obtained here is calculated and the reliability R to be sought is output based on this phase difference angle.

In this case, the reliability is computed based on the phase difference angle for every Walsh number, and the maximum reliability among computed reliabilities is output as the reliability R to be sought.

Note that when the phase difference angle is ΔΦ, preferably the reliability R is computed by the phase difference angle normalized by:

(180 deg−|ΔΦ|)/180 deg

Figure 7:
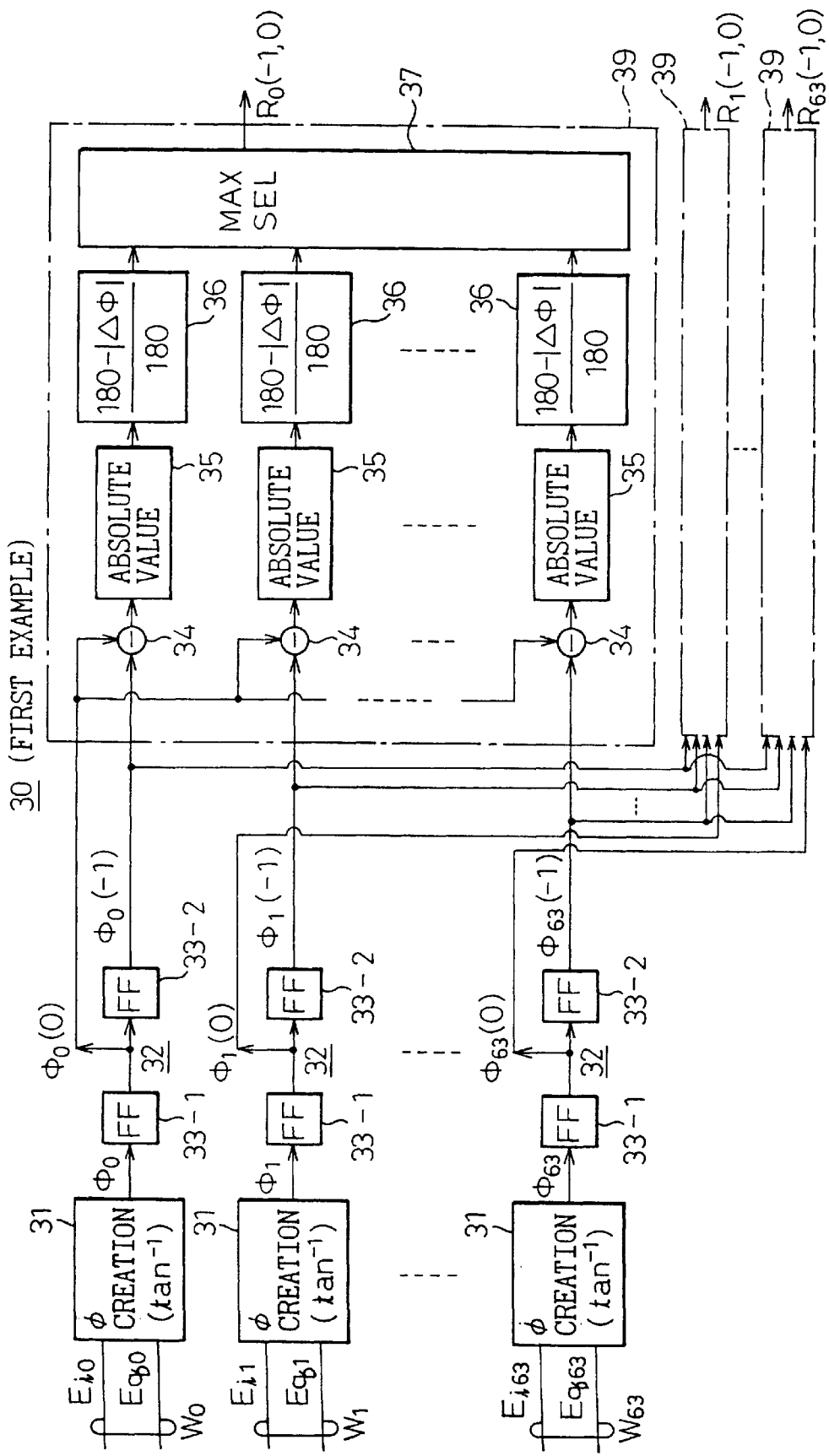
FIG. 7 is a view of a first example of a reliability calculating unit 30.

FIG. 7 is a view of a first example of the reliability calculating unit 30.

This reliability calculating unit 30 (first example) receives as its inputs the correlation electric powers (Ei, Eq) after the Fast Hadamard Transform from the Fast Hadamard Transform unit 16 in correspondence with the Walsh numbers (W0, W1, . . . , W63), (left end of the same figure), and outputs the reliabilities R0(−1, 0), R1(−1, 0), . . . corresponding to the Walsh numbers.

First, the input stage is provided with a receiving phase angle (Φ) creation circuit 31 in correspondence with the Walsh numbers (W0, W1, . . . , W63). This performs the calculation of $\tan^{-1}$ based on equation (2). The receiving phase angles Φ0, Φ1, . . . , Φ63 for every Walsh number obtained in this way are applied to corresponding signal transition circuits 32. Such a circuit 32 is constituted by for example two cascade-connected flip-flops (FF) 33-1 and 33-2. When viewing a division having a Walsh No. W0, the receiving phase angle Φ0(0) at the present Walsh symbol time (Tws=0) is obtained from the output of the flip-flop 33-1 of the first stage, and the receiving phase angle Φ0(−1) 1 Tws before is obtained from the output of flip-flop 33-2 of the second stage.

These Φ0(0) and Φ0(−1) are input to a subtractor 34. Due to this, the already mentioned preceding phase difference angle ΔΦ(=Φ0(0)−Φ0(−1)) is obtained. This corresponds to the term of Φ0(0)−Φ0(−1) in equation (3).

The output of the subtractor 34 is input to an absolute value circuit 35. The term of |Φ0(0)−Φ0(−1)| in equation (3) is calculated there.

Further, the reliability calculating circuit 36 calculates the entire equation (3) to obtain the reliability R0[W0(−1), W0(0)] to be sought.

The same calculation operation is used for the other divisions of the Walsh numbers (W1, . . . , W63). The reliability for every division is obtained from the reliability calculating circuits. Then, the reliabilities obtained from all of the divisions of the Walsh numbers are input to the maximum reliability selecting circuit (MAX SEL) 37, the maximum reliability among them is selected, and the output R0(−1, 0) to be sought is obtained. This corresponds to equation (4).

The above operation is also applied to the other Walsh Nos. W1, . . . , W63, whereby the outputs (reliabilities) R1(−1, 0), . . . , R63(−1, 0) to be sought are obtained. This corresponds to the case of n=1, . . . , 63 in equation (5).

As mentioned above, the reliability calculating unit 30 of the present invention is constituted so as to include therein a receiving phase angle creation circuit 31 for receiving as its inputs the I-channel correlation electric power (Ei) and the Q-channel correlation electric power (Eq) obtained after the Fast Hadamard Transform by the Fast Hadamard Transform unit 16 for every Walsh number (W0, W1, . . . , W63) and creating the receiving phase angle from values of the I-channel and Q-channel correlation electric powers.

Further, this reliability calculating unit 30 contains a signal transition circuit 32 for receiving as its inputs the receiving phase angles and obtaining the receiving phase angle for each consecutive two Walsh symbol times. Here, the signal transition circuit 32 comprises the cascade-connected flip-flops 33-1 and 33-2.

Furthermore, this reliability calculating unit 30 is constituted so as to include therein a subtractor 34 for receiving as its inputs two receiving phase angles individually created for consecutive two Walsh symbol times from values of the I-channel correlation electric power (Ei) and the Q-channel correlation electric power (Eq) obtained after the Fast Hadamard Transform, taking the difference between them, and outputting this and is further provided with an absolute value circuit 35 taking the absolute value of the phase difference angles.

Further, the reliability calculating unit 30 is configured so as to contain therein a reliability calculating circuit 36 for obtaining receiving phase angles created from values of the I-channel correlation electric power (Ei) and the Q-channel correlation electric power (Eq) obtained after the Fast Hadamard Transform for two consecutive Walsh symbol times, obtaining the phase difference angle as the difference between them, and calculating the reliability (R) based on this phase difference angle. Here, this reliability calculating circuit 36 is constituted so as to calculate the reliability (R) by:

$$(180 \text{ deg}-|\Delta\Phi|)/180 \text{ deg}$$

if the phase difference angle is $\Delta\Phi$.

Further, this reliability calculating unit 30 is configured so as to contain therein a maximum reliability selecting circuit 37 for obtaining two receiving phase angles obtained for two consecutive Walsh symbol times from values of the I-channel correlation electric power (Ei) and the Q-channel correlation electric power (Eq) obtained after the Fast Hadamard Transform for every Walsh number (W0, W1, . . . , W63), selecting the maximum reliability from among reliabilities for every Walsh number calculated based on the phase difference angle obtained by taking the difference between them, and outputting the reliability (R) to be sought.

Figure 8:
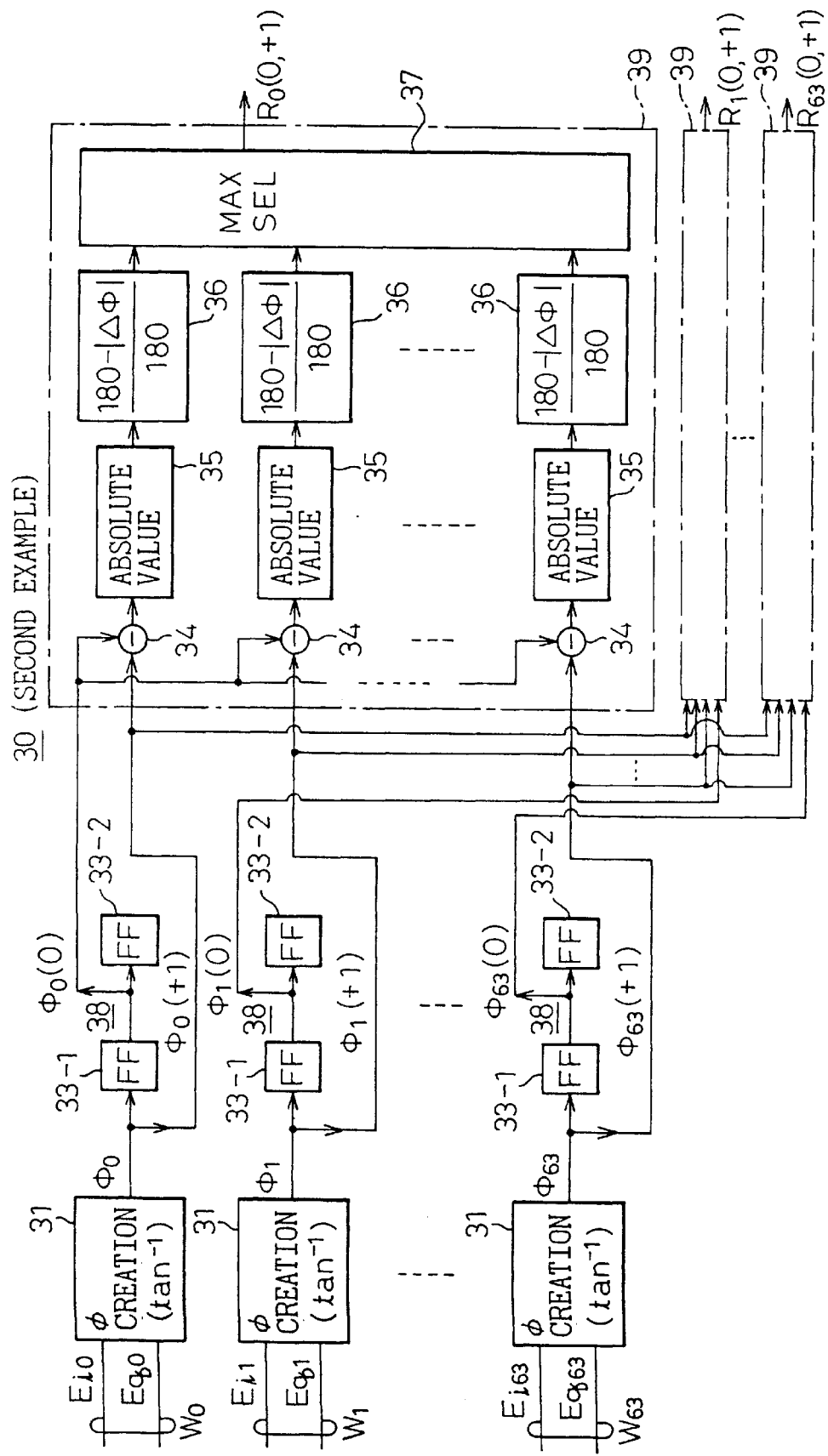
FIG. 8 is a view of a second example of the reliability calculating unit 30.

FIG. 8 is a view of a second example of the reliability calculating unit 30. The reliability calculating unit 30 (first example) shown in FIG. 7 mentioned above calculates the reliability R[W0(0), W0(−1)] by taking note the transition of the signal from the preceding Tws=−1 to the present Tws=0 of the Walsh symbol time, but the reliability calculating unit 30 of the second example shown in FIG. 8 calculates the reliability R[W0(0), W0(+1)] by taking note the transition of the signal from the present Tws=0 to the following Tws=+1. This is as already mentioned and equations (7), (8), (9), and (10) are applied.

The point of difference in the hardware of this second example with respect to the first example resides in a signal transition circuit 38 in FIG. 8. This has the same structure as that of the signal transition circuit 32 shown in FIG. 7, but differs in the method of picking up the output. This is for picking up the phase angle $\Phi(+1)$ following the present phase angle $\Phi(0)$. Note, in this case, the flip-flop 33-2 becomes unnecessary and therefore can be removed.

Each of the reliability calculating unit 30 of the first example (FIG. 7) and the reliability calculating unit 30 of the second example (FIG. 8) can be used alone, but preferably the two are simultaneously used.

Figure 9:
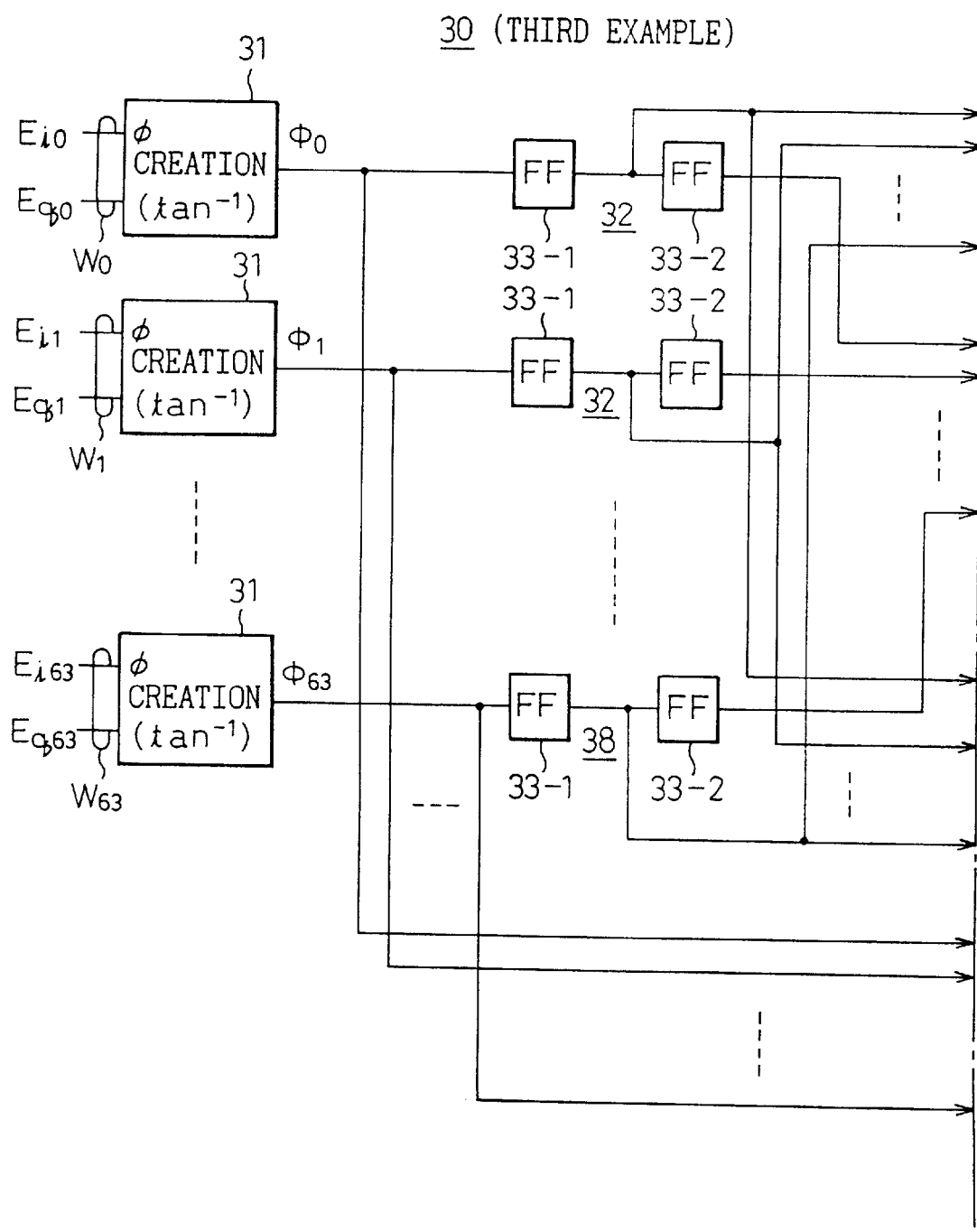
FIG. 9 is a first part of a view of a third example of the reliability calculating unit 30.
Figure 10:
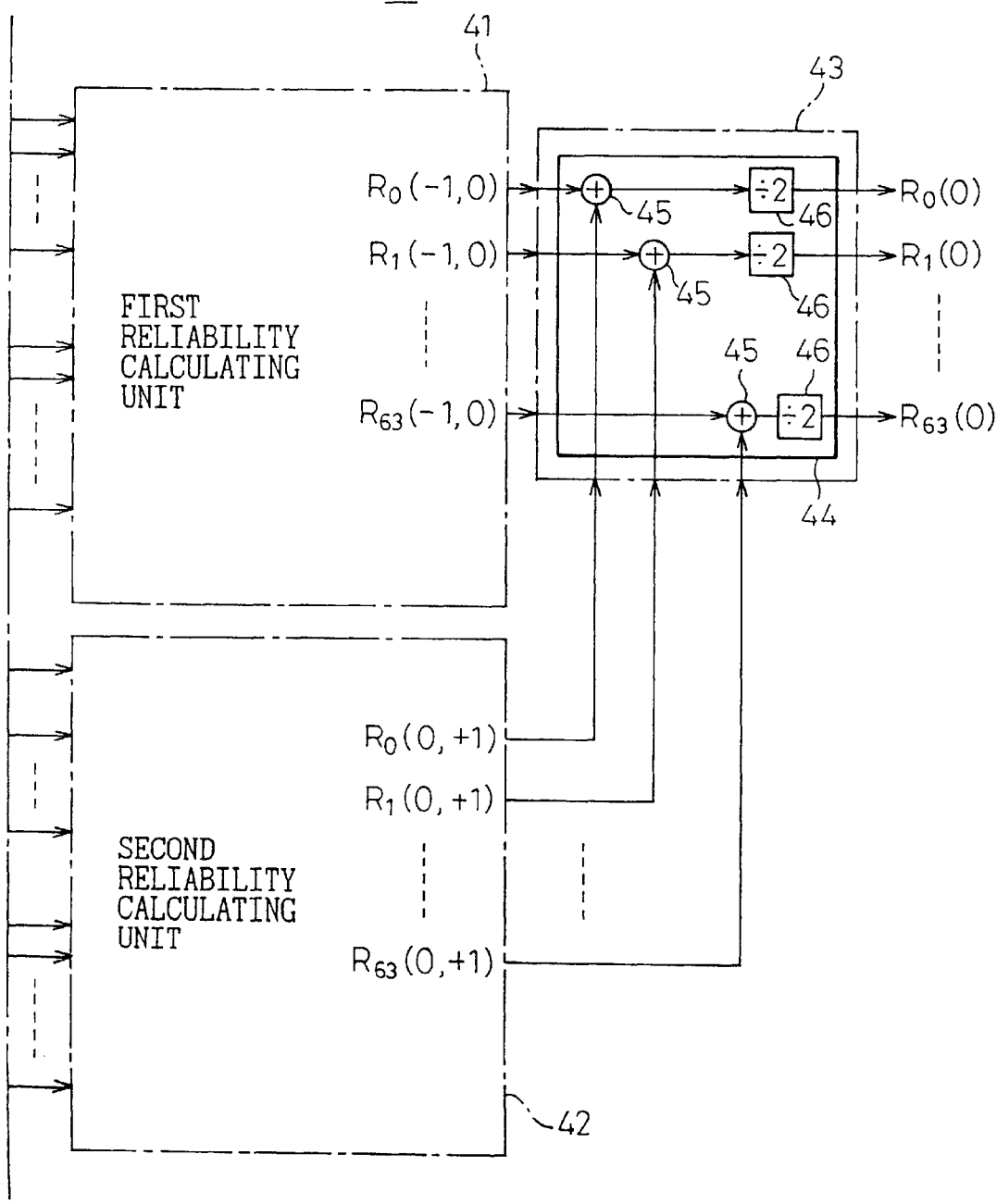
FIG. 10 is a second part of a view of the third example of the reliability calculating unit 30.

FIG. 9 and FIG. 10 are first and second parts of view of a third example of the reliability calculating unit 30.

The reliability calculating unit 30 of the third example shown in FIG. 9 and FIG. 10 combines the calculating unit utilizing the preceding phase difference $\Delta\Phi(-1)$ and the calculating unit utilizing the following phase difference $\Delta\Phi(+1)$ shown in FIG. 7 and FIG. 8 and in addition processes the reliabilities from these two calculating units by a processing means 43 to calculate further higher precision reliabilities R0(0), R1(0), . . . , R63(0). Note that an upper portion in FIG. 9 corresponds to a left half of FIG. 7, and a lower portion in FIG. 9 corresponds to the left half of FIG. 8. A first reliability calculating unit 41 in the upper portion in FIG. 10 and a second reliability calculating unit 42 in the lower portion in FIG. 10 have the same structure as that of the calculating part 39 shown in FIG. 7 and FIG. 8.

Thus, the reliability computing means (21), provided with the reliability calculating unit 30, exemplified here has:

(i) a first reliability calculating unit 41 which obtains two receiving phase angles $\Phi(0)$ and $\Phi(-1)$ created for the present Walsh symbol time Tws=0 and the Walsh symbol time Tws=−1 preceding this (0) from values of the I-channel correlation electric power (Ei) and the Q-channel correlation electric power (Eq) obtained after the Fast Hadamard Transform for every Walsh number (W0, W1, . . . , W63), calculates the first reliability based on the first phase difference angle between these receiving phase angles, and outputs the same;

(ii) a second reliability calculating unit 42 which obtains two receiving phase angles $\Phi(0)$ and $\Phi(+1)$ created for the present Walsh symbol time Tws=0 and the Walsh symbol time Tws=+1 following this (0) from values of the I-channel correlation electric power (Ei) and the Q-channel correlation electric power (Eq) obtained after the Fast Hadamard Transform for every Walsh number, calculates the second reliability based on the second phase difference angle between these receiving phase angles, and outputs the same; and further (iii) a processing means 43 for performing predetermined processing with respect to the first reliability and the second reliability and outputting the reliability (R) to be sought.

Here, preferably the processing means 43 is an average circuit 44 for taking the average value of the first reliability and second reliability.

The average circuit 44 can be constituted by for example an adder 45 for adding signals representing the first and second reliabilities and a ½ divider 46 for averaging the outputs of this adder 45.

Figure 11:
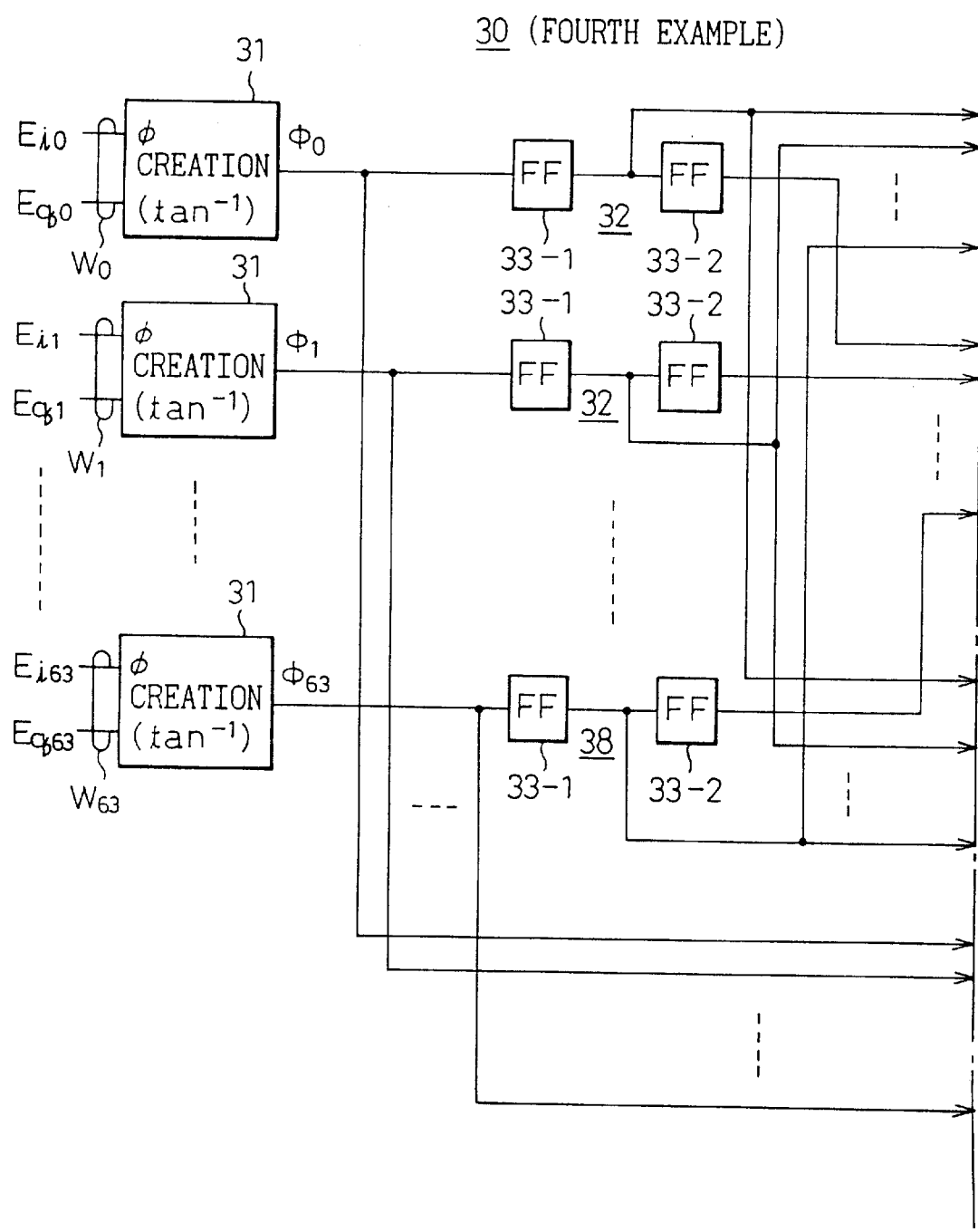
FIG. 11 is a first part of a view of a fourth example of the reliability calculating unit 30.
Figure 12:
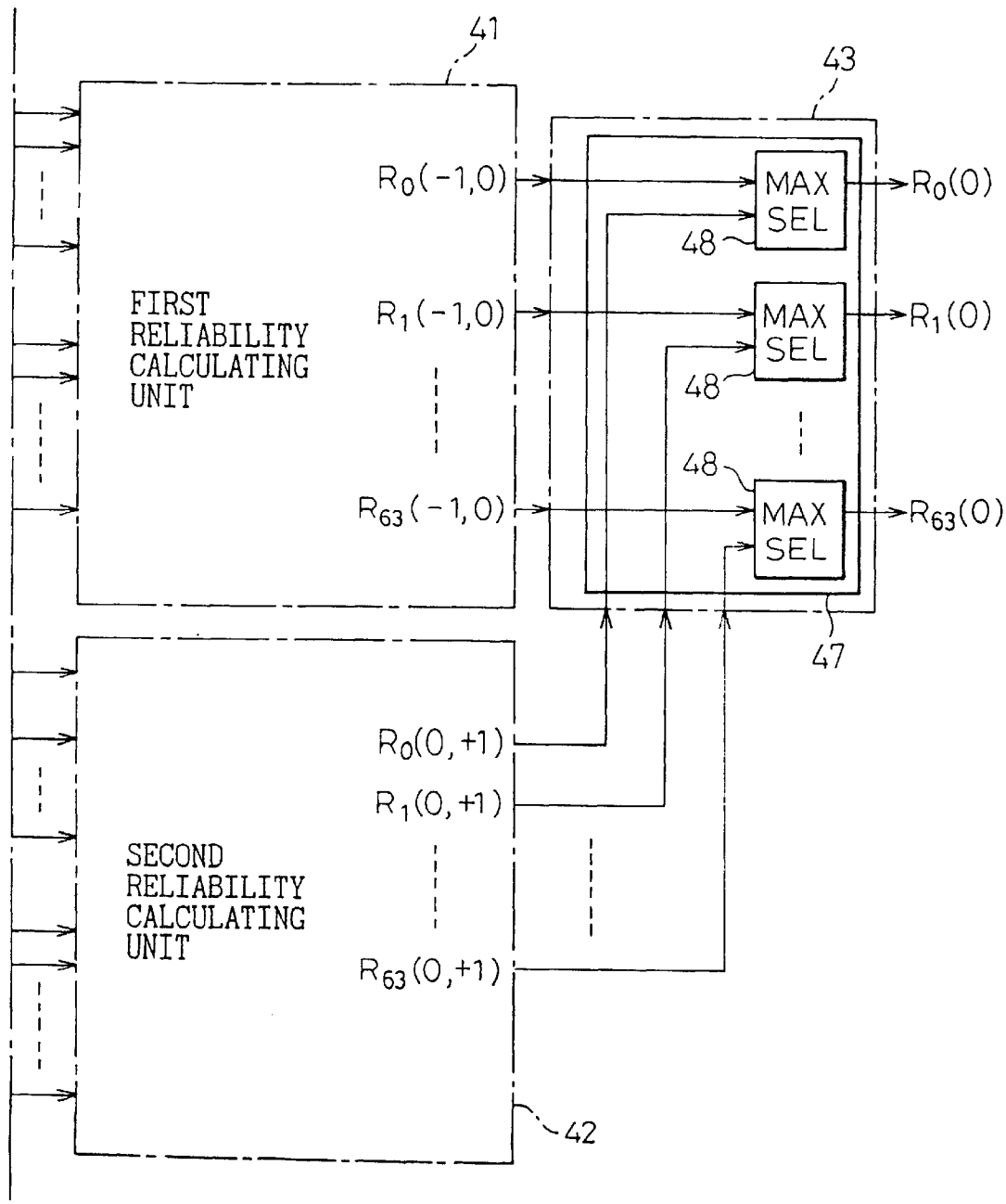
FIG. 12 is a second part of a view of the fourth example of the reliability calculating unit 30.

FIG. 11 and FIG. 12 are first and second parts of a view of a fourth example of the reliability calculating unit 30.

The reliability calculating unit 30 of this fourth example is different from the reliability calculating unit 30 of the third example in the structure of the processing means 43 (FIG. 12). In this fourth example, the larger reliability between the first reliability R1 obtained based on the preceding phase difference angle $\Delta\Phi(-1)$ and the second reliability R2 obtained based on the following phase difference angle $\Delta\Phi(+1)$ is selected and defined as the reliability R to be sought. This is carried out for every Walsh number (W0, W1, . . . , W63). In the final analysis, this means that the maximum reliability is selected from among 128 (=64×2) signal transitions.

Accordingly, the reliability Rn(0) for any Walsh No. Wn(n=0, 1, 2, . . . , 63) becomes as shown in the following equation (12):

$$Rn(0)=\max\{Rn(-1, 0), Rn(0, +1)\} \qquad (12)$$

Note that max { } means to select the larger of the terms in { }.

Referring to FIG. 12, the processing means 43 is constituted by the maximum value selecting unit 47 and performs the selection according to equation (12). As a concrete example, in the figure, the maximum value selecting unit 47 is constituted by a selector 48 provided in correspondence for each Walsh number. According to the reliability calculating unit 30 of this fourth example, the following inherent effect will be obtained.

This inherent effect is that the reliability R is correctly obtained even if the transmission signal from the transmission side becomes a burst signal. In the reverse-link defined in IS-95, a burst signal of a unit of power control groups (=6 Walsh symbols) is sometimes generated. This is because when for example the interval of generation of a voice from the transmission side becomes long, the transmission rate is lowered and as a result the transmission signal becomes a burst signal. When receiving such a burst signal, there may occur a case where even if the first reliability obtained by the already mentioned preceding phase difference angle can not be relied upon at all, the second reliability obtained by the already mentioned following phase difference angle is correct. Also, reverse cases to this may occur. This being so, the possibility that the larger of the first reliability and the second reliability is not influenced by the burst signal is high and the larger reliability can be utilized as the correct one. This is the inherent effect by the fourth example.

Figure 13:
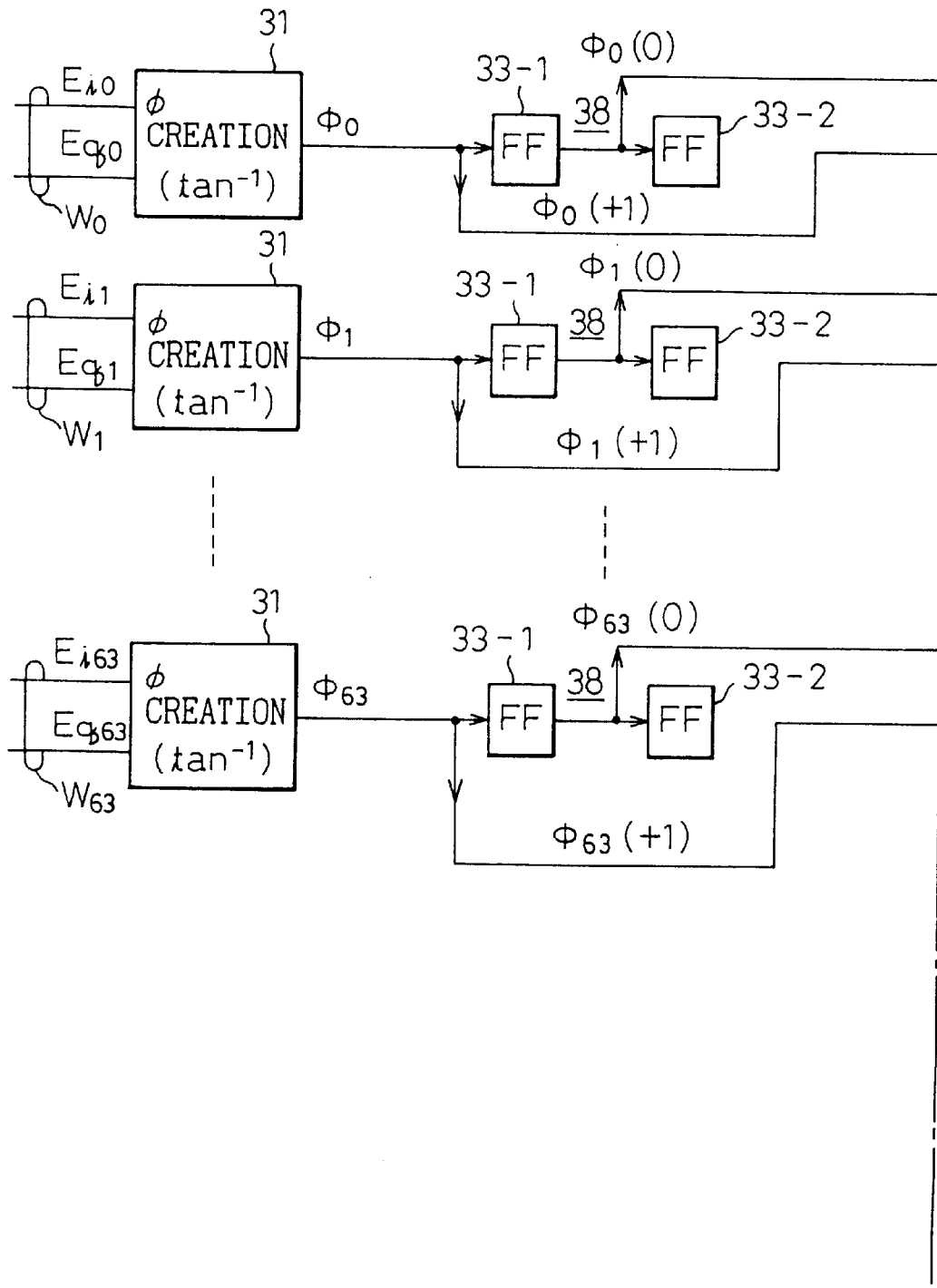
FIG. 13 is a first part of a view of a fifth example of the reliability calculating unit 30.
Figure 14:
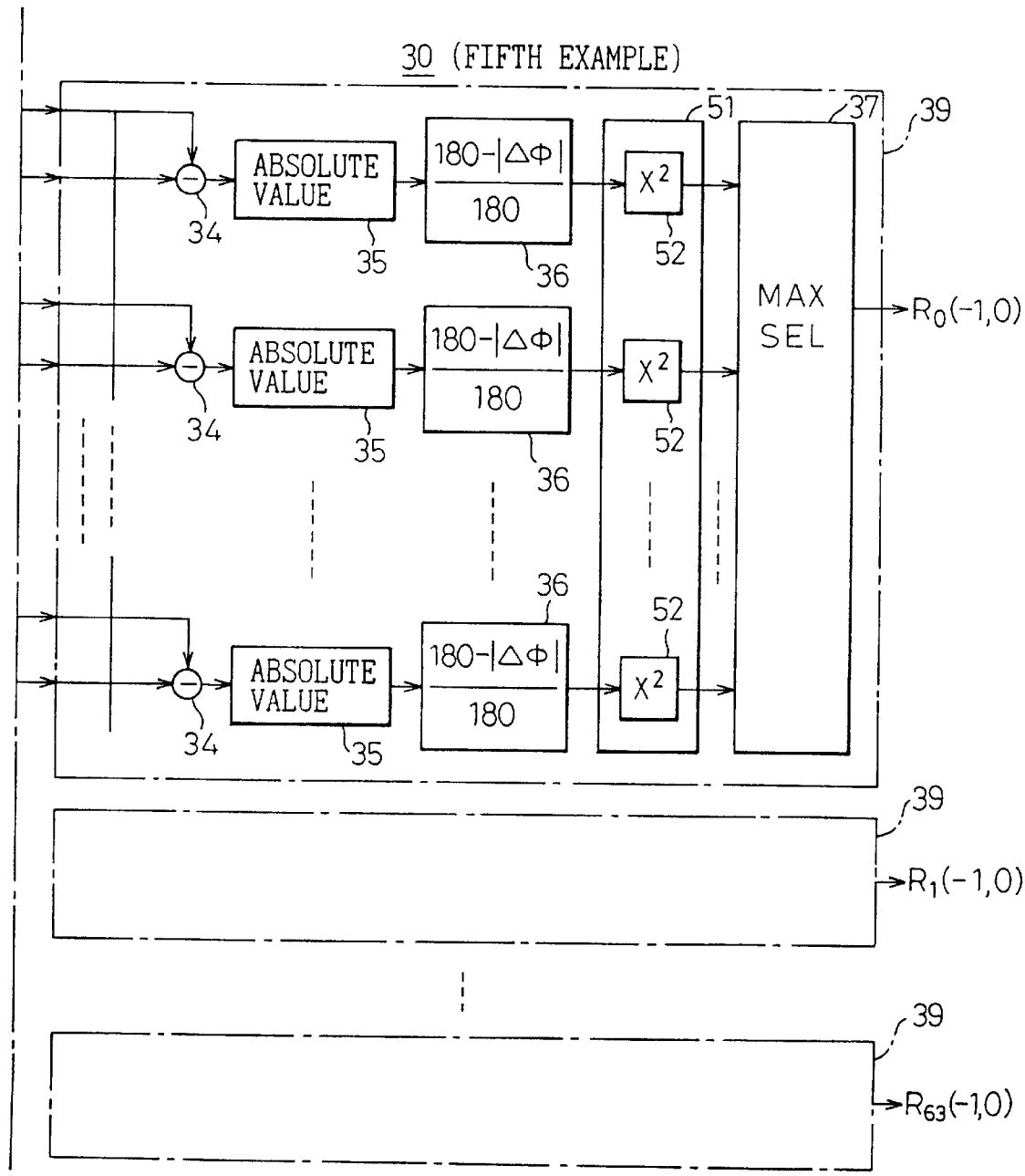
FIG. 14 is a second part of a view of the fifth example of the reliability calculating unit 30.

FIG. 13 and FIG. 14 are first and second parts of a view of a fifth example of the reliability calculating unit 30.

The configuration of this reliability calculating unit 30 of the fifth example is obtained by adding a weighting circuit 51 to for example the configuration of the first example shown in FIG. 7. Namely, in this fifth example, in the computation of the reliability R, weighting is performed so that the reliability R is made larger along with the reduction of the phase difference angle $\Delta\Phi$. Further, if necessary, the reliability R is made smaller along with the increase of the phase difference angle $\Delta\Phi$.

In the explanation heretofore, as shown by equation (3) and equation (7), the reliability R was treated as if it changed with a primary function, but in this fifth example, the above mentioned weighting is carried out for this primary function depending on the system situation.

This is to sharply bring the reliability to 1 as the phase difference angle approaches 0 deg.

Here, various statuses can be considered as the system situation. For example, the occurrence of the above-mentioned burst signal in a system is one such situation. Further, the mode of distribution of noise on the radio transmission path is another such situation. The weighting may be set case by case in accordance with the actual operating system.

Referring to FIG. 14, the reliability calculating unit 30 is constituted so as to contain therein such a weighting circuit 51 that makes the reliability R smaller along with the increase of the phase difference angle $\Delta\Phi$ and makes the reliability R larger along with the reduction of the phase difference angle $\Delta\Phi$. A square circuit 52 is shown as an example of realization of the weighting circuit 51. The reliability R[Wn(0), W0(0)] in this case can be shown by the following equation (13), where n is indicated as n=0, 1, . . . , 63.

$$R[Wn(-1), W0(0)] = \{(180 \text{ deg} - |\Phi 0(0) - \Phi n(-1)|)/180 \text{ deg}\}^2 \quad (13)$$

Figure 15:
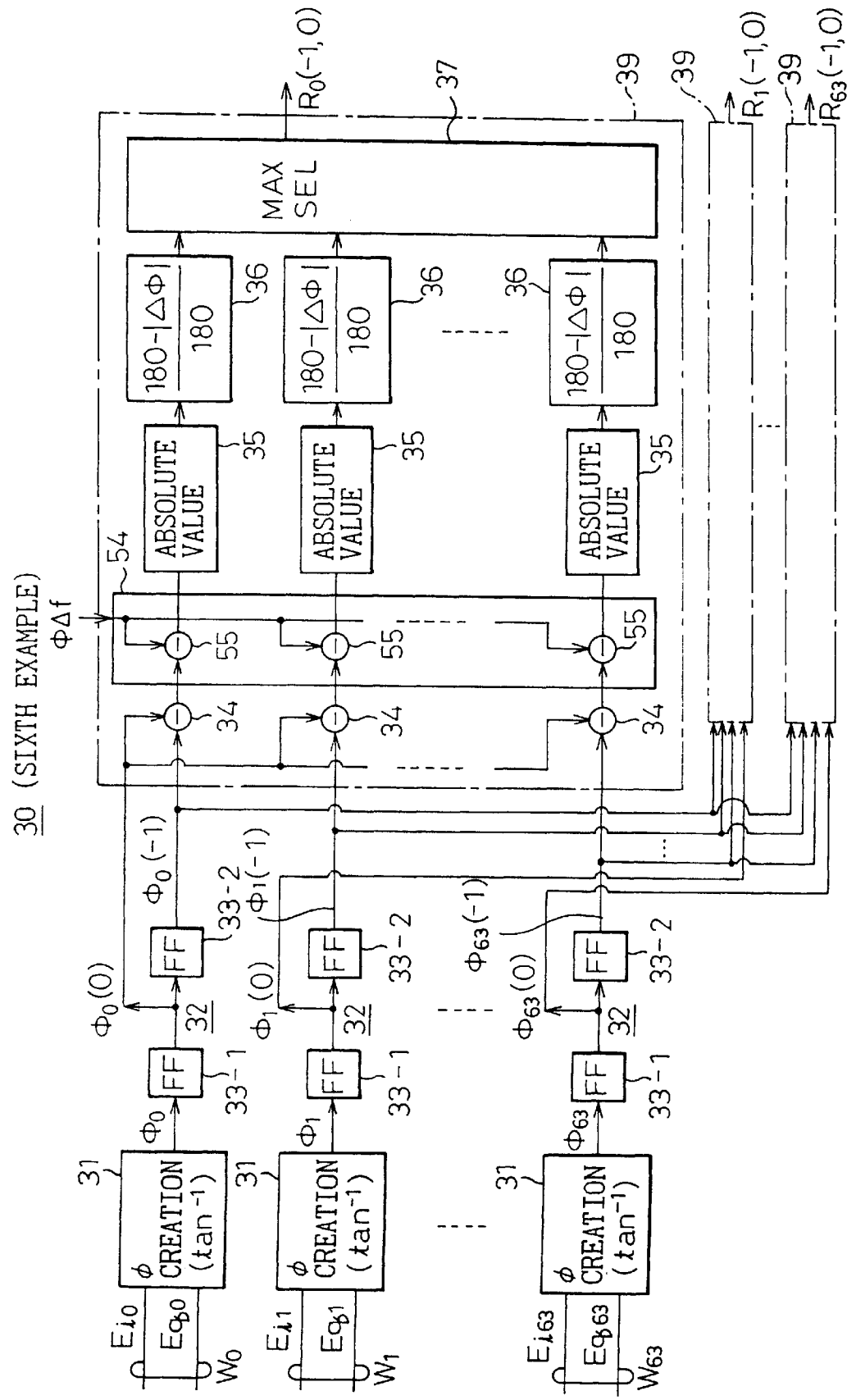
FIG. 15 is a view of a sixth example of the reliability calculating unit 30.

FIG. 15 is a view of a sixth example of the reliability calculating unit 30.

This reliability calculating unit 30 of the sixth example is obtained by adding the frequency difference compensating unit 54 to for example the first example shown in FIG. 7. Namely, in this sixth example, in the computation of the reliability R, the above computation is carried out by compensating the phase difference angle $\Phi\Delta f$ which is produced due to the frequency difference between the received reference carrier frequency and the reference carrier frequency on the transmission side. Namely, the reliability R[Wn(-1), W0(0)] shown in equation (6) is shown as in the following equation (14):

$$R[Wn(-1), W0(0)] = (180 \text{ deg} - |\Phi\Delta f - (\Phi 0(0) - \Phi n(-1))|)/180 \text{ deg} \quad (14)$$

In the explanation heretofore, the reliability R was computed by regarding the frequency difference thereof being almost 0 ($\Delta f=0$). This is because, in the IS-95 standard, $\Delta f$ is defined as 300 Hz or less. However, in terms of the operation of the next generation mobile communications systems, it has been requested that the restriction that $\Delta f \leq 300$ Hz be eased. For example, it is desirable that a high precision reliability R be obtained up to for example $\Delta f=1000$ Hz.

Referring to FIG. 39, the reliability R was computed by regarding the receiving phase angle $\Phi$ indicated for example for the vector W35 as being fixed on the phase plane, but if the frequency difference $\Delta f$ cannot be ignored, each vector starts rotating on the phase plane at a speed proportional to the magnitude of this $\Delta f$. Namely, for example, assuming $\Phi\Delta f=k\cdot\Delta f$ (k is a proportional constant), k may be defined in correspondence with the one Walsh symbol time. The frequency difference compensating unit 54 shown in FIG. 15 seemingly stops this rotation. As an example of its realization, a subtractor 55 is shown in the figure. Thus, the reliability calculating unit 30 based on the sixth example is configured so as to contain therein the frequency difference compensating unit 54 for compensating for the phase difference angle $\Delta\Phi$ by the frequency difference between the received reference carrier frequency and the reference carrier frequency on the transmission side.

Note that the frequency difference $\Delta f$ can be found by utilizing the output of an automatic frequency discriminating circuit provided on the reception side (demodulation side). Alternatively, it is also possible to calculate the frequency difference $\Delta f$ by a desktop computer or the like and use this $\Delta f$.

Figure 16:
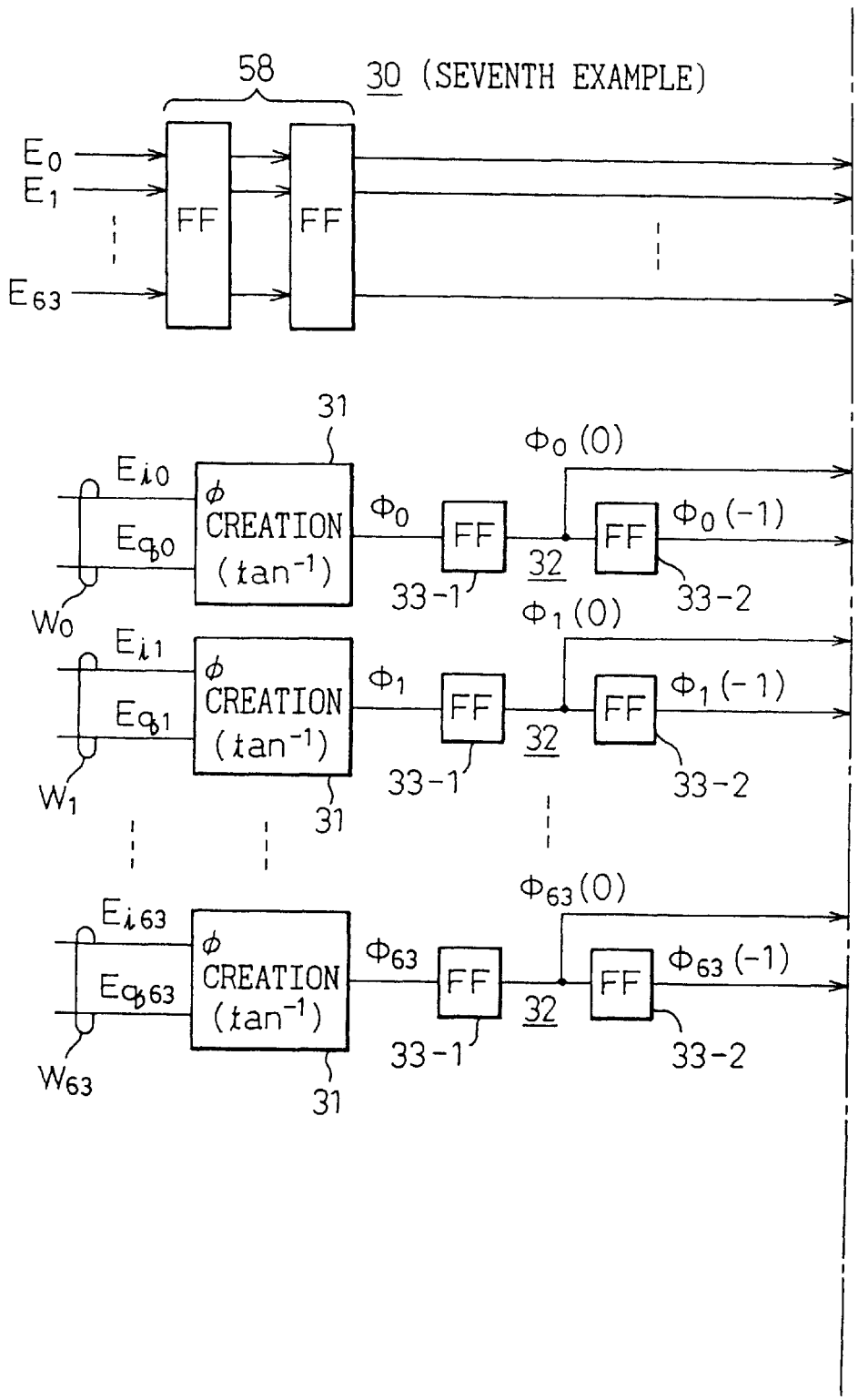
FIG. 16 is a first part of a view of a seventh example of the reliability calculating unit 30.
Figure 17:
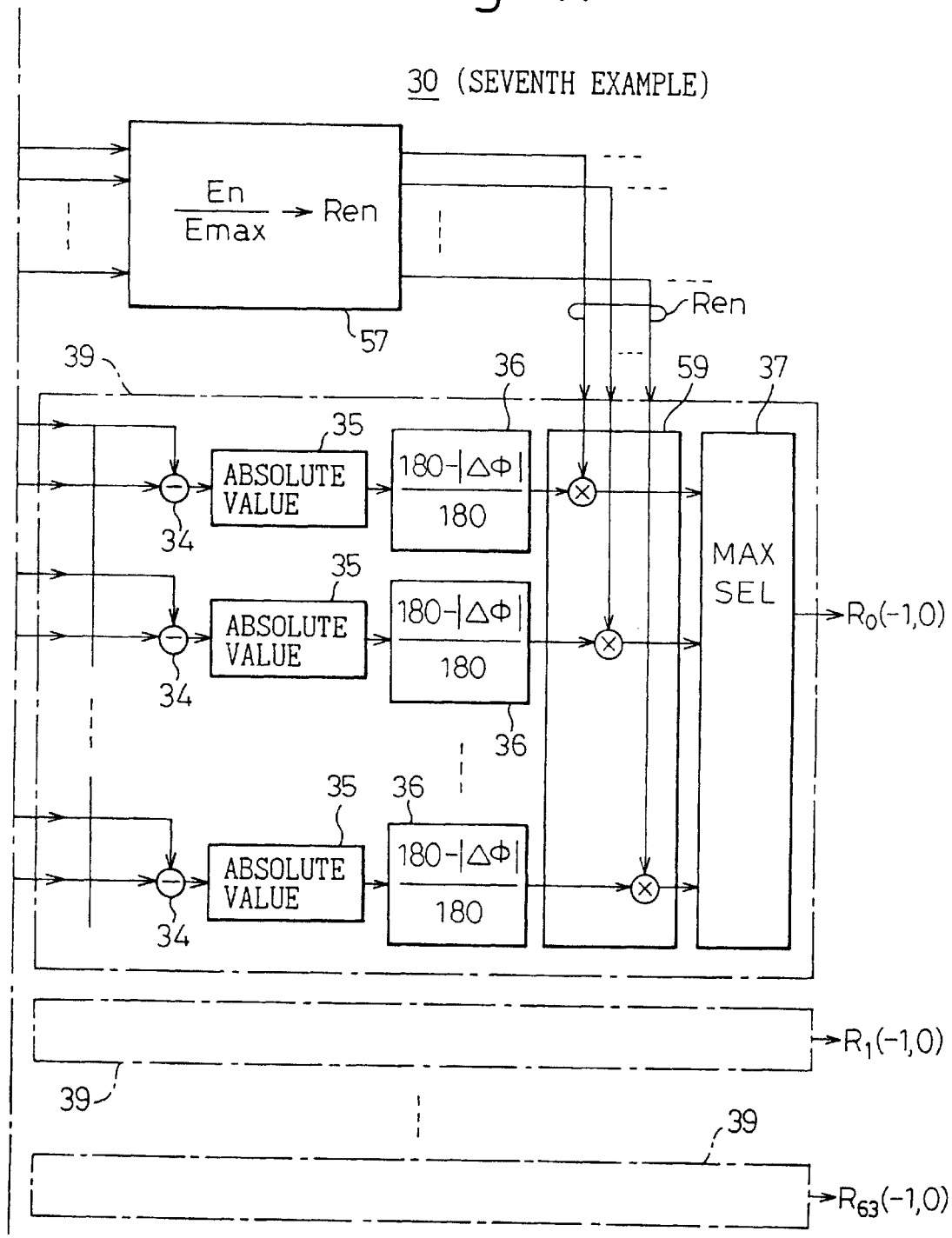
FIG. 17 is a second part of a view of the seventh example of the reliability calculating unit 30.

FIG. 16 and FIG. 17 are first and second parts of a view of a seventh example of the reliability calculating unit 30.

The configuration of this reliability calculating unit 30 of the seventh example is obtained by adding a reliability compensating unit 57 (FIG. 17) to for example the configuration of the first example shown in FIG. 7. Note that a new flip-flop stage 58 in FIG. 16 is the flip-flop for the time adjustment. This seventh example stands based on the following basic concept, namely, in the computation of the reliability R, a compensated reliability Ren calculated based on the correlation energies E0, E1, . . . , E63 (refer to FIG. 2) for every Walsh symbol time detected for every Walsh number (W0, W1, . . . , W63) is further introduced. Further concretely, in this seventh example, the compensated reliability Ren is calculated as the ratio of the correlation energy for every Walsh number with respect to the maximum correlation energy Emax among correlation energies En detected, for every Walsh number, one Walsh symbol time (Tws) before the correlation energies (E0, E1, . . . , E63) detected at the present Walsh symbol time.

Accordingly, this compensated reliability Ren can be basically represented by the following equation (15):

$$Ren = En(-1)/E\max(-1) \quad (15)$$

Note, n=0, 1, . . . , 63. Ren means the reliability (R) obtained by noting the energy (e). When noting only the already mentioned phase difference angle $\Delta\Phi$, the smaller the $\Delta\Phi$, the higher the reliability (R). However, there may also occur a case where the correlation energy (correlation energy from the energy calculating unit ($I^2+Q^2$)17) is small irrespective of the fact that the $\Delta\Phi$ is small, and therefore the reliability (R) calculated based on that $\Delta\Phi$ seems to be not certain. The basic concept is produced by assuming such a case. Namely, the reliability calculating unit 30 contains the reliability compensating unit 57 which calculates the compensated reliability based on the correlation energy at every Walsh symbol time detected for every Walsh number and further introduces this compensated reliability Ren with respect to the reliability.

Then, according to the hardware structure shown in FIGS. 16 and 17, the reliability compensating unit 57 selects the maximum correlation energy Emax from among correlation energies En detected, for every Walsh number, one Walsh symbol time before the correlation energy detected at the present Walsh symbol time and outputs the value of the ratio of the correlation energy En for every Walsh number with respect to this maximum correlation energy Emax as the compensated reliability Ren. This Ren is introduced to the already mentioned reliability. In the example shown in FIG. 17, Ren is multiplied with respect to that reliability at a multiplier unit 59.

According to equation (15), this means that the vector of the Walsh number having the highest energy is the compensated reliability 1 (Ren=1).

When generally showing this for all vectors in further detail, the compensated reliability Ren [Wn(−1), W0(0)] is represented by the following equation (16):

$$Ren[Wn(-1), W0(0)]=En(-1)/E\max(-1) \quad (16)$$

Here, −1 means "one Walsh symbol time before".

In the end, the final reliability (R) shown in FIG. 16 and FIG. 17 becomes as in the following equation (17) if generally representing this (R[Wn(−1), W0(0)]):

$$R[Wn(-1), W0(0)]=(180 \text{ deg}-|\Phi0(0)-\Phi n(-1)|)/180 \text{ deg} \times Re[Wn(-1), W0(0)]=(180 \text{ deg}-|\Phi0(0)-\Phi n(-1)|)/180 \text{ deg} \times En(-1)/E\max(-1) \quad (17)$$

Thus, a further higher precision reliability (R) is obtained by introducing not only the phase difference angle, but also the correlation energy.

In the seventh example, the basic concept is realized by using the correlation energy En(−1) detected one Walsh symbol time before, but the same can be realized also with the use of the correlation energy En (+1) detected one Walsh symbol time after. Namely, the compensated reliability Ren is calculated as the ratio of the correlation energy for every Walsh number with respect to the maximum correlation energy Emax among correlation energies En (+1) detected for every Walsh number W0, W1, . . . , W63 after one Walsh symbol time continuing from the correlation energy En(0) detected at the present Walsh symbol time.

The reliability compensating unit 57 of FIG. 17 in this case selects the maximum correlation energy Emax from among correlation energies En(+1) detected for every Walsh number after one Walsh symbol time continuing from the correlation energy detected at the present Walsh symbol time and outputs the value of the ratio of the correlation energy En(+1) for every Walsh number with respect to this maximum correlation energy Emax as the compensated reliability Ren.

Accordingly, equation (16) is changed as in the following equation (18):

$$Ren[W0(0), Wn(+1)]=En(+1)/E\max(+1) \quad (18)$$

Here, +1 means after one Walsh symbol time.

Further, equation (17) is modified to the following equation (19):

$$R[W0(0), Wn(+1)]=(180 \text{ deg}-|\Phi n(+1)-\Phi 0(0)|)/180 \text{ deg} \times Ren[W0(0), Wn(+1)]=(180 \text{ deg}-|\Phi n(+1)-\Phi 0(0)|)/180 \text{ deg} \times En(+1)/E\max(+1) \quad (19)$$

The demodulation apparatus incorporating the reliability calculating unit 30 of the seventh example mentioned above will be explained below.

Figure 18:
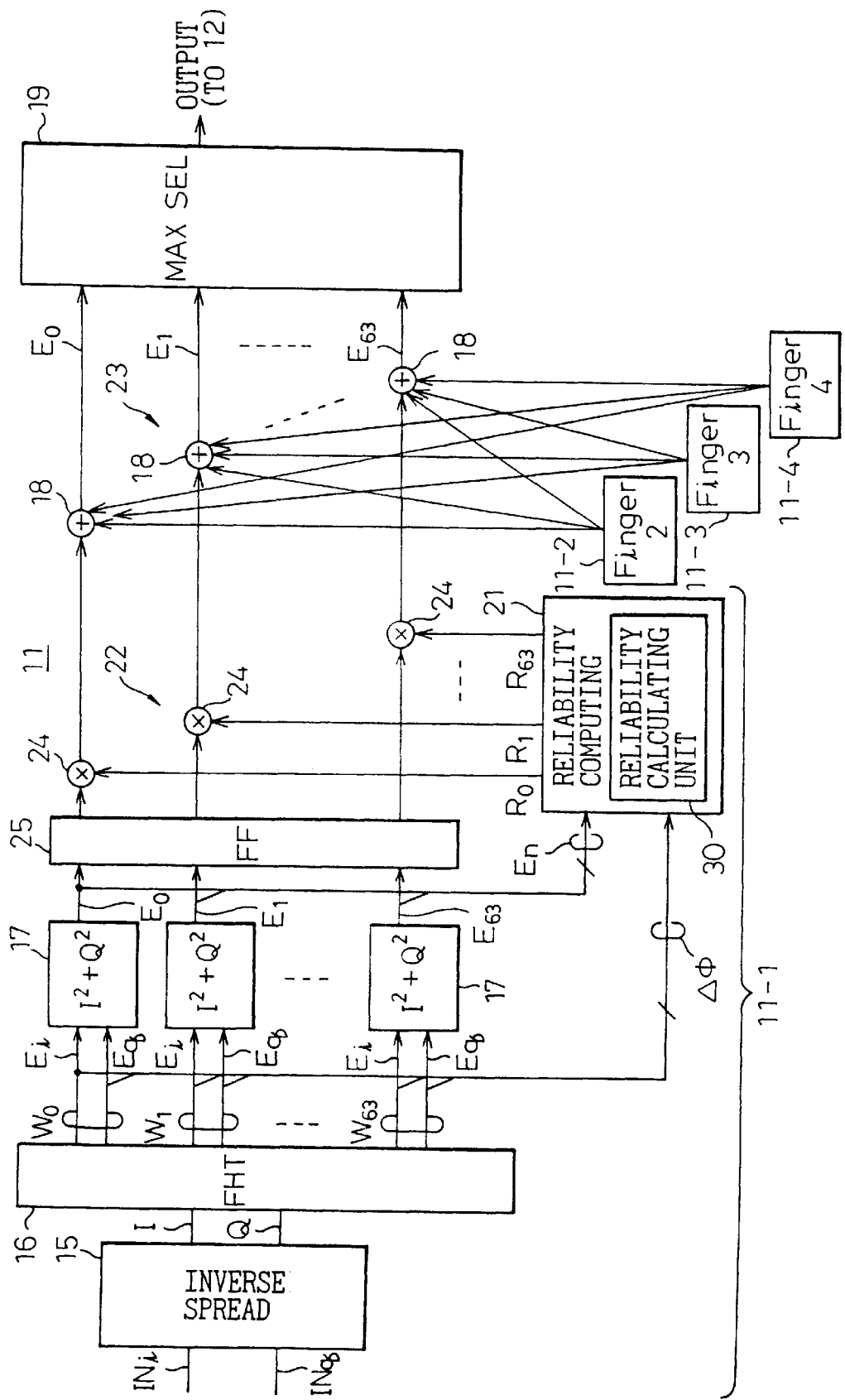
FIG. 18 is a view of a second embodiment of the demodulation apparatus based on the present invention.

FIG. 18 is a view of a second embodiment of the demodulation apparatus based on the present invention. In this second embodiment, the reliability computing means 21 not only has the phase difference angle $\Delta\Phi$ as the first input information (same as FIG. 6), but also has the correlation energy En in the seventh example as the second input information.

Figure 19:
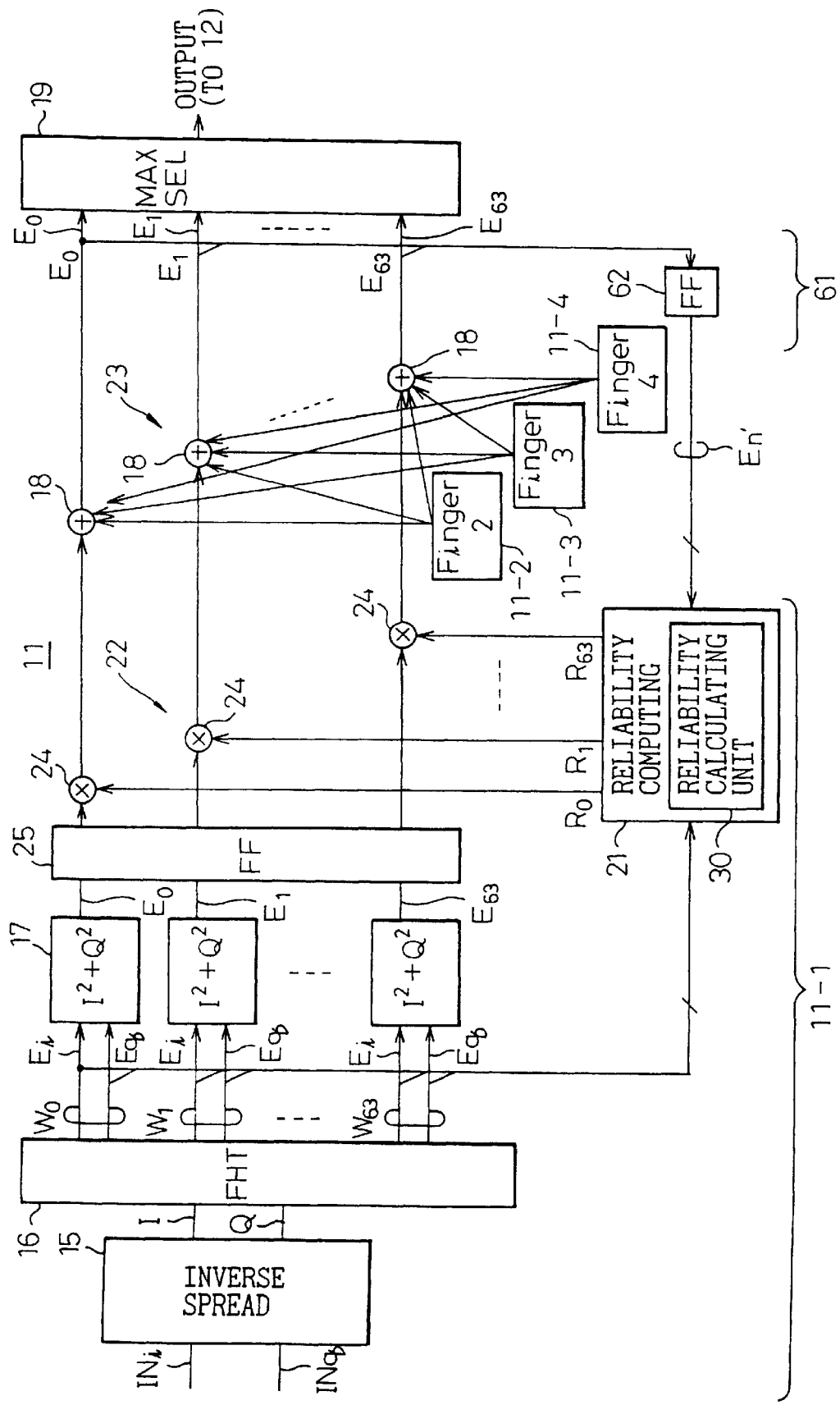
FIG. 19 is a view of a third embodiment of the demodulation apparatus based on the present invention.

FIG. 19 is a view of a third embodiment of the demodulation apparatus based on the present invention. When compared with the second embodiment shown in FIG. 18, the method of picking up the second input information, taking note of the correlation energy, is different. In FIG. 18, it was fetched into the reliability computing means 21 as the illustrated En, but in FIG. 19, it is fetched into the means 21 as En'.

Thus, in the third embodiment, when calculating the compensated reliability Ren based on the correlation energy En, the already mentioned corrected correlation energy, that is, the correlation energy to be input to the maximum energy selecting unit (MAX SEL) 19, is used as this correlation energy En. This is indicated as En' in FIG. 19. Referring to the figure, the reliability calculating unit 30 is provided with a feedback part 61 for feeding back the corrected correlation energy as the correlation energy to be applied to the reliability compensating unit 57 (FIG. 17). Note that, 62 is the flip-flop for time adjustment.

Figure 20:
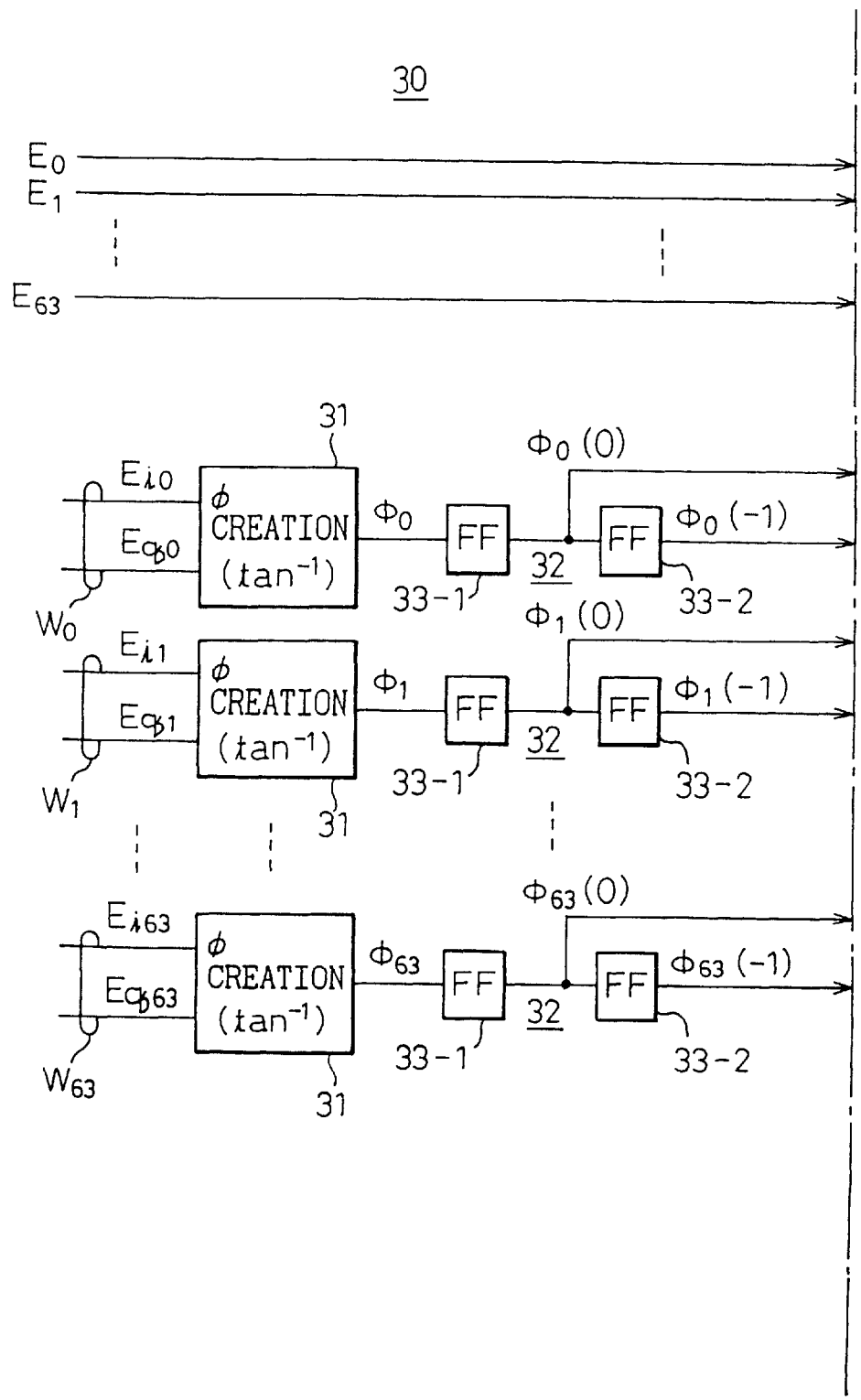
FIG. 20 is a first part of a view of an example of the reliability calculating unit 30 applied to the third embodiment (FIG. 19)
Figure 21:
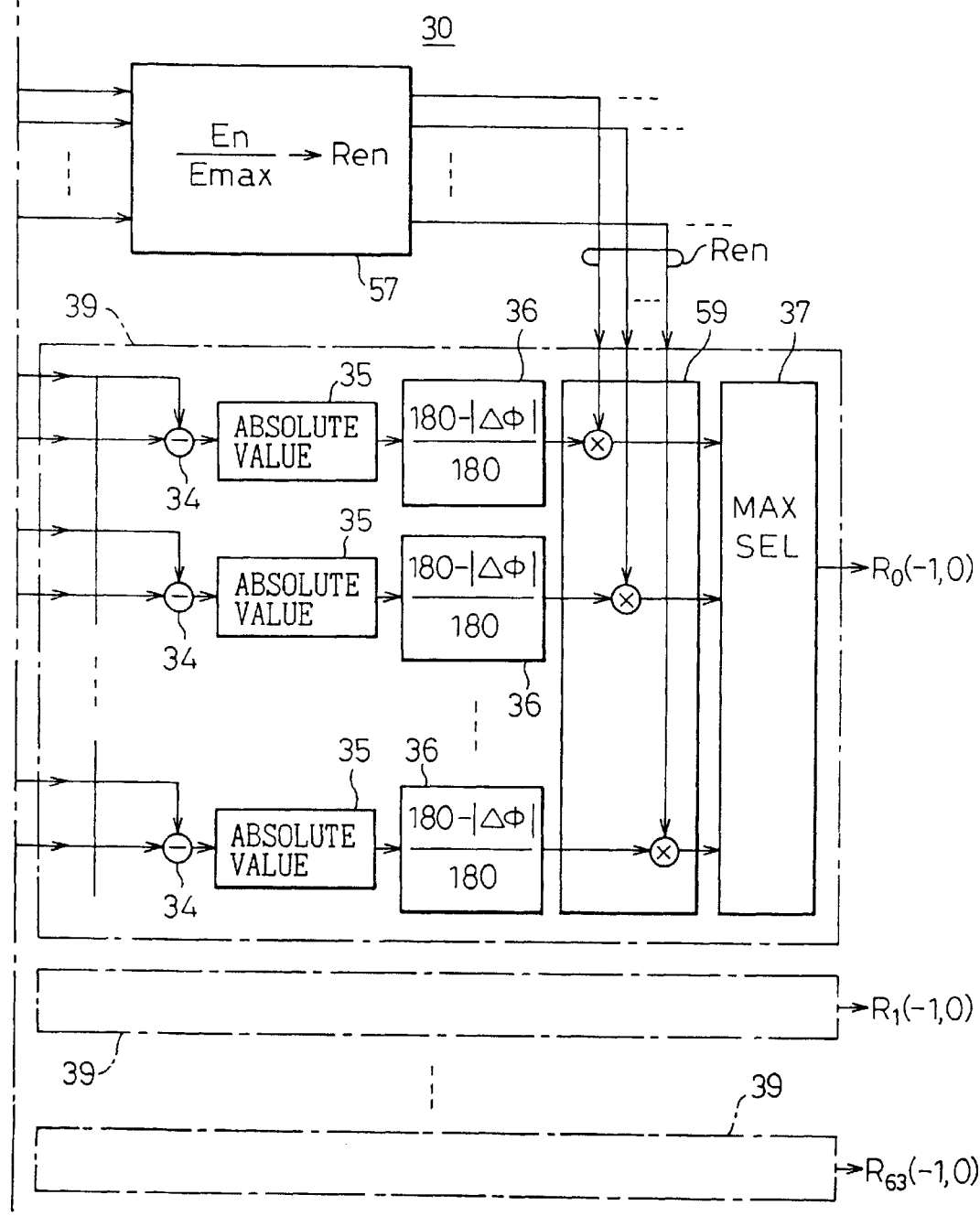
FIG. 21 is a second part of a view of an example of the reliability calculating unit 30 applied to the third embodiment (FIG. 19)

FIG. 20 and FIG. 21 are first and second parts of a view of an example of the reliability calculating unit 30 applied to the third embodiment (FIG. 19).

The reliability calculating unit 30 shown in FIG. 20 and FIG. 21 is substantially the same as the reliability calculating unit shown in FIG. 16 and FIG. 17. The difference resides in the point that the flip-flop stage 58 for the time adjustment is removed. This is because the signal (En') on the rear side of the calculating unit 30 is used in the third embodiment.

The final reliability R multiplied by the compensated reliability Ren becomes as shown in the following equation (20) when viewing for example R[Wn(−1), W0(0)]:

$$R[Wn(-1), W0(0)](180 \text{ deg}-|\Phi 0(0)-\Phi n(-1)|)/180 \text{ deg} \times En(-1)/E\max(-1) \quad (20)$$

Namely, the final reliability is obtained by multiplying the compensated reliability (Ren) calculated based on the correlation energy–(En, En') with respect to the reliability (R) computed based on the phase difference angle $\Delta\Phi$.

The method of thinking of weighting shown in equation (13) is applied to this equation (20) and can be adapted to a variety of system situations.

The first weighting method performs weighting so that the reliability R is made larger along with the reduction of the phase difference angle $\Delta\Phi$. Namely, the provision of the square circuit 52 is made between the reliability calculating circuit 36 and the multiplier unit 59. When applying this to equation (20), the equation becomes the following equation (21):

$$R[Wn(-1), W0(0)]=\{(180 \text{ deg}-|\Phi 0(0)-\Phi n(-1)|)/180 \text{ deg}\}^2 \times En(-1)/E\max(-1) \quad (21)$$

The second weighting method performs weighting so that the compensated reliability (Ren) more sharply approaches 1 as the compensated reliability (Ren) approaches 1. Namely, the provision of the square circuit 52 is made between the multiplier unit 59 and the maximum reliability selecting circuit 37. When applying this to equation (20), the equation becomes the following equation (22):

$$R[Wn(-1), W0(0)] = \{[(180 \text{ deg} - |\Phi0(0) - \Phi n(-1)|)/180 \text{ deg}] \times En(-1)/E\max(-1)\}^2 \quad (22)$$

Figure 22:
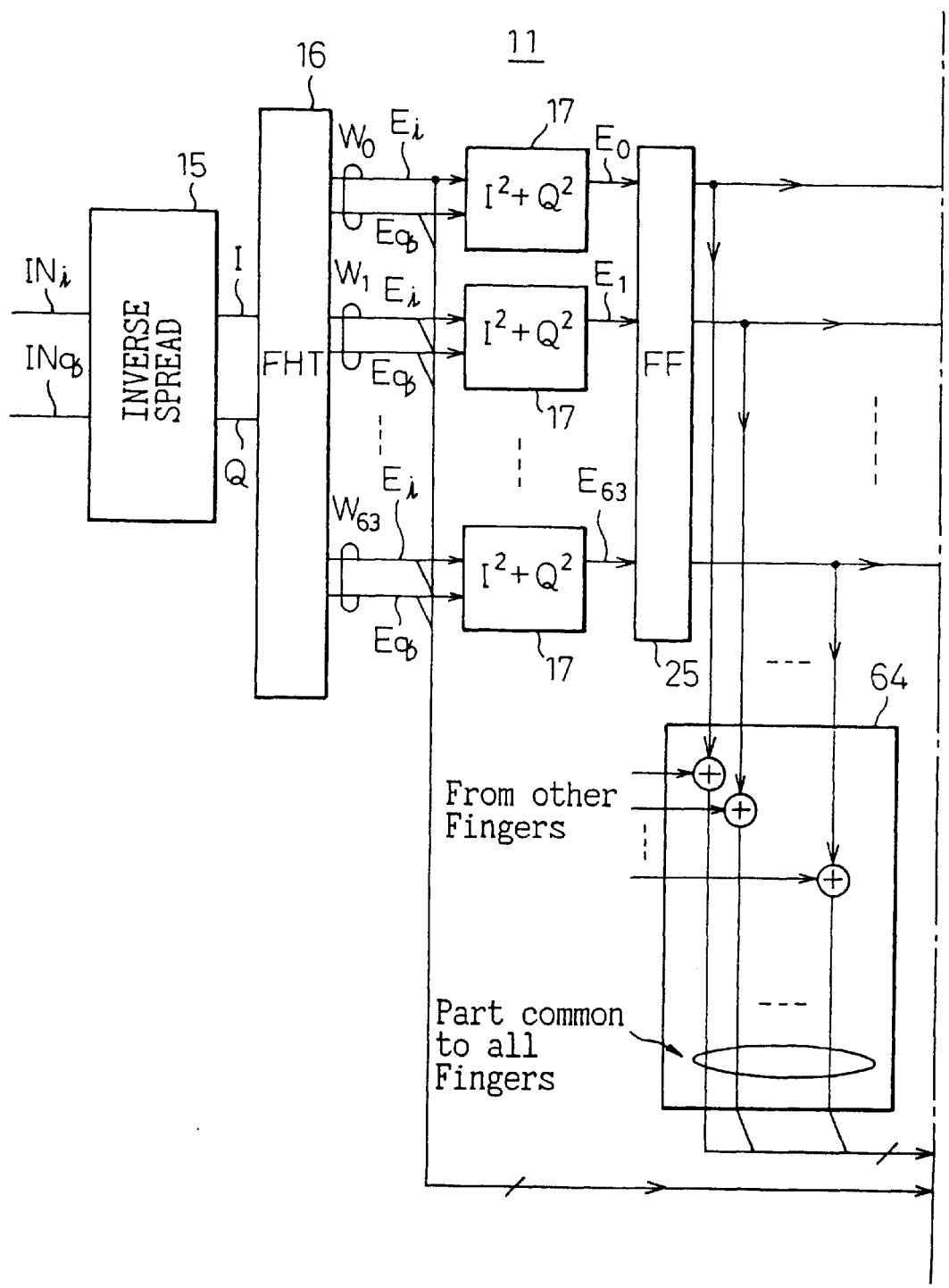
FIG. 22 is a first part of a view of a fourth embodiment of the demodulation apparatus based on the present invention.
Figure 23:
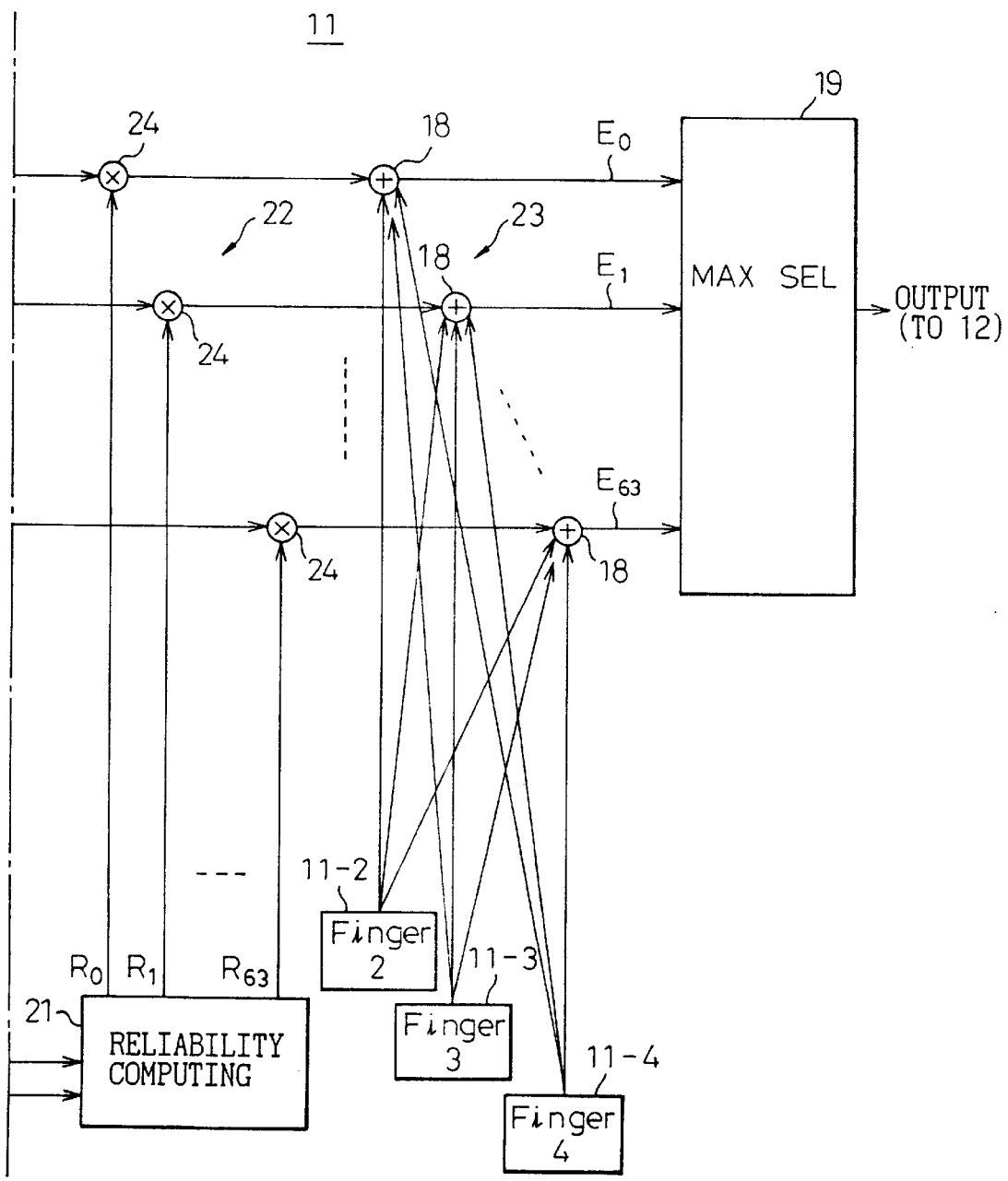
FIG. 23 is a second part of a view of the fourth embodiment of the demodulation apparatus based on the present invention.

FIG. 22 and FIG. 23 are first and second parts of a view of a fourth embodiment of the demodulation apparatus based on the present invention.

In this fourth embodiment, as shown in FIG. 37, attention was particularly paid to the fact that the finger demodulating unit 11 is constituted by a plurality of demodulators (Fingers) 11-1 to 11-4. When computing the reliability, in each finger demodulating unit 11, the correlation energy (E0, E1, . . . , E63) at every Walsh symbol time (Tws) detected for every Walsh number (W0, W1, . . . , W63) was introduced. Here, by using correlation energies similarly output from a plurality of demodulators 11-1 to 11-4 and combined for every Walsh number, the calculation of the compensated reliability Ren is carried out.

Not all of the plurality of demodulators (Fingers) shown in FIG. 37 are always operating. There are also cases where only the first demodulator 11-1 (Finger 1) in the present figure operates. The above explanation was made paying attention to only one demodulator. Note that to determine which among the four demodulators is to be made active, a searcher analyzes the circumstances of the multipath fading, determines each optimum phase delay, and makes two or more suitable demodulators active.

In this way, when two or more demodulators (of 11-1 to 11-4) have become active, the correlation energies output from these active demodulators are combined in correspondence with the Walsh numbers and input to the reliability computing means 21 (reliability calculating unit 30). The energy combining unit 64 shown in FIG. 22 performs this. Accordingly, in this case, other than combination of all Finger outputs by the original combining means 23, second combination such as energy combination will be added.

By doing this, the possibility that the correct correlation energy will always be output from one of the two or more demodulators is very high, when utilizing the compensated reliability Ren computed by using the correlation energies in a plurality of Fingers, and as a result, a higher precision reliability R can be obtained.

Thus, the fourth embodiment is characterized in that provision is made of an energy combining unit 64 which combines the correlation energies E0, E1, . . . , En obtained by collection from all demodulators when the demodulation is carried out by the finger demodulating unit 11 comprising a plurality of demodulators (Fingers) 11-1 to 11-4 connected to each other in parallel, and the combined correlation energy from this energy combining unit 64 is input to the reliability compensating unit 57.

Figure 24:
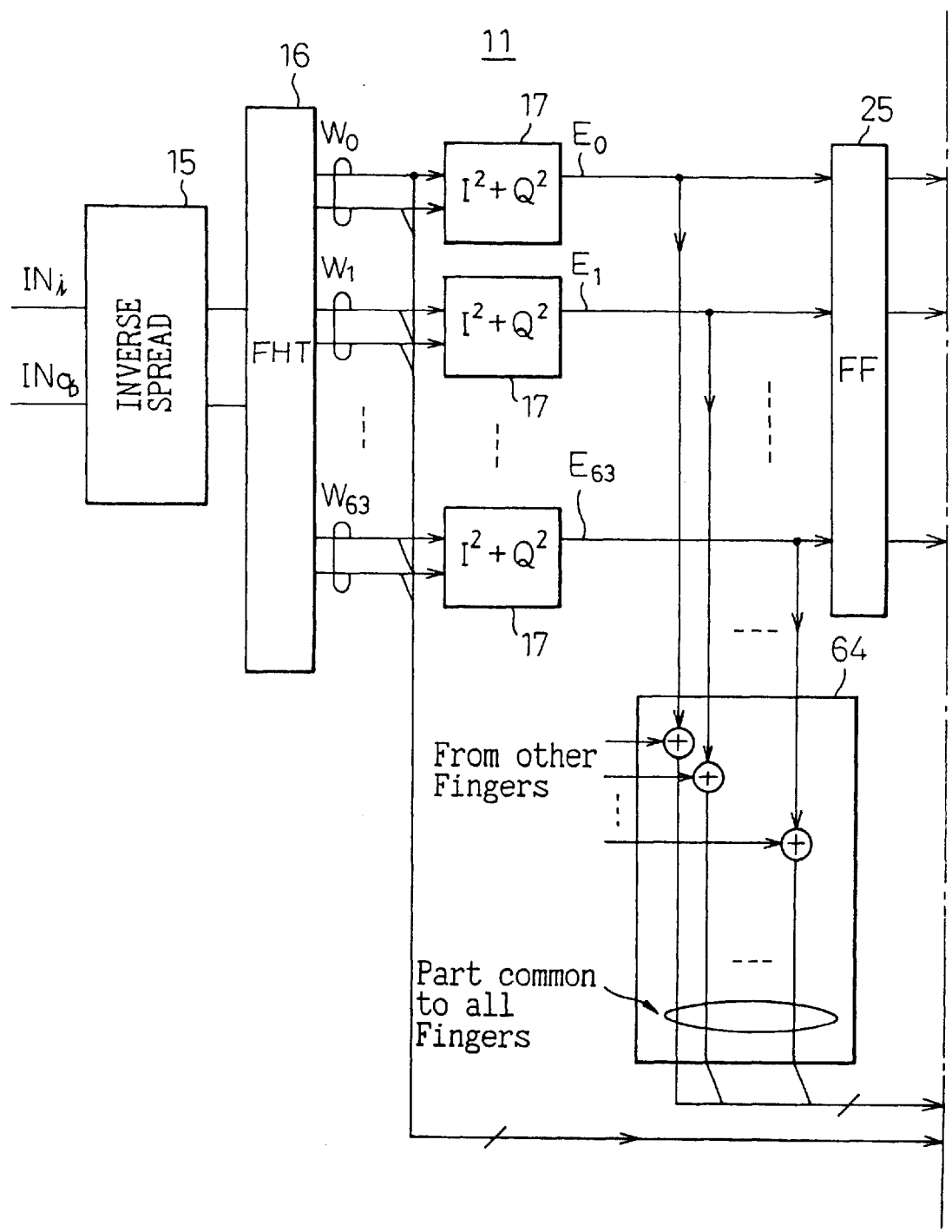
FIG. 24 is a first part of a view of a fifth embodiment of the demodulation apparatus based on the present invention.
Figure 25:
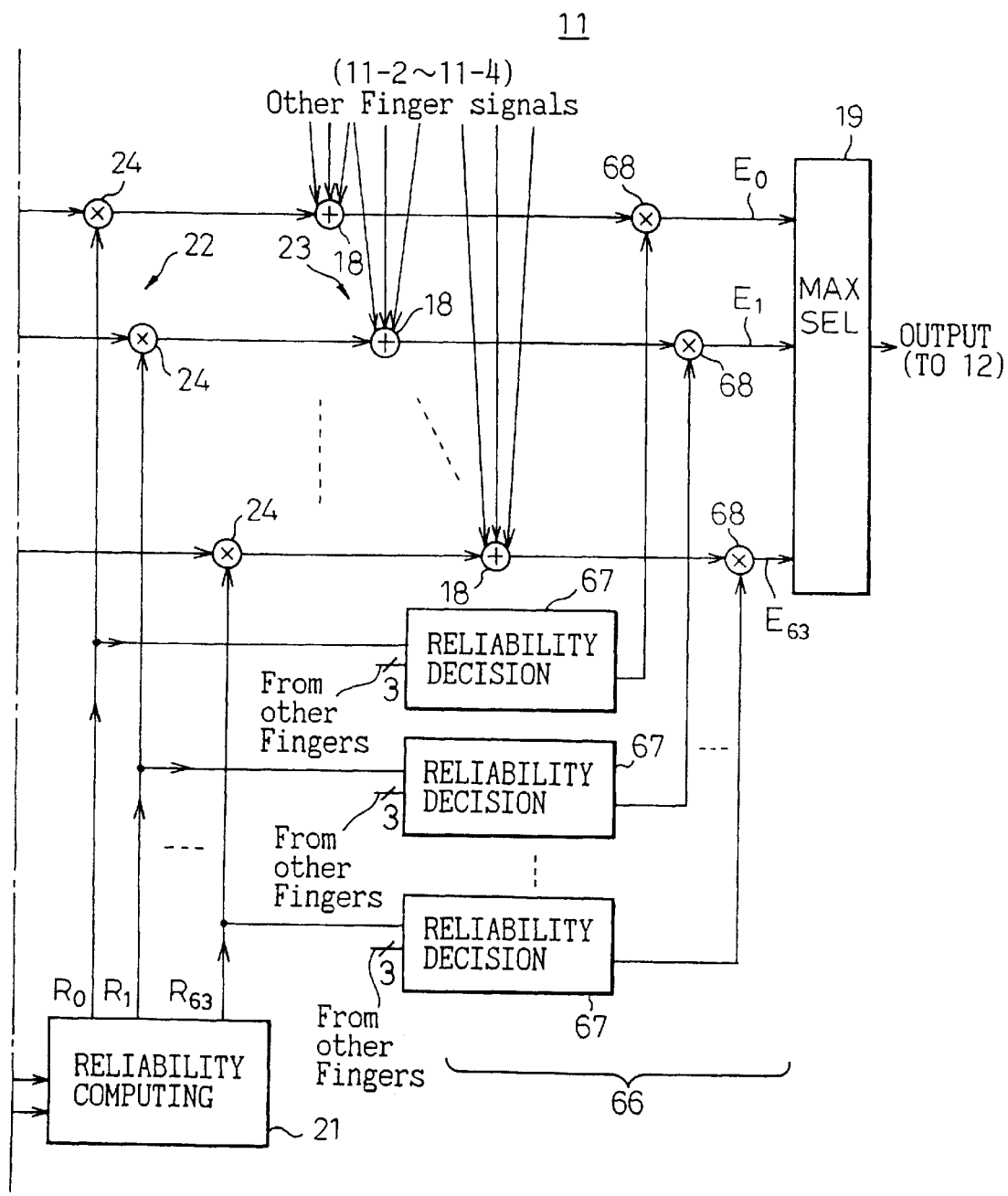
FIG. 25 is a second part of a view of the fifth embodiment of the demodulation apparatus based on the present invention.

FIG. 24 and FIG. 25 are first and second parts of a view of a fifth embodiment of the demodulation apparatus based on the present invention.

The configuration shown in FIG. 24 and FIG. 25 shows a configuration obtained by applying the concept of this fifth embodiment to the fourth embodiment as an example, but the concept can be similarly applied to other embodiments as well. The same is true for the entire explanation of the present invention.

The fifth embodiment also pays particular attention to the fact that the finger demodulating unit 11 is constituted by a plurality of demodulators (Fingers) 11-1 to 11-4 as shown in FIG. 37. The correlation energies similarly created in a plurality of demodulators (Fingers) are input in correspondence with the Walsh numbers (W0, W1, . . . , W63) to obtain high precision reliability R. It is multiplied with the corrected correlation energy, and it is further added to the correlation energies from each finger demodulating unit 11 to obtain the optimum reliability by the predetermined calculation using the reliability R computed in each finger demodulating unit 11, and it is multiplied for every Walsh number. By this, it becomes possible to perform more correct demodulation by further optimizing the value obtained by combining the corrected correlation energies from other fingers (by the combining means 23).

Referring to FIG. 24 and FIG. 25, the fifth embodiment is characterized in that provision is made of a reliability optimizing means 66 for receiving as input the reliabilities R obtained by collection from all demodulators 11-1 to 11-4 in correspondence with the Walsh numbers and selecting the optimum reliability (an example of this optimum selection is described later) and further multiplying this with the corrected correlation energy in correspondence with each Walsh number when the demodulation is carried out by a finger demodulating unit comprising a plurality of demodulators connected to each other in parallel.

The reliability optimizing unit 66 can be constituted by a reliability decision unit 67 for deciding the optimum reliability based on the reliabilities R input in correspondence with the Walsh numbers and a multiplier unit 68 for further multiplying the reliability decided by this reliability decision unit 67 with each corrected correlation energy in correspondence with each Walsh number in front of the maximum energy selecting means 19.

Figure 26:
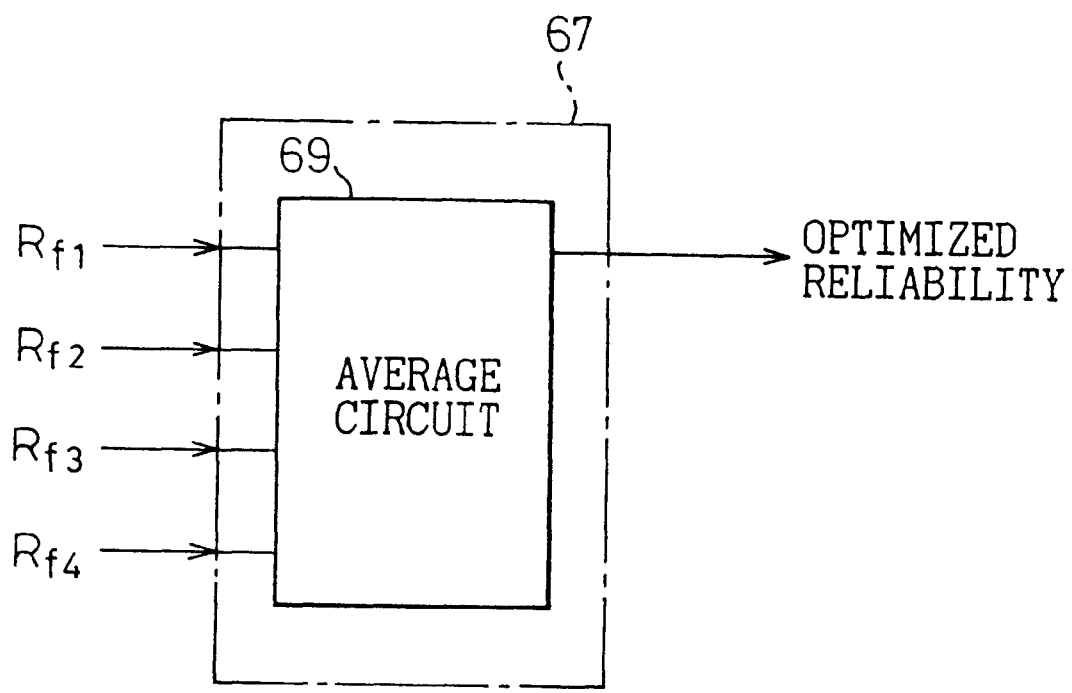
FIG. 26 is a view of a first example of a reliability decision unit 67.

FIG. 26 is a view of a first example of the reliability decision unit 67. This reliability decision unit 67 produces the optimum reliability by taking the average value of reliabilities Rf1 to Rf4 obtained by collection from all demodulators (Finger1 to Finger4) 11-1 to 11-4. It adopts an average circuit 69 for this purpose. That is, it performs the calculation of (Rf1+Rf2+Rf3+Rf4)/4. In this case, if the searcher assigns for example only two demodulators 11-1 and 11-2, the calculation becomes (Rf1+Rf2)/2. Note that which demodulator is to be assigned may be determined by the searcher and so on.

There is no guarantee that the corrected correlation energy obtained for every Walsh number by each demodulator (Finger) will always be correct. There may be a case where for example the corrected correlation energy E0 having the Walsh No. W0 appears abnormally large in for example the demodulator 11-1 due to for example noise. That is, Rf1 becomes an abnormal value. In such a case, by making the other three normal values Rf2 to Rf4 act upon that Rf1 (averaged), Rf1 can be kept from becoming the dominant value. By this, correct demodulation can be expected.

Figure 27:
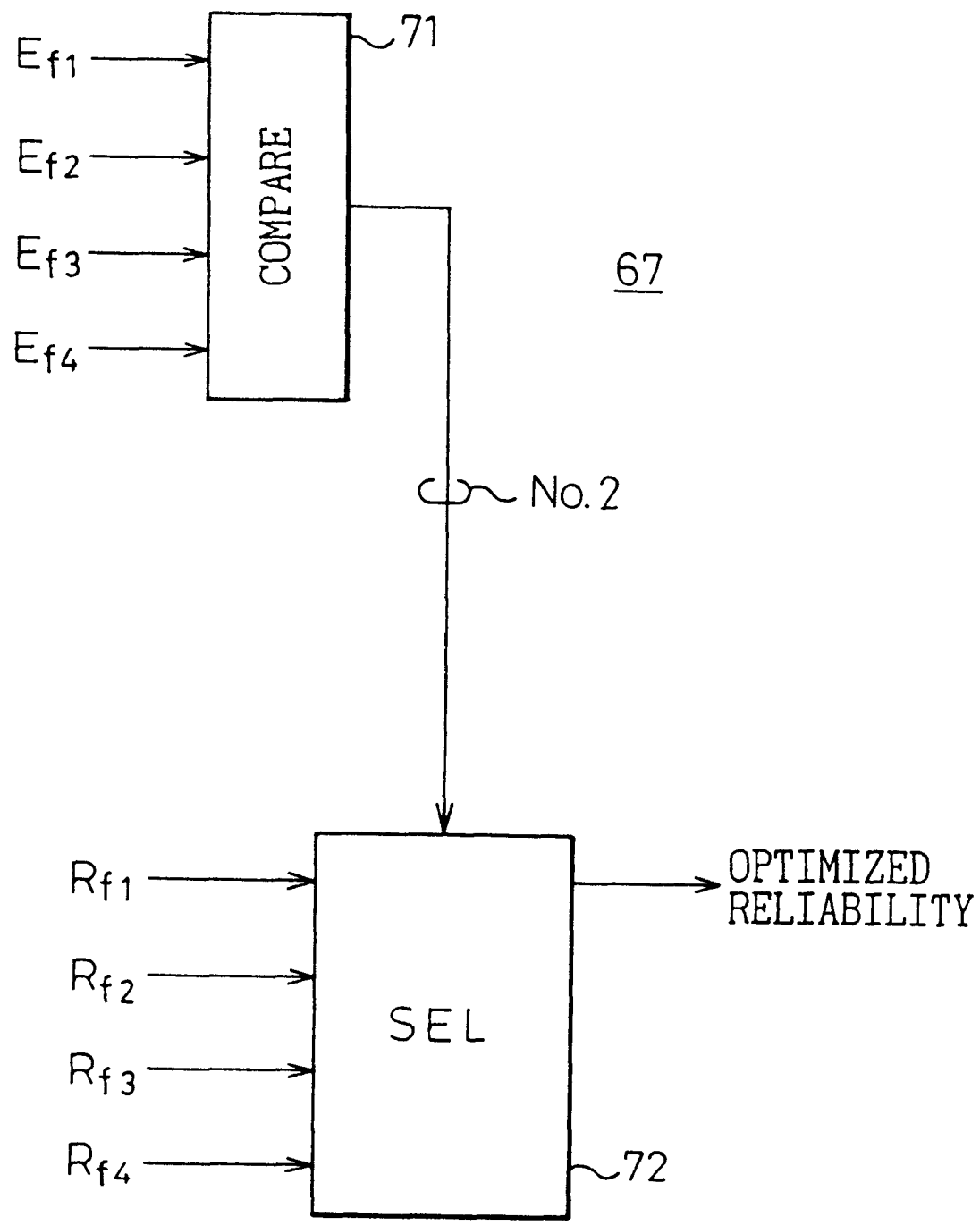
FIG. 27 is a view of a second example of the reliability decision unit 67.

FIG. 27 is a view of a second example of the reliability decision unit 67. This reliability decision unit 67 selects the reliability from the demodulator creating the second largest corrected correlation energy among corrected correlation energies Ef1 to Ef4 created at these demodulators from among reliabilities Rf1 to Rf4 obtained by collection from all demodulators 11-1 to 11-4 and defines this as the optimum reliability (optimized reliability).

As mentioned above, due to for example noise, there may exist a case where for example the corrected correlation energy E0 having the Walsh No. W0 appears abnormally large in for example the demodulator 11-1. In such a case, if the reliability from the demodulator creating the next largest (second largest) corrected correlation energy, for example, E1 is used, correct demodulation is made with a considerably high probability. This is based on results of various experiments or simulations.

Referring to FIG. 27, a comparing circuit 71 finds the second largest corrected correlation energy among corrected correlation energies created in the demodulators. Then, a selecting circuit 72 selects the reliability from the demodulator creating the second largest corrected correlation energy found by the comparing circuit 71 from among reliabilities obtained by collection from the demodulators.

Figure 28:
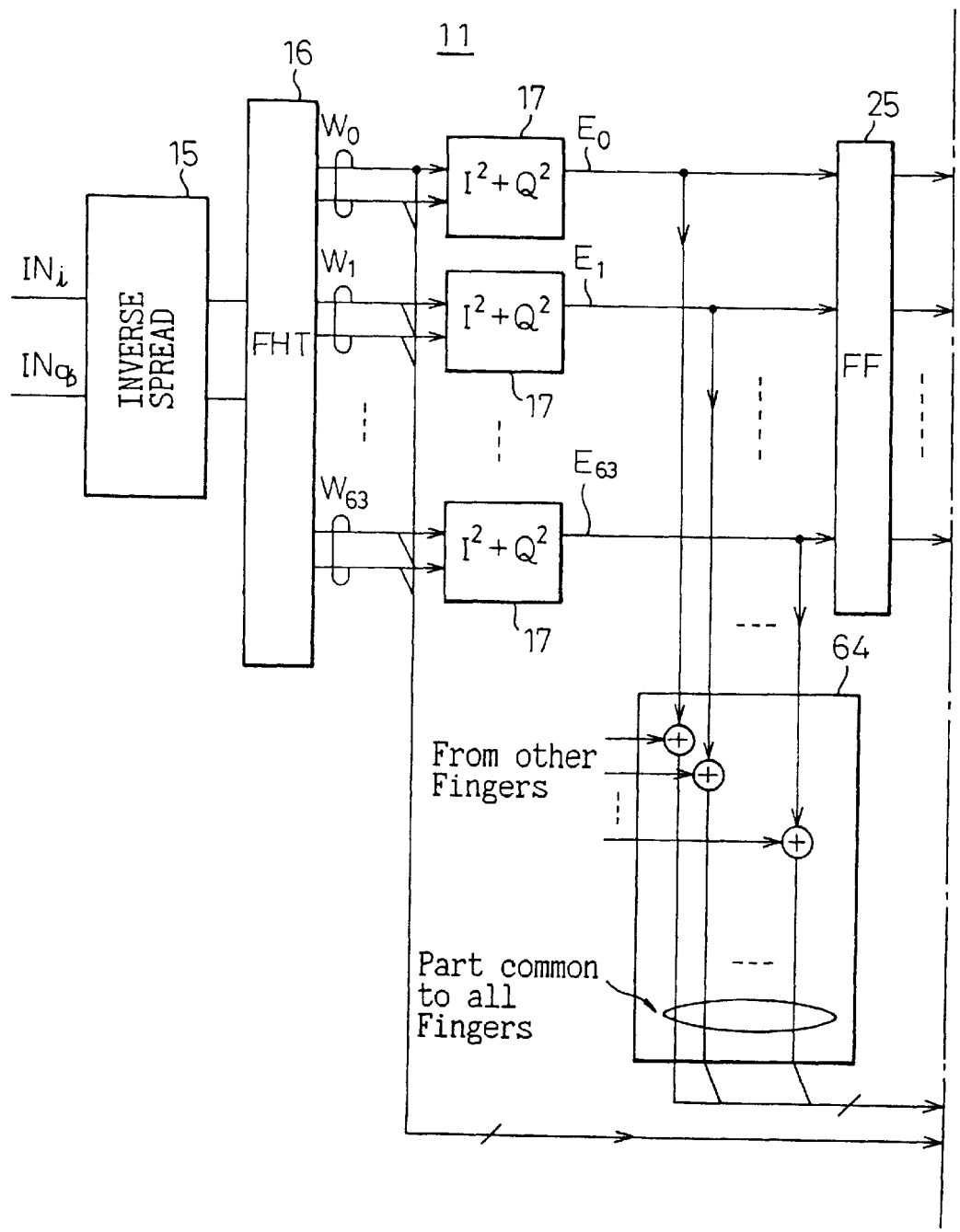
FIG. 28 is a first part of a view of the demodulation apparatus in a case where the reliability decision unit 67 shown in FIG. 25 is used.
Figure 29:
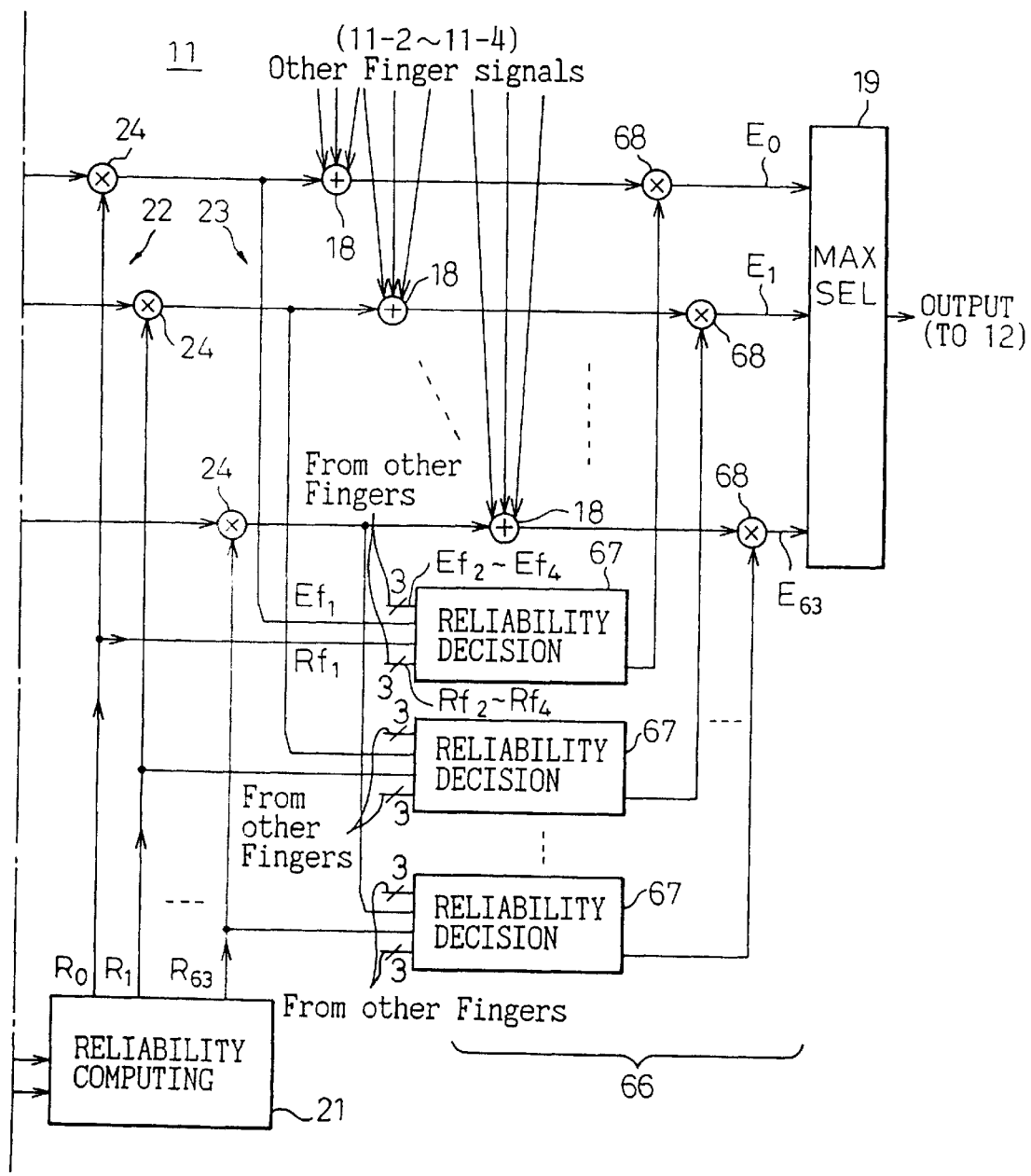
FIG. 29 is a second part of a view of the demodulation apparatus in a case where the reliability decision unit 67 shown in FIG. 25 is used.

FIG. 28 and FIG. 29 are a first and second part of a view of the demodulation apparatus of a case where the reliability decision unit 67 shown in FIG. 27 is used.

Note this reliability decision unit 67 is shown applied to the fifth embodiment (FIGS. 24 and 25) as an example. As shown in FIG. 29, each reliability decision unit 67 receives as its input not only the corrected correlation energy from the Finger itself and the reliability, but also the corrected correlation energy from other Fingers and the reliability.

Figure 30:
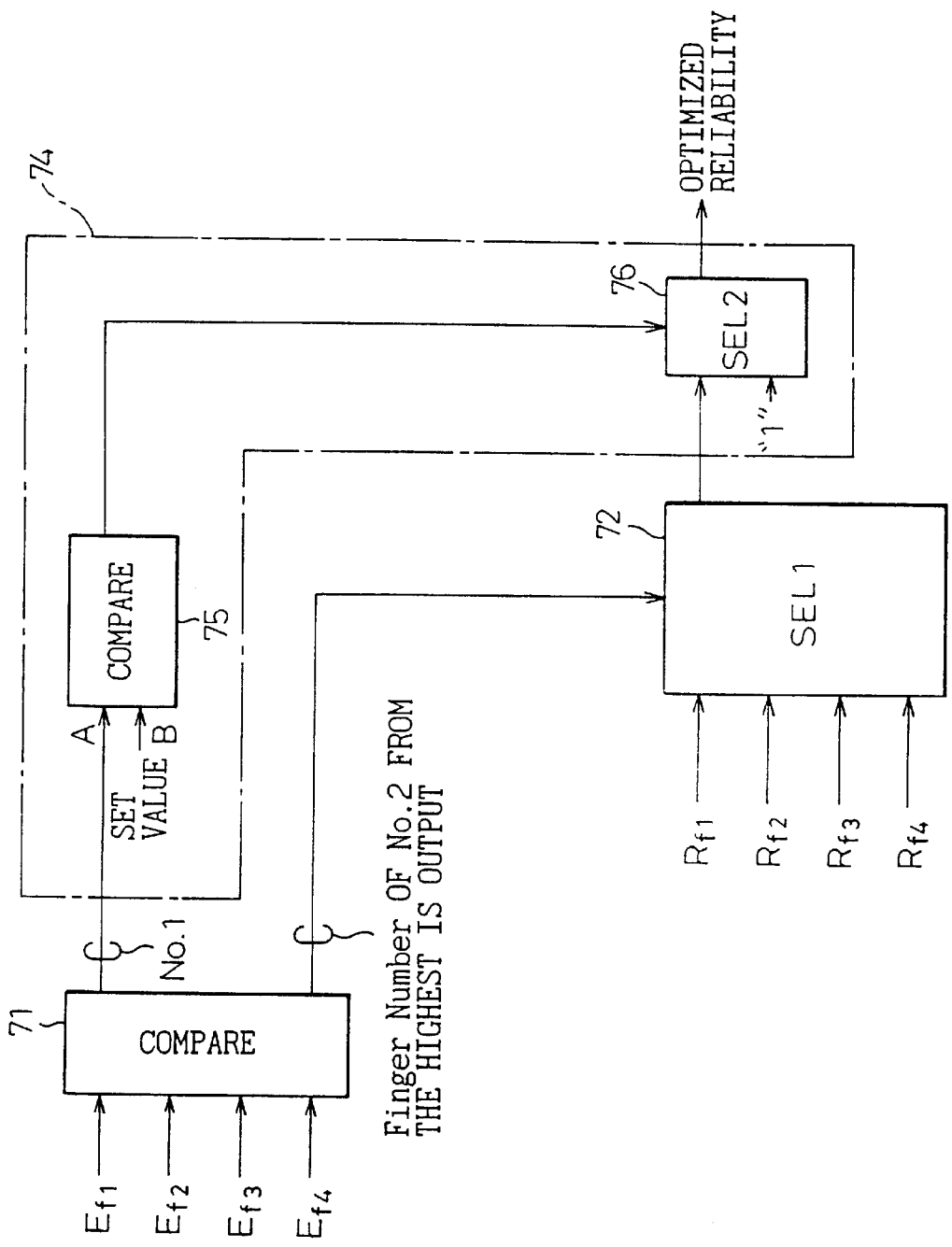
FIG. 30 is a view of a third example of the reliability decision unit 67.

FIG. 30 is a view of the third example of the reliability decision unit 67. In this third example, compared with the second example (FIG. 27), reliability dominated by an extremely large corrected correlation energy can be further finely eliminated. Specifically, only when the first largest corrected correlation energy A among corrected correlation energies Ef1 to Ef4 created at demodulators 11-1 to 11-4 is larger than the predetermined set value B (the value may be set, when a corrected correlation energy becomes too large, as a value which indicates that there is a high possibility that its reliability is not accurate.), the reliability (either of Rf1 to Rf4) from the demodulator creating the second largest corrected correlation energy is defined as the intended optimum reliability, while when this first largest corrected correlation energy is smaller than the set value B, as the optimum reliability, the reliability=1 is set. A comparing/selecting means 74 performs this. The blocks of 71 and 72 are as shown in FIG. 27. The means 74 comprises for example a comparing circuit 75 and a selecting circuit (SEL2) 76. The comparing circuit 75 makes the selecting circuit 76 select the output corresponding to the second largest energy (No. 2) from the selecting circuit (SEL1) 72 when A>B, while makes the selecting circuit 76 output the reliability=1 as the optimized reliability when A<B. As the set value B, the energy value from the Finger having the first largest energy is set in advance.

Figure 31:
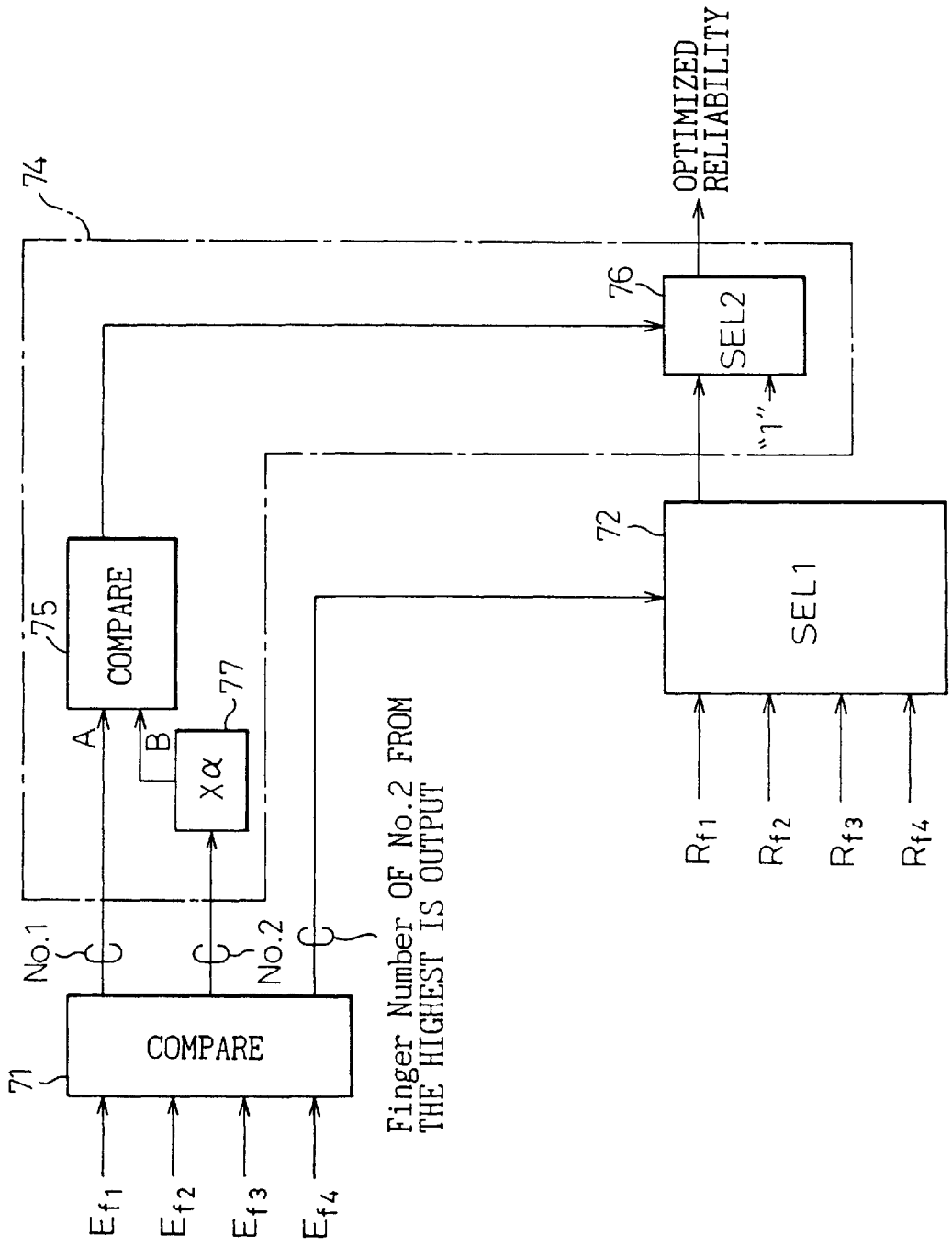
FIG. 31 is a view of a fourth example of the reliability decision unit 67.

FIG. 31 is a view of a fourth example of the reliability decision unit 67. The difference from the third example shown in FIG. 30 resides in that the set value B to be applied to one input of the comparing circuit 75 is not a fixed value (case of the third example), but a relative value. This relative value is α (α>1) times the second largest (No. 2) corrected correlation energy α is indicated as α=2, α=4, or the like in real examples. This α becomes the system parameter.

For this reason, in FIG. 31, a multiplier (×α) 77 is further provided in the comparing/selecting means 74 constituting the reliability decision unit 67 of the fourth example.

As already mentioned, it has been experimentally confirmed that the second largest energy usually does not become an abnormal value and that by using this value as the set value, a reverse-link rich in flexibility can be realized.

Thus, in the fourth example, the set value B was set α times (α>1) of the second largest corrected correlation energy among corrected correlation energies Ef1 to Ef4, therefore, as shown in FIG. 31, it is constituted so as to further provide the multiplier 77 for multiplying the second largest corrected correlation energy by α (α>1) and use the α-times output of the multiplier 77 as the set value B.

Due to the various embodiments mentioned in detail above, the error rate characteristics in the reverse-link are greatly improved (refer to FIG. 36 mentioned later). However, 64 calculations and computations for each of the Walsh Nos. W0 to W63 are carried out with respect to the output from the Fast Hadamard Transform unit 16. Accordingly, an enormous processing process and hardware become necessary.

In order to solve this, in the present invention, the following two procedures will be proposed. The first procedure is thinning, and the second procedure is a high speed operational processing. First, an explanation will be made of the first procedure.

Figure 32:
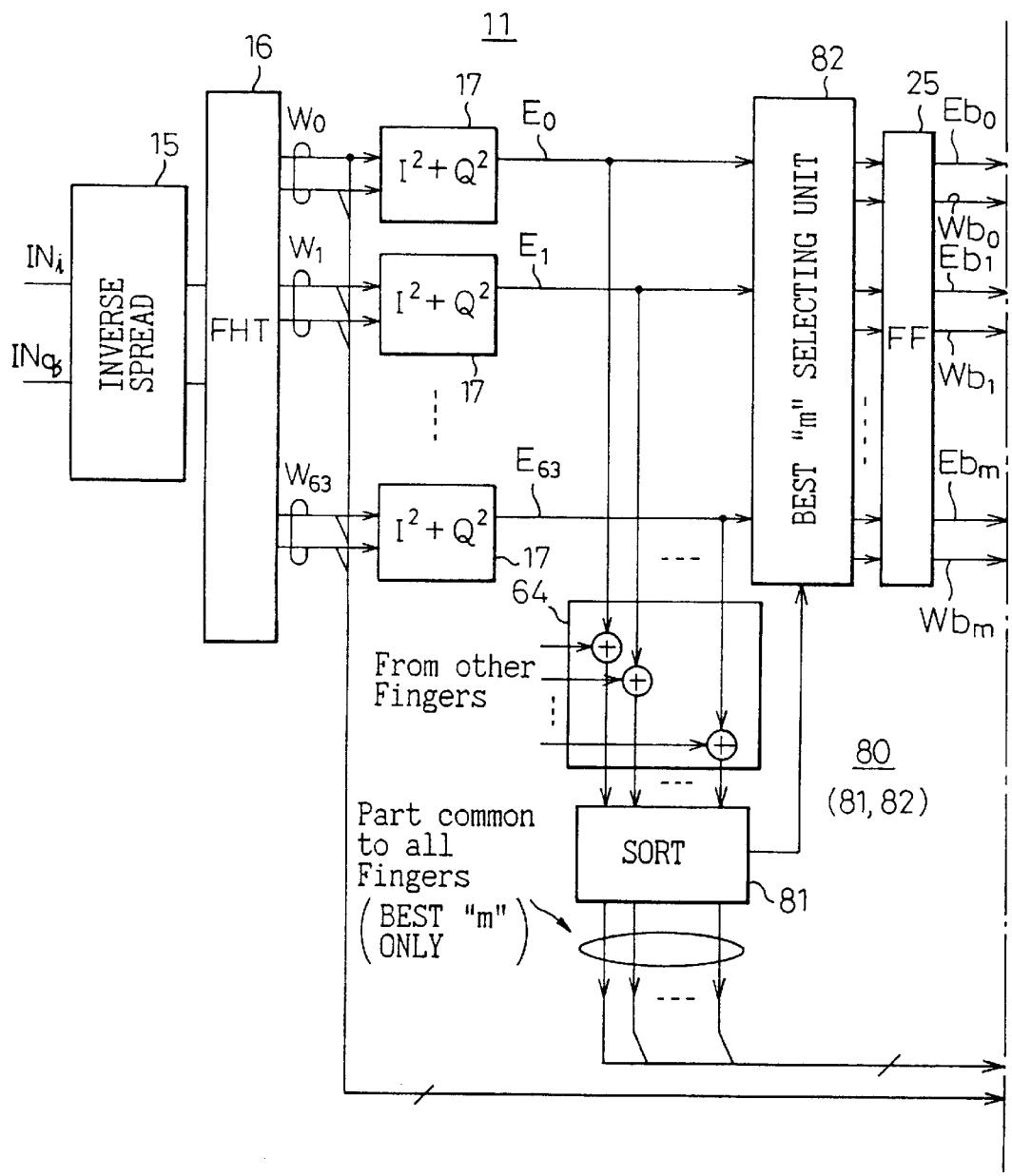
FIG. 32 is a first part of a view of a demodulation apparatus having a thinning processing means.
Figure 33:
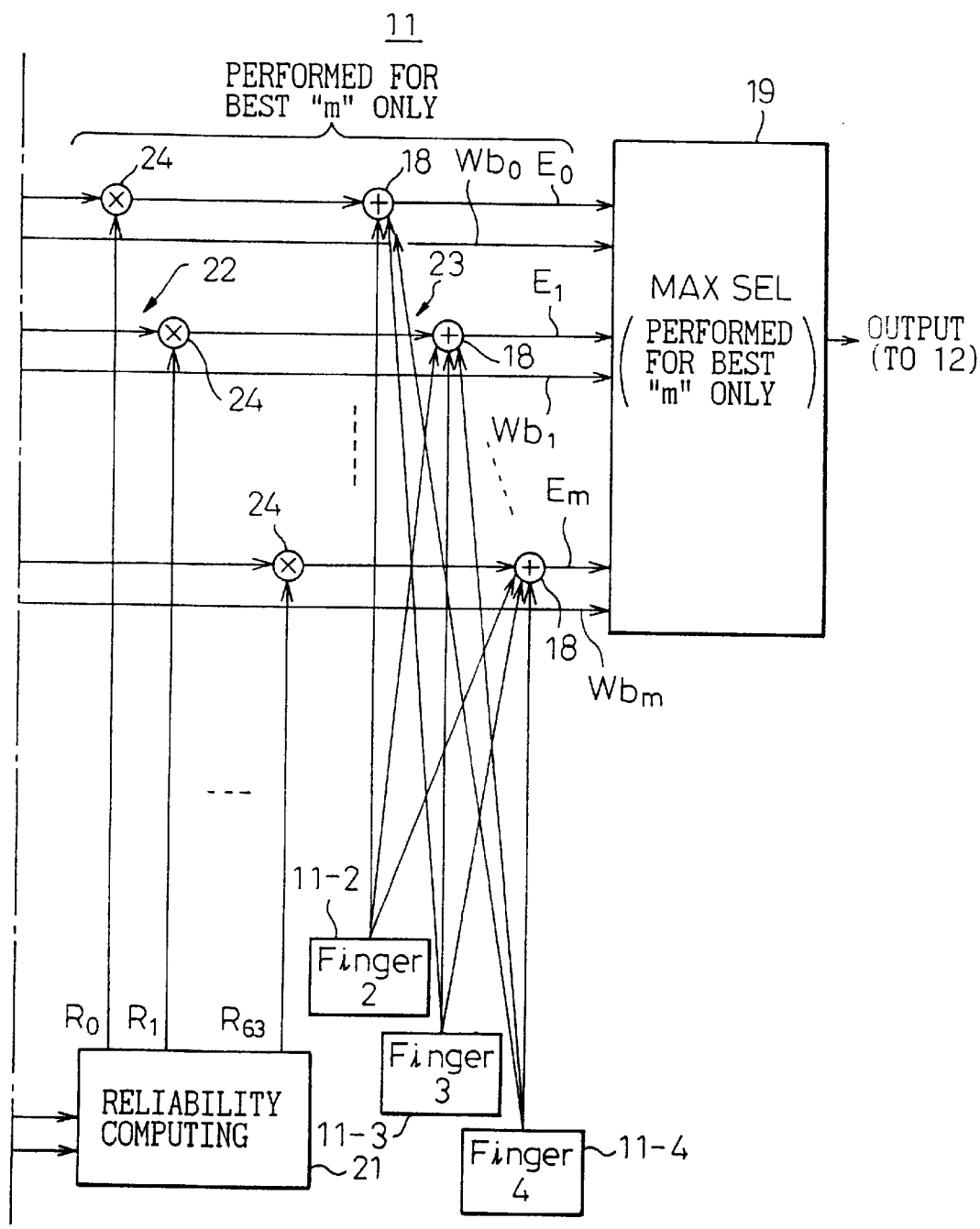
FIG. 33 is a second part of a view of the demodulation apparatus having the thinning processing means.

FIG. 32 and FIG. 33 are a first and second part of a view of the demodulation apparatus having the thinning means.

Note that, this thinning means can be applied to all of the embodiments, but, here, a case where it is applied to the fourth embodiment of FIGS. 22 and 23 is exemplified.

According to this thinning (first procedure), the thinning is carried out so as to make the correlation energies (either of E0, E1, ..., E63) whose reliability R is to be computed the correlation energies for the Walsh numbers corresponding to m number of correlation energies from the first largest correlation energy to the m-th (integer in a range of 1<m<64) largest correlation energy among the correlation energies among the Walsh Nos. W0, W1, ..., W63.

According to the experimental results, when m is set equal to 8, that is where the best eight correlation energies corresponding to 64 Walsh numbers are selected and the reliability is computed, the accuracy thereof is considerably near that of the case where the reliability is computed for all of 64 correlation energies.

That is, it was seen that, in such thinning, of course, calculation error occurred and the error rate characteristic was slightly deteriorated, but there was no problem in practical use. The value of m is not limited to 8, but can be equal to 4 or equal to 16 too. It may be appropriately determined by a trade off of the calculation error and the hardware scale.

Referring to FIGS. 32 and 33, the thinning is carried out by a thinning means 80. The means 80 acts so as to perform the processing at the reliability computing means 21 and the correcting means 23 shown in FIG. 2 only for those of the Walsh numbers corresponding to the m number of correlation energies from the first largest correlation energy to the m-th (integer within the range of 1<m<64) largest correlation energy among the correlation energies of the Walsh numbers.

As a concrete example of the thinning means 80, in the figure, a sorting unit 81 and a best "m" selecting unit 82 are shown. The sorting unit 81 receives as its inputs 64 correlation energies corresponding to Walsh numbers (W0, W1, ..., W63), selects the best eight (when m=8) from among them, and then sequentially rearranges them. Further, it gives these eight correlation energies to the reliability computing means 21.

At this time, the information of the best eight selected at the sorting unit 81 is also given to the best "m" selecting unit 82. Then the correlation energies (Eb0 to Ebm) of the related best eight are input to the FF's 25 and further to the multipliers 24 where the corresponding reliabilities are multiplied with these energies. Further, the correlation energies of the best eight from other fingers are added to the above correlation energies by the adders 18 (the energies of each identical Walsh number are added) and these energies are given to the MAX SEL 19. Also, the corresponding Walsh number information is applied to the MAX SEL 19, together with the above correlation energies of the best eight. The MAX SEL 19 performs the judgement of the comparison in magnitude among the input correlation energies of the best eight only and then outputs the Walsh number corresponding to the thus judged maximum correlation energy.

Accordingly, it is enough only to provide, for each finger, the multipliers 24, the adders 18 and so on in correspondence with the best m (in this case, m is 8), and thereby the circuit configuration can be simplified.

Figure 34:
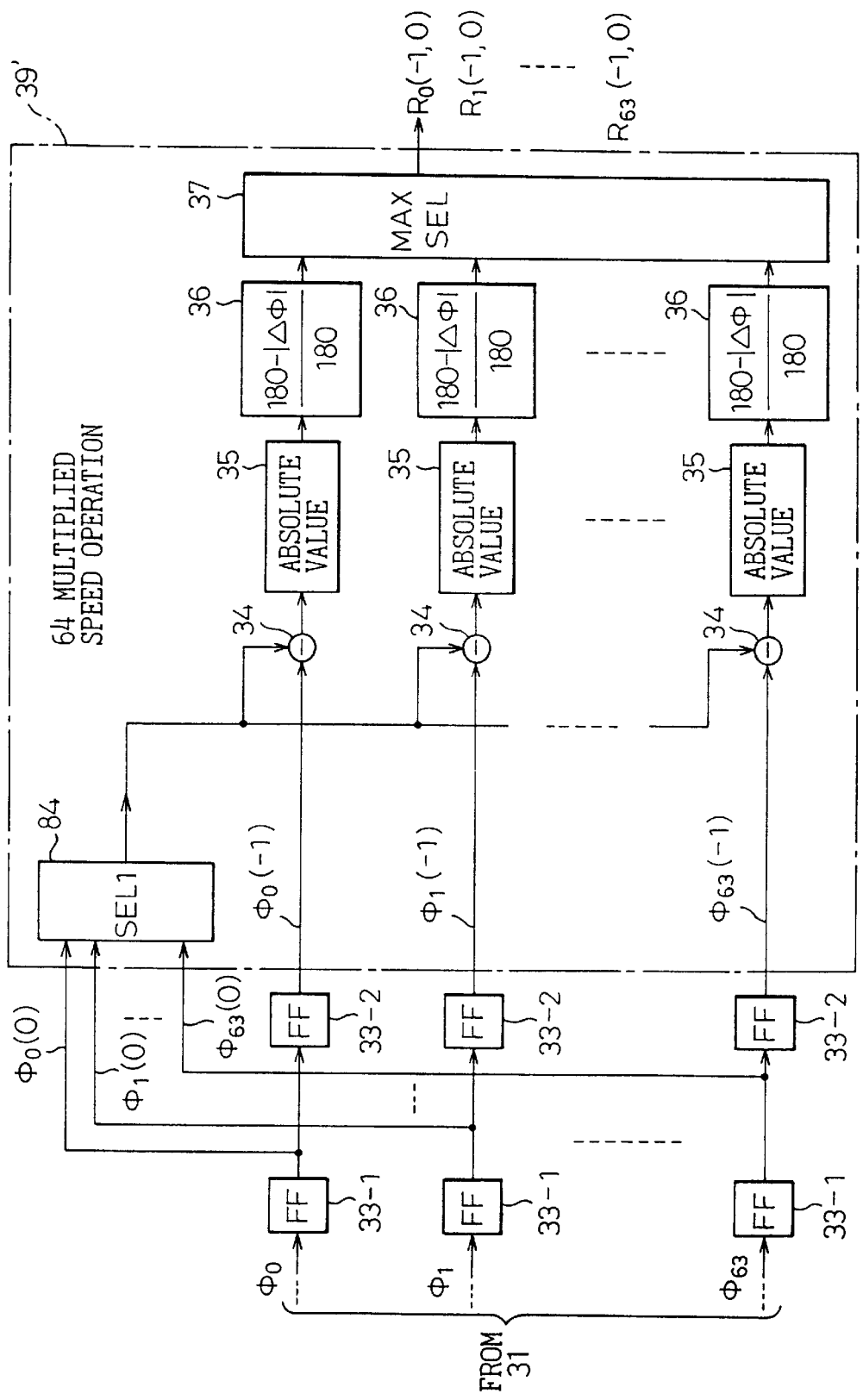
FIG. 34 is a view of a reliability calculating part 39' operating at a high speed.

Next, an explanation will be made of the high speed operational processing (second procedure). FIG. 34 is a view of a reliability computing part 39' operating at a high speed. When taking as an example FIG. 7 (first example of the reliability calculating unit 30), the reliability computing part 39' performs the computation with W0 to W63 for W0 at first, performs the computation with W0 to W63 for W1 second, . . . , and performs the computation with W0 to W63 for W63 (refer to a column of Tws=−1 of FIG. 3), therefore when the reliability computing part 39 is actually assembled by an LSI chip, the hardware thereof becomes enormous. However, the process to be executed is the same for all of W0 to W63 (although data are different), so the reliability computing part 39' is made to operate at a high speed by providing the selecting unit (SEL1) 84. For example, it is made to operate at a 64-times higher speed. The speed is made a high 64-times, and a processing time t is divided into 64, i.e., t0 to t63. The reliability computing part 39' selects W0 by the selecting unit 84 at a processing time t0, and performs the computation with W0 to W63 for that W0. Next, at t1, it selects W1 by the selecting unit 84, and performs the computation with W0 to W63 for that W1. The same is true below for t2→t3→ . . . t63.

Thus, the reliability computing part 39' is repeatedly used 64 times for Walsh numbers, but the hardware is greatly reduced by that amount.

Figure 35:
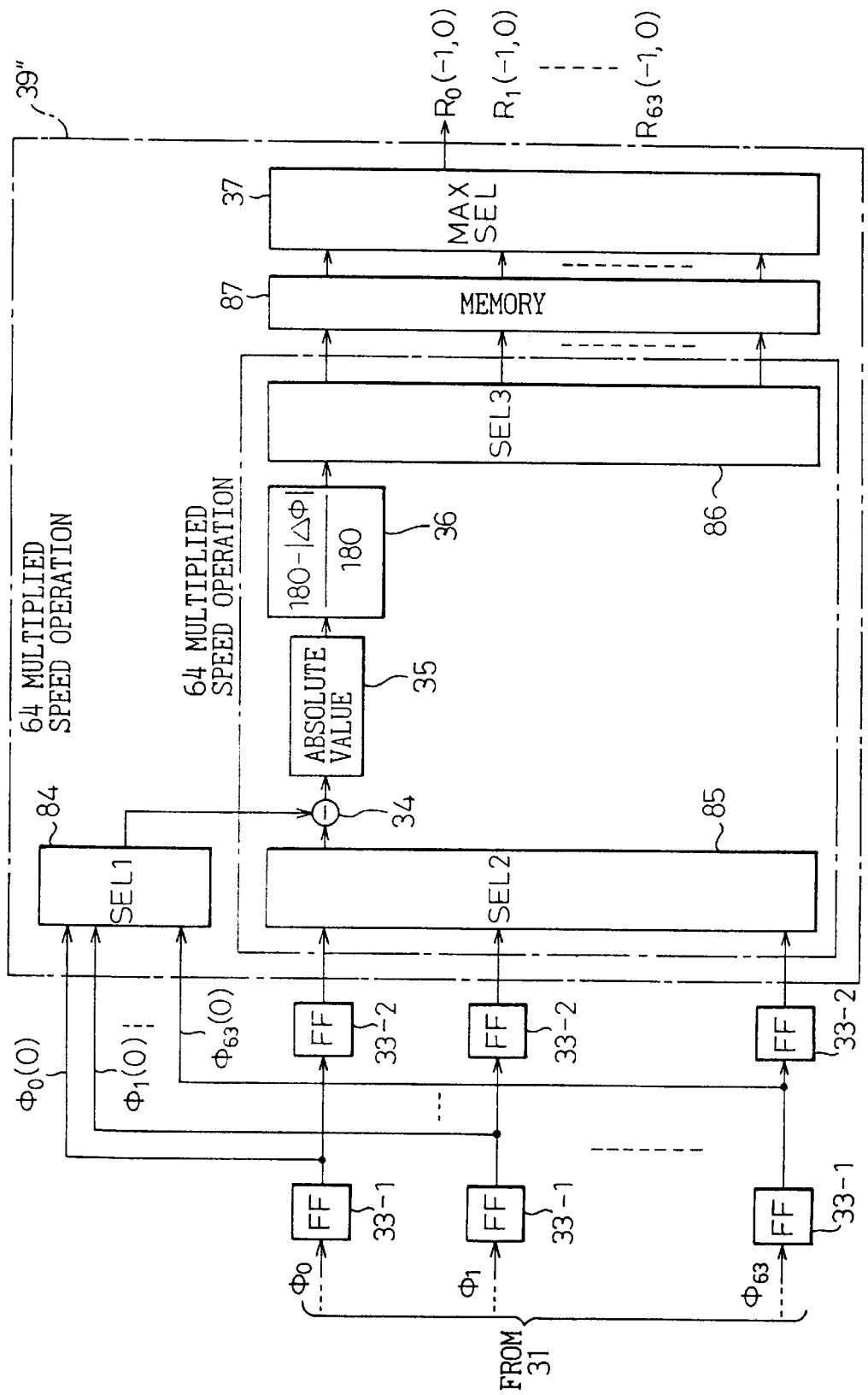
FIG. 35 is a view of a reliability calculating part 39" operating at a high speed.

FIG. 35 is a view of a reliability computing part 39" operating at a high speed. In the structure of the present figure, by further adding a selecting unit (SEL2) 85, a selecting unit (SEL3) 86, and a memory 87 compared with the case of FIG. 34, the subtractor 34, the absolute value circuit 35, and the reliability calculating circuit 36 are made to operate at a further higher speed of 64 times (4096 times), and the hardware of these parts (34, 35, and 36) is greatly reduced.

The selecting unit (SEL2) 85 sequentially applies outputs on the FF33-2 side from W0 to W63 to the subtractor 34 at processing times t'00, t'01, . . . , t'063 obtained by further dividing the above processing time t0 into 64, similarly sequentially applies outputs on the FF33-2 side from W0 to W63 to the subtractor 34 at processing times t'10, t'11, . . . , t'163 obtained by further dividing the above processing time t1 into 64, . . . , and sequentially applies outputs on the FF33-2 side from W0 to W63 to the subtractor 34 at processing times t'630, t'631, . . . , t'6363 obtained by further dividing the above processing time t63 into 64.

The selecting unit (SEL3) sequentially selects the outputs obtained from the reliability calculating circuit 36 at processing times t'00 to t'063, t'10 to t'163, . . . , and t'630 to t'6363 and further stores them once in a memory 87 of the next stage. The maximum reliability selecting circuit 37 selects the maximum value from the stored data in the memory 87.

Thus, the second procedure is characterized in that, when computing the certainty of the value of each correlation energy as the reliability R for correlation energies E0, E1, . . . , E63 for the Walsh numbers W0, W1, . . . , W63, the processing time (t) for the computation is divided by the number (64) of the Walsh numbers, and the processing for the computation is carried out by the high speed operation in each divided processing time (t0, t1, . . . , t'00, t'01, . . . )

Figure 36:
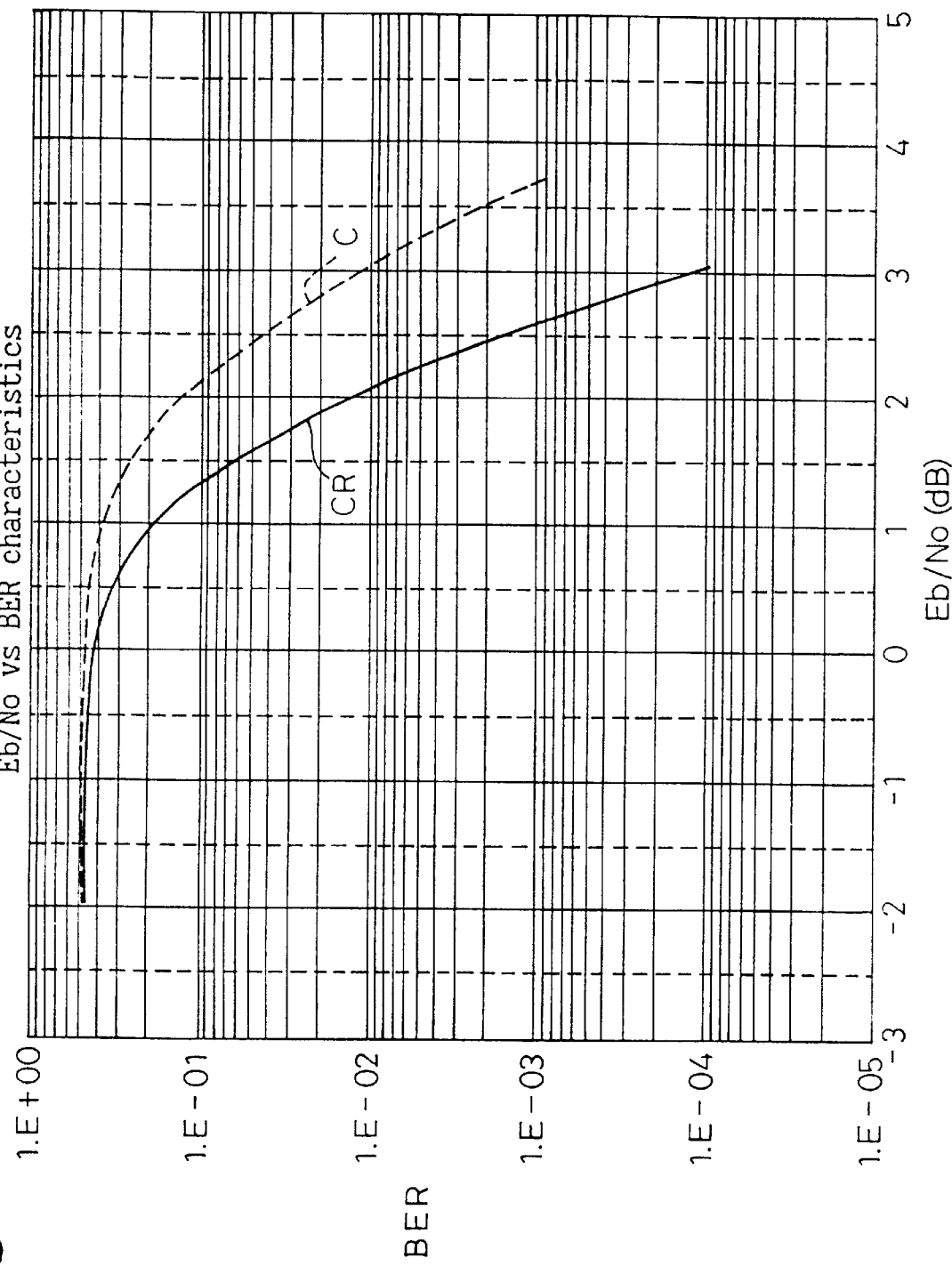
FIG. 36 is a graph of the error rate characteristic.

FIG. 36 is a graph of the error rate characteristic. This shows a so-called Eb/No vs BER characteristic. The Eb/No (noise amount normalized by bandwidth) is plotted on the abscissa, while the BER (bit error rate) is plotted on the ordinate. In the present graph, a curve C represents the characteristic obtained by the demodulation apparatus of the related art shown in FIG. 38, while a curve CR represents the characteristic obtained by the demodulation apparatus of the present invention shown in FIG. 2, that is, the characteristic obtained by multiplying the reliability R. By this, it is seen that the error rate characteristic (CR) according to the present invention has a gain of about 1 dB with respect to the error rate characteristic (C) of the related art.

Note that the characteristic shown in the present graph is the characteristic where the Viterbi coding/decoding is adopted and is the characteristic where the finger demodulating unit 11 operates with 2 Fingers.

Note that, in the embodiments of the present invention, the explanation has been given by supposing a case where the embodiments are applied to a reverse channel operated under an asynchronous detection system, particularly proposed in the IS-95 standard system, however, the present invention is not limited to such embodiments. That is, the present invention may be applicable to a reception apparatus and a system which perform a signal decision by using a correlation between predefined codes and a transmitted signal modulated by not only the OQPSK modulation method but also the other modulation signal methods.

Further, in the above embodiments, the Walsh codes are used as the predefined codes, however, it may also be possible to use a signal, as the predefined codes, which exhibits correlation characteristics such as pseudo random-sequence (PN) codes etc.

Moreover, according to the above embodiments of the present invention, in reflecting a correlation to achieve the signal decision, the correlation in terms of the consecutive Walsh symbol times is utilized. However, it may also be possible to reflect the relationship between the correlation at Tws=−2 and the correlation at Tws=0 to achieve the signal decision. Note here that, as the times (Tws) are separated far from each other, the phase difference angle $\Phi \Delta f$ and so on introduced in the aforementioned embodiments have to be taken into consideration.

Also, according t o the above embodiments, reliability is calculated by using the correlation between the predefined codes and a received signal existing before or after, in the time domain, the received signal to be an object of the signal decision, and by multiplying the reliability with each correlation energy, and thereby the result is reflected to the signal decision. However, since the present invention is characterized by reflecting the correlation between the predefined codes and a received signal existing before or after, in the time domain, the received signal to be the object of the signal decision, which concept has not been known so far, it is also possible to employ other calculation method wherein a predefined code is obtained which seems to be certain in view of the correlation between predefined codes and a received signal existing before or after, in the time domain, the received signal to be an object of the signal decision and the above certain predefined code is selected in the signal decision as the certain transmitted data from the transmission side.

As explained in detail above, according to the present invention, by adopting the concept of reliability (R), a good error rate characteristic almost equivalent to the error rate characteristic achieved by the reverse-link of a synchronous system is realized although it is the reverse-link of an asynchronous system. For this reason, when referring to the characteristic of FIG. 36, each cellular unit in the mobile communications system can be given the capacity to accommodate about 25% more users than in the related art.

What is claimed is:

1. A radio communications system comprising:

a transmission apparatus for transforming data to be transmitted in accordance with predetermined codes and further performing a predetermined modulation to the transformed data to transmit the data as a modulated wave; and a reception apparatus comprised of a signal reproducing means for performing a signal decision for a received signal, by using a correlation between said predetermined codes having correlation characteristics and the received signal obtained by demodulating said transmitted modulated wave, and a reflecting means for reflecting a correlation to the signal decision at said signal reproducing means, which correlation is obtained between said predetermined code and the received signal received before or after, in the time domain, said present received signal.

2. A reception apparatus comprising:

a signal reproducing means for performing a signal decision with respect to a received signal by using a correlation between predefined codes having correlation characteristics and the received signal obtained by demodulating a modulated wave transmitted from a transmission side; and a reflecting means for reflecting a correlation to the signal decision at said signal reproducing means, which correlation is obtained between said predefined codes and the received signal received before or after, in the time domain, said present received signal.

3. A reception apparatus comprising:

a signal reproducing means for performing a signal decision for a received signal by using a correlation between predefined codes having correlation characteristics and the received signal obtained by demodulating a phase-modulated wave transmitted from a transmission side; and a reflecting means for reflecting a correlation for the signal decision at the signal reproducing means, which correlation is obtained between said predefined codes and the received signal received before or after, in the time domain, said present received signal.

4. A reception apparatus comprising:

a signal reproducing circuit for performing a signal decision with respect to a received signal by using a correlation between predefined codes having correlation characteristics and the received signal obtained by demodulating a certain modulation signal transmitted from a transmission side; and a reflecting circuit for reflecting a correlation to the signal decision at said signal reproducing circuit, which correlation is obtained between said predefined codes and the received signal received before or after, in the time domain, said present received signal, wherein the received signal is subjected to M-sequence orthogonal modulation as said predefined codes consisting of Walsh codes corresponding to Walsh numbers are processed in said signal reproducing circuit to reproduce the received signal as I-channel input signals and Q-channel input signals, said reflecting circuit produces correlation energies (E0, E1, . . . ) for every said Walsh number from outputs after Hadamard Transform processing, the maximum correlation energy among these correlation energies is selected, and the signal corresponding to the Walsh number corresponding to this is demodulated as the received signal, and said reflecting circuit is comprised of a reliability computing means for computing the certainty of the value of each correlation energy as the reliability for the correlation energy for every said Walsh number, a correcting means for acquiring a corrected correlation energy by introducing said corresponding reliabilities with respect to said correlation energies to obtain corrected correlation energies, and a maximum energy selecting means for selecting said maximum correlation energy from among obtained corrected correlation energies by using said corrected correlation energies.

5. A demodulation apparatus as set forth in claim 4, wherein a combining means for collecting and combining said corrected correlation energies obtained at all of said demodulators for every Walsh number when said demodulation is carried out by a finger demodulation unit comprising a plurality of demodulators connected to each other in parallel is provided in a front stage of said maximum energy selecting means.

6. A demodulation circuit as set forth in claim 4, wherein:

said reliability computing means has a reliability calculating unit and the reliability calculating unit receives as its inputs an I-channel correlation electric power (Ei) and a Q-channel correlation electric power (Eq) obtained after said Hadamard Transform for every said Walsh number, calculates the receiving phase angle from values of said I-channel and Q-channel correlation electric powers for each two consecutive Walsh symbol times, and outputs said reliability based on the obtained receiving phase angle.

7. A demodulation circuit as set forth in claim 6, wherein the phase difference angle between obtained two said receiving phase angles is calculated, and said reliability is output based on the phase difference angle.

8. A demodulation circuit as set forth in claim 7, wherein said reliability is computed based on said phase difference angle for every said Walsh number, and the maximum reliability among the computed reliabilities is output as said reliability.

9. A demodulation circuit as set forth in claim 7, wherein, where said phase difference angle is $\Delta\Phi$, said reliability is computed by the phase difference angle normalized by (180 deg−|$\Delta\Phi$|)/180 deg.

10. A demodulation circuit as set forth in claim 4, wherein said reliability computing means has a reliability calculating unit, and said reliability calculating unit contains a receiving phase angle creation circuit which receives as its inputs the I-channel correlation electric power (Ei) and the Q-channel correlation electric power (Eq) obtained after said Hadamard Transform for every said Walsh number and creates the receiving phase angle from values of said I-channel and Q-channel correlation electric powers.

11. A demodulation circuit as set forth in claim 4, wherein said reliability computing means has a reliability calculating unit, and said reliability calculating unit contains a signal transition circuit which receives as its inputs the I-channel correlation electric power (Ei) and the Q-channel correlation electric power (Eq) obtained after said Hadamard Transform and acquires the receiving phase angle for each two consecutive Walsh symbol times.

12. A demodulation circuit as set forth in claim 11, wherein said signal transition circuit comprises cascade connected flip-flops.

13. A demodulation circuit as set forth in claim 4, wherein
said reliability computing means has the reliability calculating unit, and
said reliability calculating unit contains a subtractor which receives as its input two receiving phase angles created for each two consecutive Walsh symbol times from values of the I-channel correlation electric power (Ei) and the Q-channel correlation electric power (Eq) obtained after said Hadamard Transform, takes the difference between them, and outputs the same as the phase difference angle.

14. A demodulation circuit as set forth in claim 4, wherein provision is further made of an absolute value circuit for taking the absolute value of said phase difference angles.

15. A demodulation circuit as set forth in claim 4, wherein
said reliability computing means has a reliability calculating unit, and
said reliability calculating unit contains a reliability calculating circuit which acquires the receiving phase angle created from values of the I-channel correlation electric power (Ei) and the Q-channel correlation electric power (Eq) obtained after said Hadamard Transform for each two consecutive Walsh symbol times, acquires the phase difference angle as the difference between them, and calculates the reliability based on the phase difference angle.

16. A demodulation circuit as set forth in claim 15, wherein said reliability calculating circuit calculates said reliability by:

(180 deg−|ΔΦ|)/180 deg where said phase difference angle is ΔΦ.

17. A demodulation circuit as set forth in claim 4, wherein
said reliability computing means has a reliability calculating unit, and
said reliability calculating unit contains a maximum reliability selecting circuit which acquires two receiving phase angles created for each two consecutive Walsh symbol times from values of the I-channel correlation electric power (Ei) and the Q-channel correlation electric power (Eq) obtained after said Hadamard Transform for every said Walsh number, selects the maximum reliability among reliabilities for every Walsh number computed based on the phase difference angle obtained by taking the difference between them, and outputs said reliability to be sought.

18. A demodulation circuit as set forth in claim 4, wherein said reliability computing means comprises:
a first reliability calculating unit which acquires two receiving phase angles created for each of the present Walsh symbol time and the Walsh symbol time preceding this from values of the I-channel correlation electric power (Ei) and the Q-channel correlation electric power (Eq) obtained after said Hadamard Transform for every said Walsh number, calculates the first reliability based on the first phase difference angle between these receiving phase angles, and outputs the same, a second reliability calculating unit which acquires two receiving phase angles created for each of the present Walsh symbol time and the Walsh symbol time following this from values of the I-channel correlation electric power (Ei) and the Q-channel correlation electric power (Eq) obtained after said Hadamard Transform for every said Walsh number, calculates the second reliability based on the second phase difference angle between these receiving phase angles, and outputs the same, and a processing means which performs predetermined processing with respect to said first reliability and said second reliability and outputs said reliability to be sought.

19. A demodulation circuit as set forth in claim 18, wherein said processing means is an average circuit for taking the average value of said first reliability and said second reliability.

20. A demodulation circuit as set forth in claim 18, wherein said processing means is a maximum value selecting unit for selecting a larger one between said first reliability and said second reliability.

21. A demodulation circuit as set forth in claim 7, wherein said reliability calculating unit contains a weighting circuit that makes the reliability smaller as said phase difference angle becomes larger and makes the reliability larger as the phase difference angle becomes smaller.

22. A demodulation circuit as set forth in claim 15, wherein said reliability calculating unit contains a weighting circuit that makes the reliability smaller as said phase difference angle becomes larger and makes the reliability larger as the phase difference angle becomes smaller.

23. A demodulation circuit as set forth in claim 17, wherein said reliability calculating unit contains a weighting circuit that makes the reliability smaller as said phase difference angle becomes larger and makes the reliability larger as the phase difference angle becomes smaller.

24. A demodulation circuit as set forth in claim 18, wherein said reliability calculating unit contains a weighting circuit that makes the reliability smaller as said phase difference angle becomes larger and makes the reliability larger as the phase difference angle becomes smaller.

25. A demodulation circuit as set forth in claim 7, wherein said reliability calculating unit contains a frequency difference compensating unit for compensating for said phase difference angle by the frequency difference between a received reference carrier frequency and a reference carrier frequency on the transmission side.

26. A demodulation circuit as set forth in claim 15, wherein said reliability calculating unit contains a frequency difference compensating unit for compensating for said phase difference angle by the frequency difference between a received reference carrier frequency and a reference carrier frequency on the transmission side.

27. A demodulation circuit as set forth in claim 17, wherein said reliability calculating unit contains a frequency difference compensating unit for compensating for said phase difference angle by the frequency difference between a received reference carrier frequency and a reference carrier frequency on the transmission side.

28. A demodulation circuit as set forth in claim 18, wherein said reliability calculating unit contains a frequency difference compensating unit for compensating for said phase difference angle by the frequency difference between a received reference carrier frequency and a reference carrier frequency on the transmission side.

29. A demodulation circuit as set forth in claim 6, wherein said reliability calculating unit contains a reliability correcting unit which calculates the compensated reliability based on said correlation energy at every Walsh symbol time detected for every said Walsh number and further introduces the compensated reliability with respect to said reliability.

30. A demodulation circuit as set forth in claim 29, wherein said reliability correcting unit selects the maximum correlation energy among said correlation energies detected for every said Walsh number one Walsh symbol time before said correlation energy to be detected at the present Walsh symbol time and outputs the value of the ratio of the correlation energy for every Walsh number with respect to the maximum correlation energy as said compensated reliability.

31. A demodulation circuit as set forth in claim 29, wherein said reliability compensating unit selects the maximum correlation energy among said correlation energies detected, for every said Walsh number, after one Walsh symbol time continuing from said correlation energy to be detected at the present Walsh symbol time and outputs the value of the ratio of the correlation energy for every Walsh number with respect to the maximum correlation energy as said compensated reliability.

32. A demodulation circuit as set forth in claim 29, wherein said reliability calculating unit is provided with a feedback unit for applying said corrected correlation energy as said correlation energy to be applied to said reliability compensating unit.

33. A demodulation circuit as set forth in claim 29, wherein provision is made of an energy combining unit for combining said correlation energies obtained by collection from all of said demodulators when said demodulation is carried out by a finger demodulating unit comprising a plurality of demodulators connected to each other in parallel, and the combined correlation energy from the energy combining unit is input to said reliability compensating unit.

34. A demodulation circuit as set forth in claim 6, wherein provision is made of a reliability optimizing means for selecting the optimum reliability by inputting said reliabilities obtained by collection from all of said demodulators in correspondence with said Walsh numbers, and further multiplying the same with said corrected correlation energy in correspondence with the Walsh numbers when said demodulation is carried out by a finger demodulating unit comprising a plurality of demodulators connected to each other in parallel.

35. A demodulation circuit as set forth in claim 33, wherein said reliability optimizing means comprises a reliability decision unit for deciding the optimum reliability based on said reliabilities input in correspondence with said Walsh numbers and a multiplier unit for further multiplying the reliability decided by the reliability decision unit to said corrected correlation energies in correspondence with said Walsh numbers in the front stage of said maximum energy selecting means.

36. A demodulation circuit as set forth in claim 34, wherein said reliability decision unit comprises the average circuit for taking the average value of said reliabilities obtained by collection from all of said demodulators.

37. A demodulation circuit as set forth in claim 34, wherein said reliability decision unit comprises a comparing circuit for finding the second largest corrected correlation energy among said corrected correlation energies produced at said demodulators and a selecting circuit for selecting the reliability from the demodulator producing the second largest corrected correlation energy found by said comparing circuit among said reliabilities obtained by collection from said demodulators.

38. A demodulation circuit as set forth in claim 36, wherein provision is further made of a comparing/selecting means which defines said reliability from the demodulator producing said second largest corrected correlation energy as said optimum reliability only when the first largest corrected correlation energy among said corrected correlation energies produced at said demodulators is larger than the predetermined set value and sets reliability=1 as said optimum reliability when the first largest corrected correlation energy is smaller than the set value.

39. A demodulation circuit as set forth in claim 37, wherein provision is further made of a multiplier for multiplying the second largest corrected correlation energy by $\alpha$ ($\alpha>1$) among said corrected correlation energies and the $\alpha$ times output of the multiplier is defined as said set value.

40. A demodulation circuit as set forth in claim 4, wherein provision is further made of a thinning means for performing the processing at said reliability computing means and said correcting means only for Walsh numbers corresponding to m number of correlation energies from the first largest correlation energy among correlation energies of the Walsh numbers to the m-th (integer of 1<m<64) largest correlation energy among said Walsh numbers.

\* \* \* \* \*